(12) United States Patent
Jinnai et al.

(10) Patent No.: US 7,006,970 B2
(45) Date of Patent: Feb. 28, 2006

(54) METHOD FOR DETECTING SIMILARITY BETWEEN STANDARD INFORMATION AND INPUT INFORMATION AND METHOD FOR JUDGING THE INPUT INFORMATION BY USE OF DETECTED RESULT OF THE SIMILARITY

(75) Inventors: Michihiro Jinnai, Takamatsu (JP); Hiroshi Yamaguchi, Kagawa (JP)

(73) Assignee: Entropy Software Laboratory, Inc., Kanawa (JP)

( * ) Notice: Subject to any disclaimer, the term of this patent is extended or adjusted under 35 U.S.C. 154(b) by 667 days.

(21) Appl. No.: 09/951,211

(22) Filed: Sep. 11, 2001

(65) Prior Publication Data

US 2002/0055839 A1 May 9, 2002

(30) Foreign Application Priority Data

Sep. 13, 2000 (JP) .................................... 2000-277749

(51) Int. Cl.
*G10L 15/08* (2006.01)

(52) U.S. Cl. .................... 704/239; 704/243; 704/254; 704/246; 381/128; 381/43; 395/2.5; 340/146.3; 382/181

(58) Field of Classification Search ............... 704/239, 704/243, 254, 246; 381/128, 43; 395/2.5; 340/146.3; 382/181
See application file for complete search history.

(56) References Cited

U.S. PATENT DOCUMENTS

| 4,155,072 A | * | 5/1979 | Kawa .................... 382/186 |
| 4,827,522 A | * | 5/1989 | Matsuura et al. ........... 704/245 |
| 5,581,650 A | * | 12/1996 | Kamiya ..................... 704/241 |
| 5,594,807 A | * | 1/1997 | Liu ........................ 382/128 |
| 5,893,058 A | * | 4/1999 | Kosaka ..................... 704/254 |
| 6,170,333 B1 | | 1/2001 | Jinnai et al. |
| 2003/0185443 A1 | * | 10/2003 | Jinnai ...................... 382/181 |

OTHER PUBLICATIONS

A. Rahim Rostampour et al., Computers and Communications, (1988), Conference Proceedings, Seventh Annual International Phoenix Conference on Scottsdale, AZ USA (Mar. 16–28, 1988), Washington, D.C., USA, IEEE Comput. Soc. PR, US, (Mar. 16, 1988), p. 474–479, XP010011604.

\* cited by examiner

*Primary Examiner*—David L. Ometz
*Assistant Examiner*—Jakieda Jackson
(74) *Attorney, Agent, or Firm*—Birch, Stewart, Kolasch & Birch, LLP.

(57) ABSTRACT

Disclosed is a method for obtaining a precise detected value of a similarity between voices or the like. Standard and input pattern matrices, each having a voice feature amount as a component, are prepared (S1 and S2). A reference shape having a variance different for each specified component of the pattern matrices is prepared, and positive and negative reference pattern vectors, each having a value of the reference shape as a component, are prepared. Then, while the specified component (a center of the reference shape) being made to move to each component position $j_1=1$ to $m_1$, $j_2=1$ to $m_2$ of the standard pattern matrix, a shape change between the standard and input pattern matrices is substituted for shape changes of the positive and negative reference pattern vectors. And, an amount of change in kurtosis of each reference pattern vector is numerically evaluated to obtain a shape change amount $Dj_1j_2$ (S3). Then, a value of a geometric distance between the pattern matrices is calculated from $Dj_1j_2$ (S4).

20 Claims, 44 Drawing Sheets

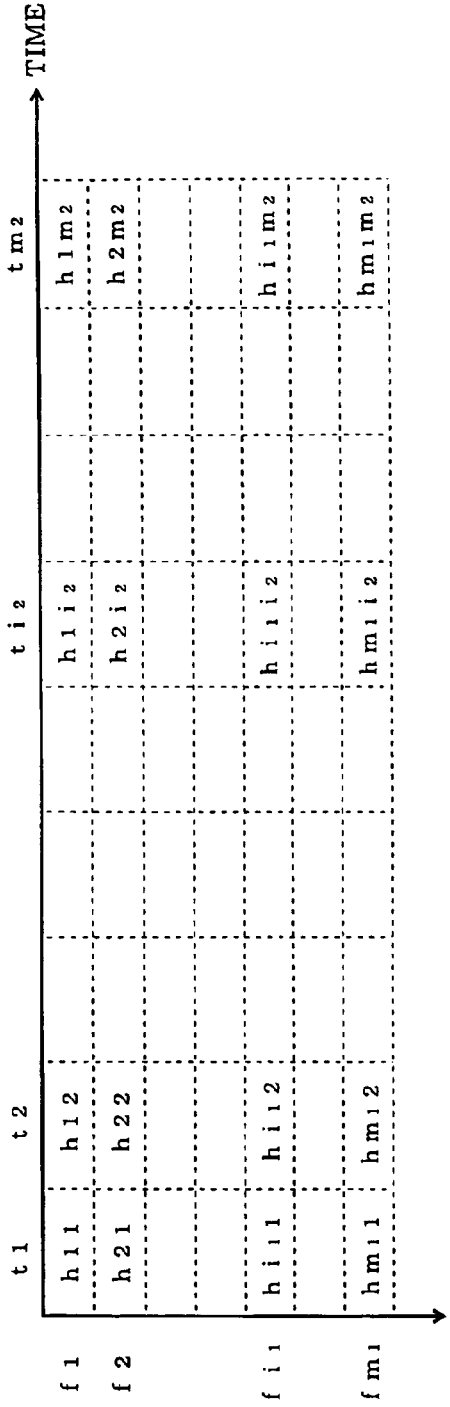
FIG. 5A STANDARD PATTERN MATRIX
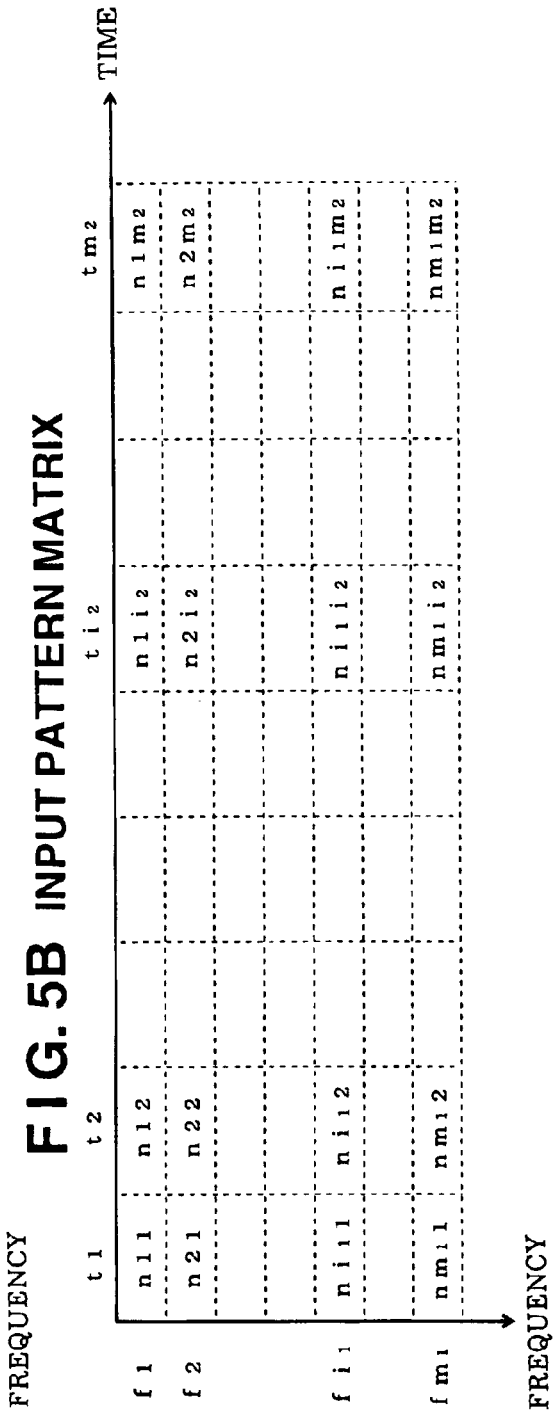
FIG. 5B INPUT PATTERN MATRIX

NORMAL CURVE

POSITIVE REFERENCE PATTERN VECTOR $Kj_1j_2^{(+)}$

NEGATIVE REFERENCE PATTERN VECTOR $Kj_1j_2^{(-)}$

F I G. 10A
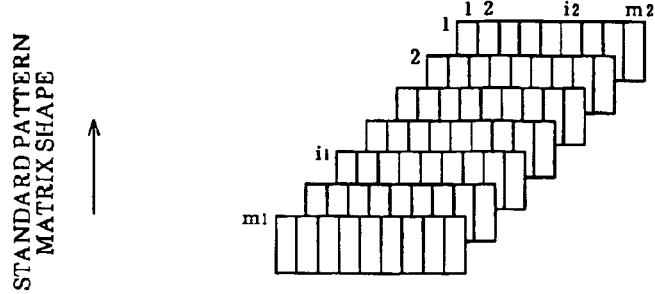
F I G. 10B
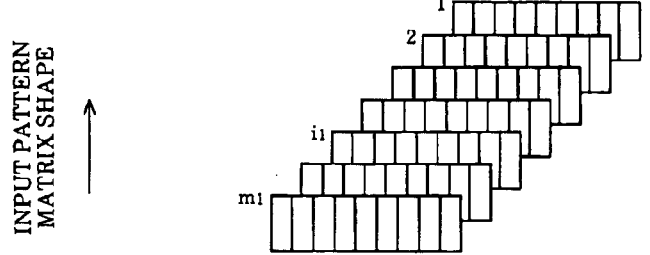
F I G. 10C
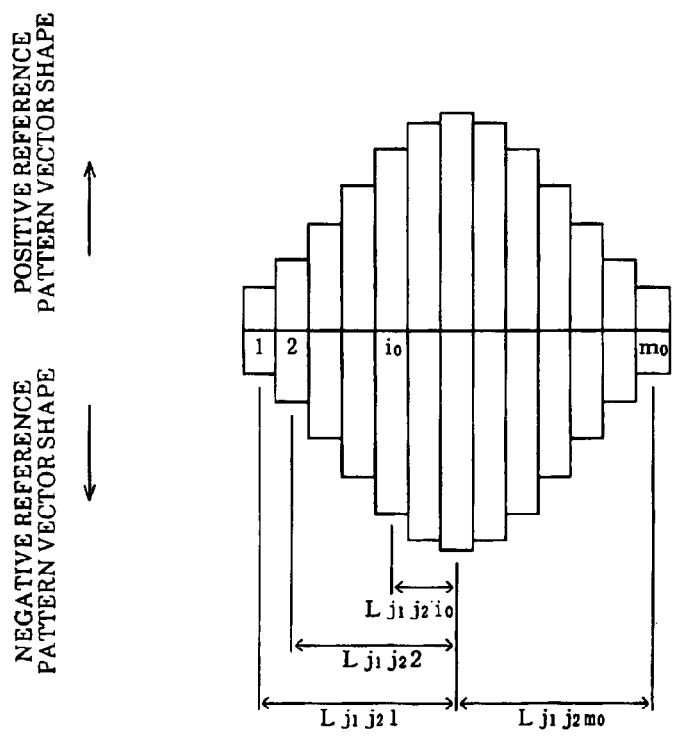

STANDARD PATTERN MATRIX SHAPE

INPUT PATTERN MATRIX SHAPE

POSITIVE REFERENCE PATTERN VECTOR SHAPE

NEGATIVE REFERENCE PATTERN VECTOR SHAPE

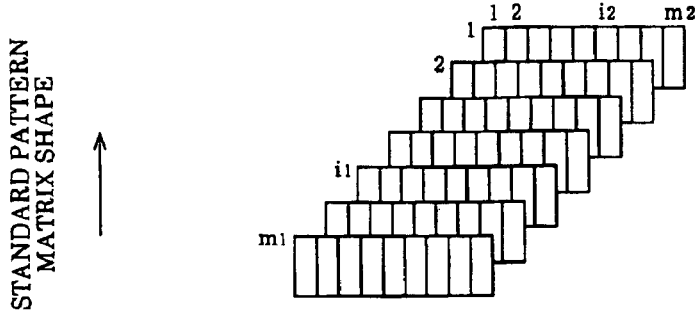
FIG. 14A STANDARD PATTERN MATRIX SHAPE
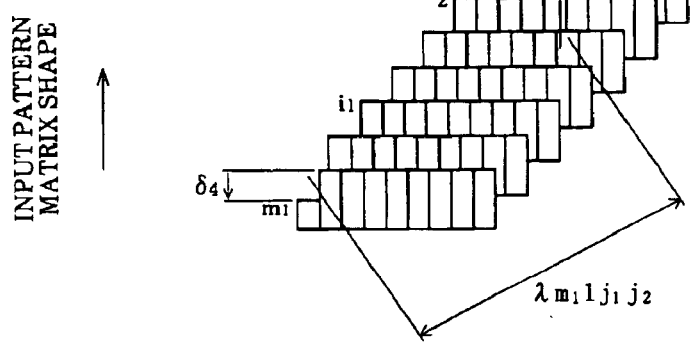
FIG. 14B INPUT PATTERN MATRIX SHAPE
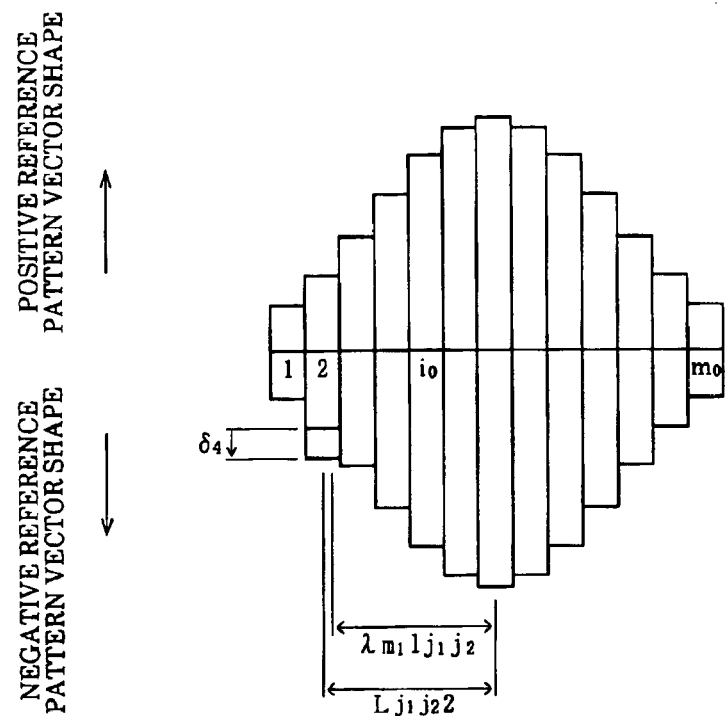
FIG. 14C POSITIVE REFERENCE PATTERN VECTOR SHAPE / NEGATIVE REFERENCE PATTERN VECTOR SHAPE

STANDARD PATTERN MATRIX SHAPE

INPUT PATTERN MATRIX SHAPE

POSITIVE REFERENCE PATTERN VECTOR SHAPE

NEGATIVE REFERENCE PATTERN VECTOR SHAPE

F I G. 16A 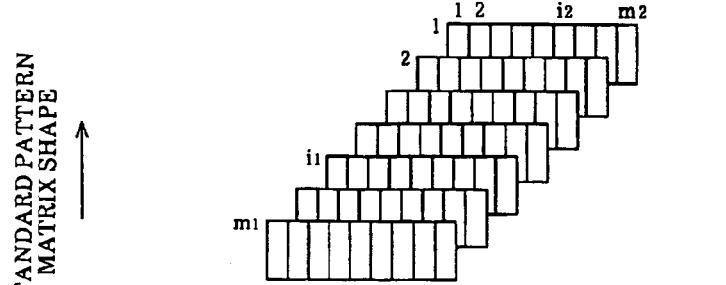
F I G. 16B 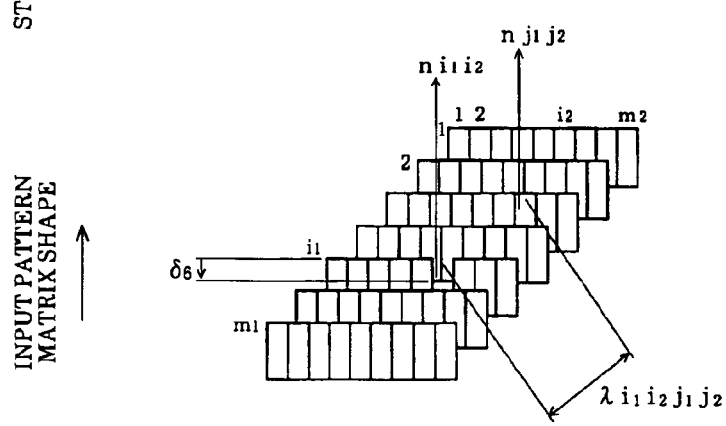
F I G. 16C 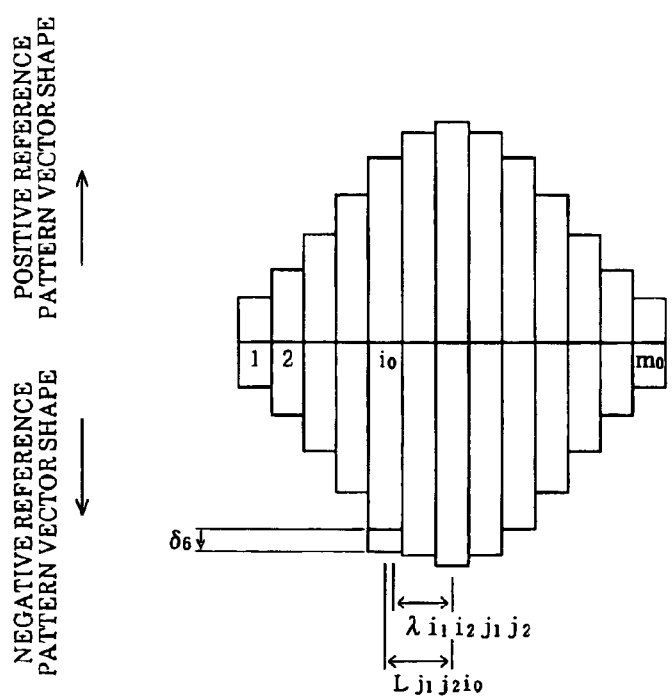

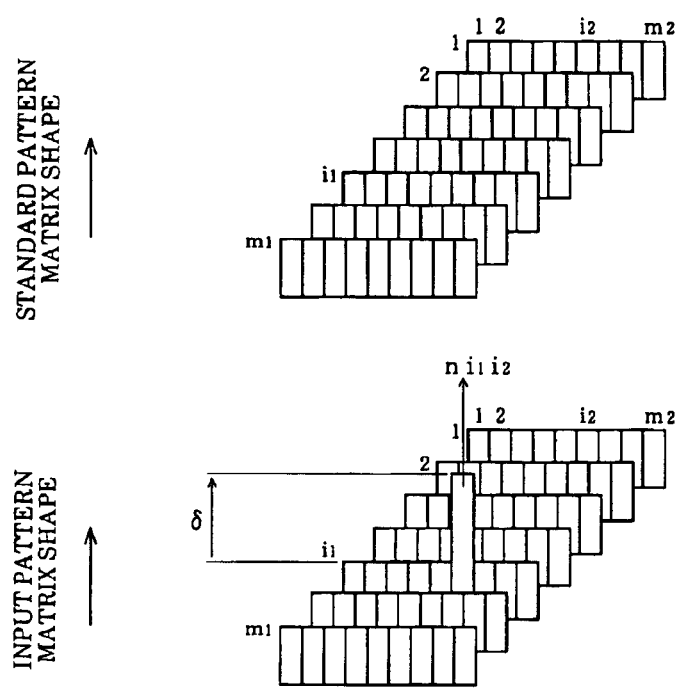
F I G. 17A
F I G. 17B

F I G. 24
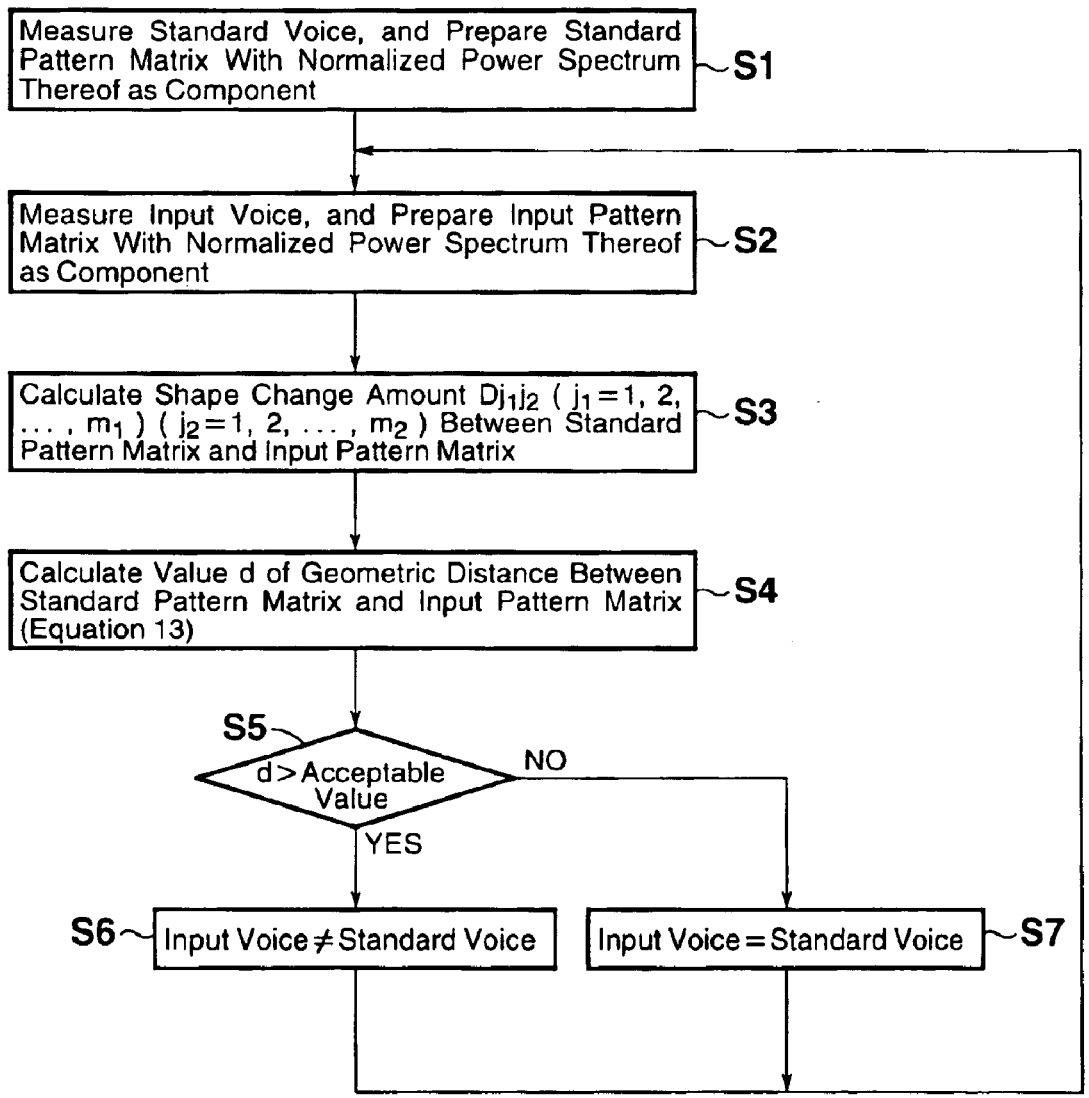

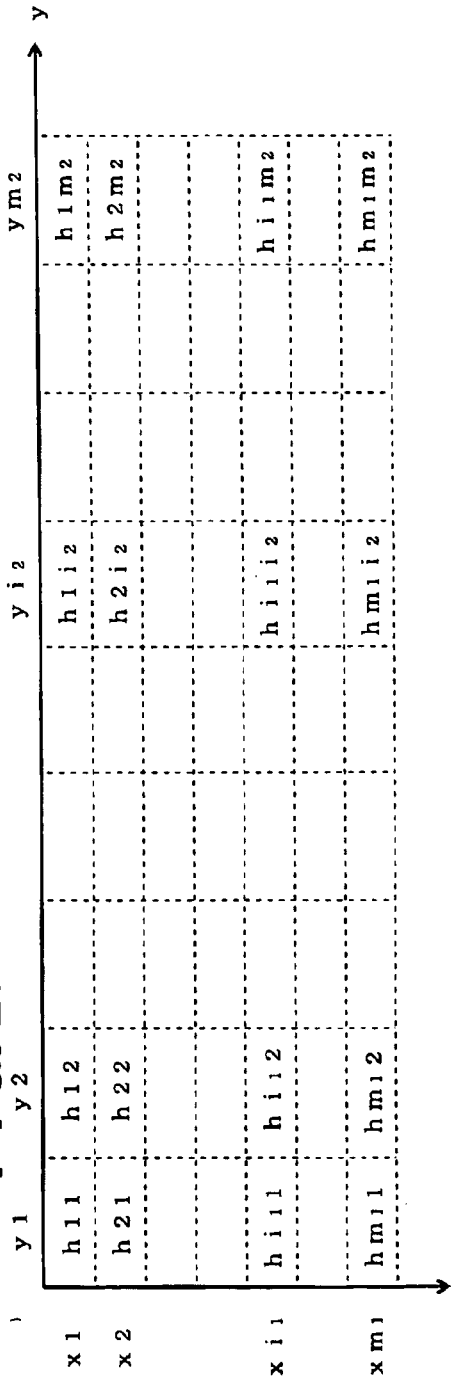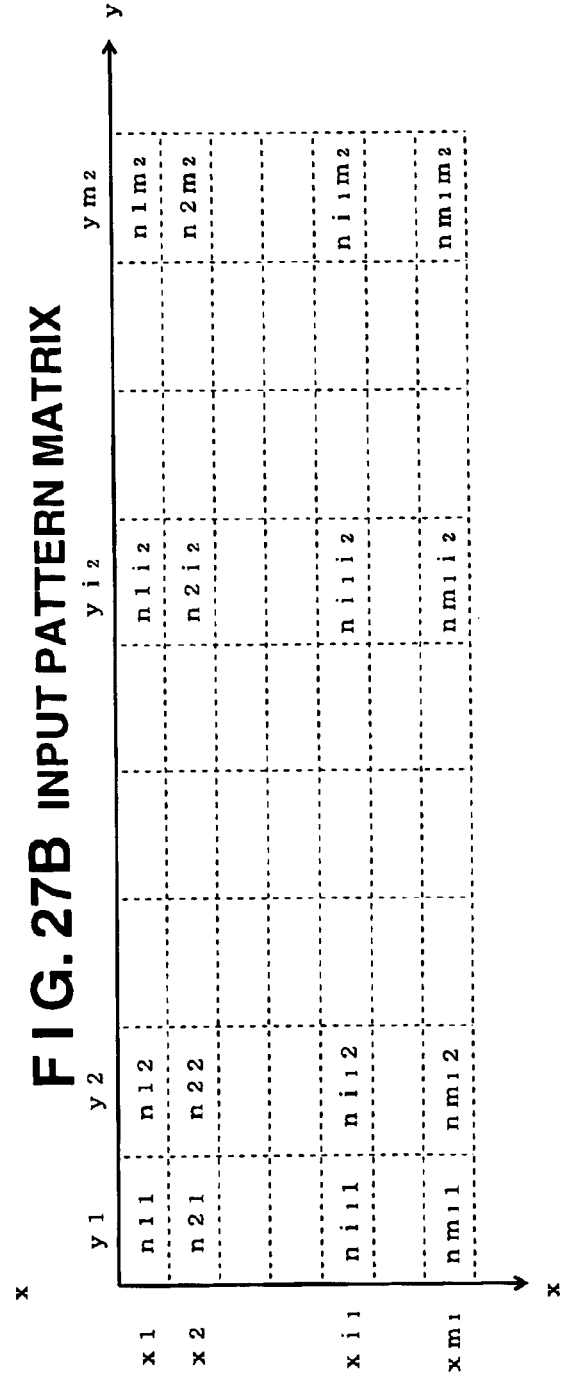

F I G. 28
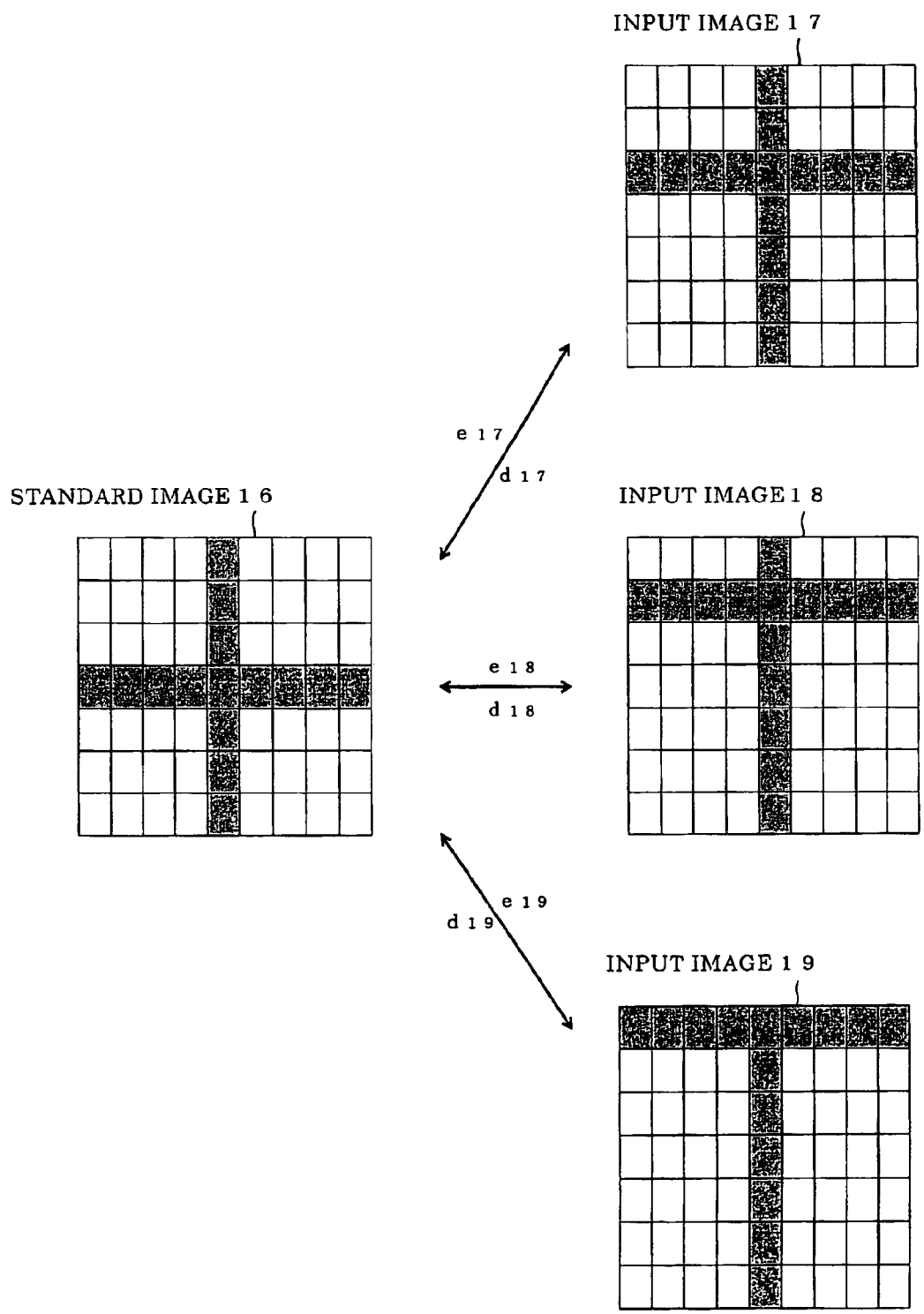

FIG. 29

INPUT IMAGE 1 7

INPUT PATTERN MATRIX 1 7 A

$$\begin{bmatrix} 0 & 0 & 0 & 0 & 1 & 0 & 0 & 0 & 0 \\ 0 & 0 & 0 & 0 & 1 & 0 & 0 & 0 & 0 \\ 1 & 1 & 1 & 1 & 1 & 1 & 1 & 1 & 1 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \end{bmatrix}$$

$e_{17}$ / $d_{17}$

STANDARD IMAGE 1 6

STANDARD PATTERN MATRIX 1 6 A

$$\begin{bmatrix} 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 1 & 1 & 1 & 1 & 1 & 1 & 1 & 1 & 1 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \end{bmatrix}$$

$\xleftrightarrow[d_{18}]{e_{18}}$

INPUT IMAGE 1 8

INPUT PATTERN MATRIX 1 8 A

$$\begin{bmatrix} 0 & 0 & 0 & 0 & 1 & 0 & 0 & 0 & 0 \\ 1 & 1 & 1 & 1 & 1 & 1 & 1 & 1 & 1 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \end{bmatrix}$$

$d_{19}$ / $e_{19}$

INPUT IMAGE 1 9

INPUT PATTERN MATRIX 1 9 A

$$\begin{bmatrix} 1 & 1 & 1 & 1 & 1 & 1 & 1 & 1 & 1 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \end{bmatrix}$$

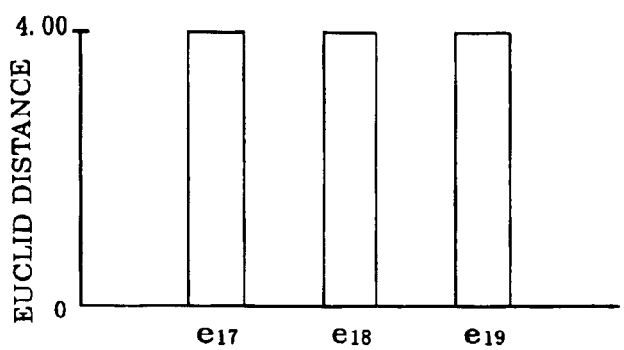
F I G. 30A
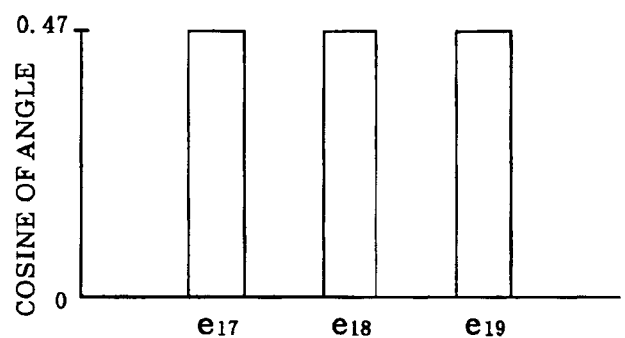
F I G. 30B
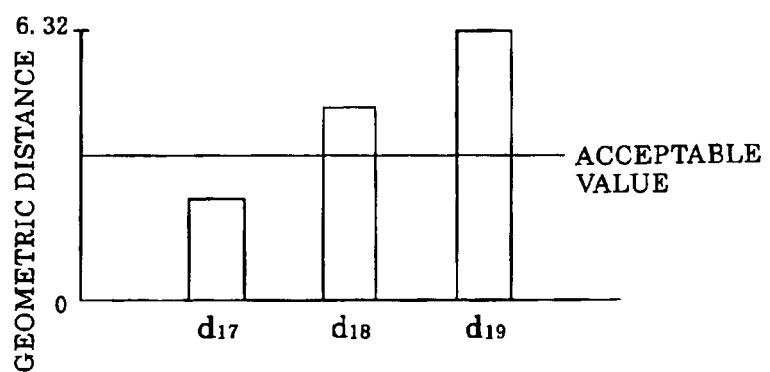
F I G. 30C

NORMAL CURVE

POSITIVE REFERENCE
PATTERN VECTOR $K_{j_1j_2j_3}^{(+)}$

NEGATIVE REFERENCE
PATTERN VECTOR $K_{j_1j_2j_3}^{(-)}$

FIG. 40

RELATED ART

INPUT VOICE 2 1
INPUT PATTERN MATRIX 2 1 A $$\begin{pmatrix} \gamma & \delta & \gamma & \delta & \gamma & \delta & \gamma & \delta & \gamma \\ \delta & \gamma & \delta & \gamma & \delta & \gamma & \delta & \gamma & \delta \\ \gamma & \delta & \gamma & \delta & \gamma & \delta & \gamma & \delta & \gamma \\ \delta & \gamma & \delta & \gamma & \delta & \gamma & \delta & \gamma & \delta \\ \gamma & \delta & \gamma & \delta & \gamma & \delta & \gamma & \delta & \gamma \\ \delta & \gamma & \delta & \gamma & \delta & \gamma & \delta & \gamma & \delta \\ \gamma & \delta & \gamma & \delta & \gamma & \delta & \gamma & \delta & \gamma \end{pmatrix}$$

STANDARD VOICE 2 0
STANDARD PATTERN MATRIX 2 0 A $$\begin{pmatrix} 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{pmatrix}$$

e21 / d21

INPUT VOICE 2 2
INPUT PATTERN MATRIX 2 2 A $$\begin{pmatrix} \varepsilon & \zeta & \varepsilon & \zeta & \varepsilon & \zeta & \varepsilon & \zeta & \varepsilon \\ \zeta & \varepsilon & \zeta & \varepsilon & \zeta & \varepsilon & \zeta & \varepsilon & \zeta \\ \varepsilon & \zeta & \varepsilon & \zeta & \varepsilon & \zeta & \varepsilon & \zeta & \varepsilon \\ \zeta & \varepsilon & \zeta & \varepsilon & \zeta & \varepsilon & \zeta & \varepsilon & \zeta \\ \varepsilon & \zeta & \varepsilon & \zeta & \varepsilon & \zeta & \varepsilon & \zeta & \varepsilon \\ \zeta & \varepsilon & \zeta & \varepsilon & \zeta & \varepsilon & \zeta & \varepsilon & \zeta \\ \varepsilon & \zeta & \varepsilon & \zeta & \varepsilon & \zeta & \varepsilon & \zeta & \varepsilon \end{pmatrix}$$

e22 / d22

WHERE
$\gamma = 1 - \dfrac{31}{32}\alpha$ $\delta = 1 + \alpha$ $\varepsilon = 1 + \dfrac{31}{32}\alpha$ $\zeta = 1 - \alpha$ $\eta = 1 - \alpha\sqrt{\dfrac{31}{32 \times 62}}$ $\theta = 1 + \alpha\sqrt{\dfrac{31 \times 62}{32}}$ e23 / d23

INPUT VOICE 2 3
INPUT PATTERN MATRIX 2 3 A $$\begin{pmatrix} \eta & \eta & \eta & \eta & \eta & \eta & \eta & \eta & \eta \\ \eta & \eta & \eta & \eta & \eta & \eta & \eta & \eta & \eta \\ \eta & \eta & \eta & \eta & \eta & \eta & \eta & \eta & \eta \\ \eta & \eta & \eta & \eta & \theta & \eta & \eta & \eta & \eta \\ \eta & \eta & \eta & \eta & \eta & \eta & \eta & \eta & \eta \\ \eta & \eta & \eta & \eta & \eta & \eta & \eta & \eta & \eta \\ \eta & \eta & \eta & \eta & \eta & \eta & \eta & \eta & \eta \end{pmatrix}$$

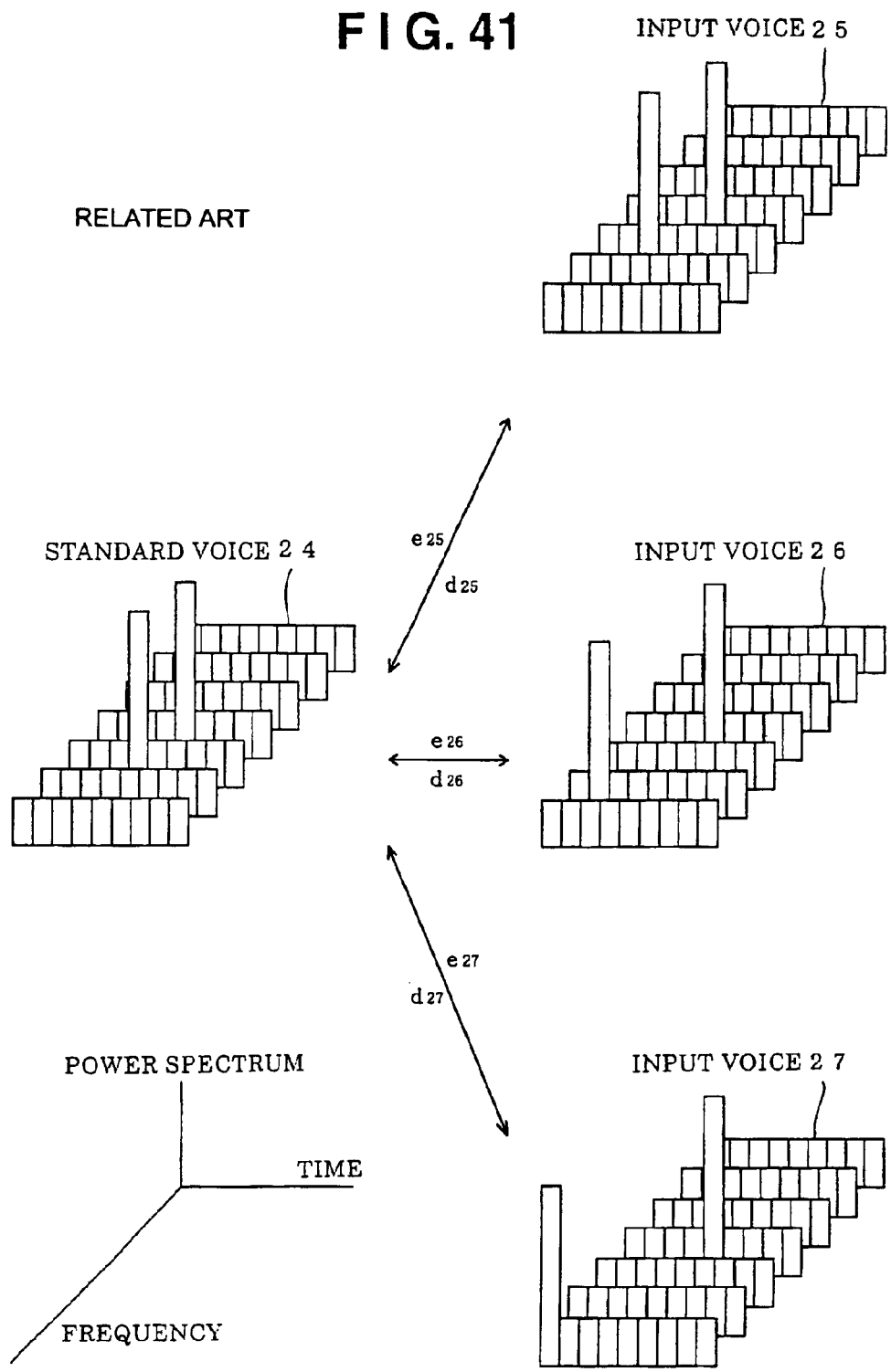

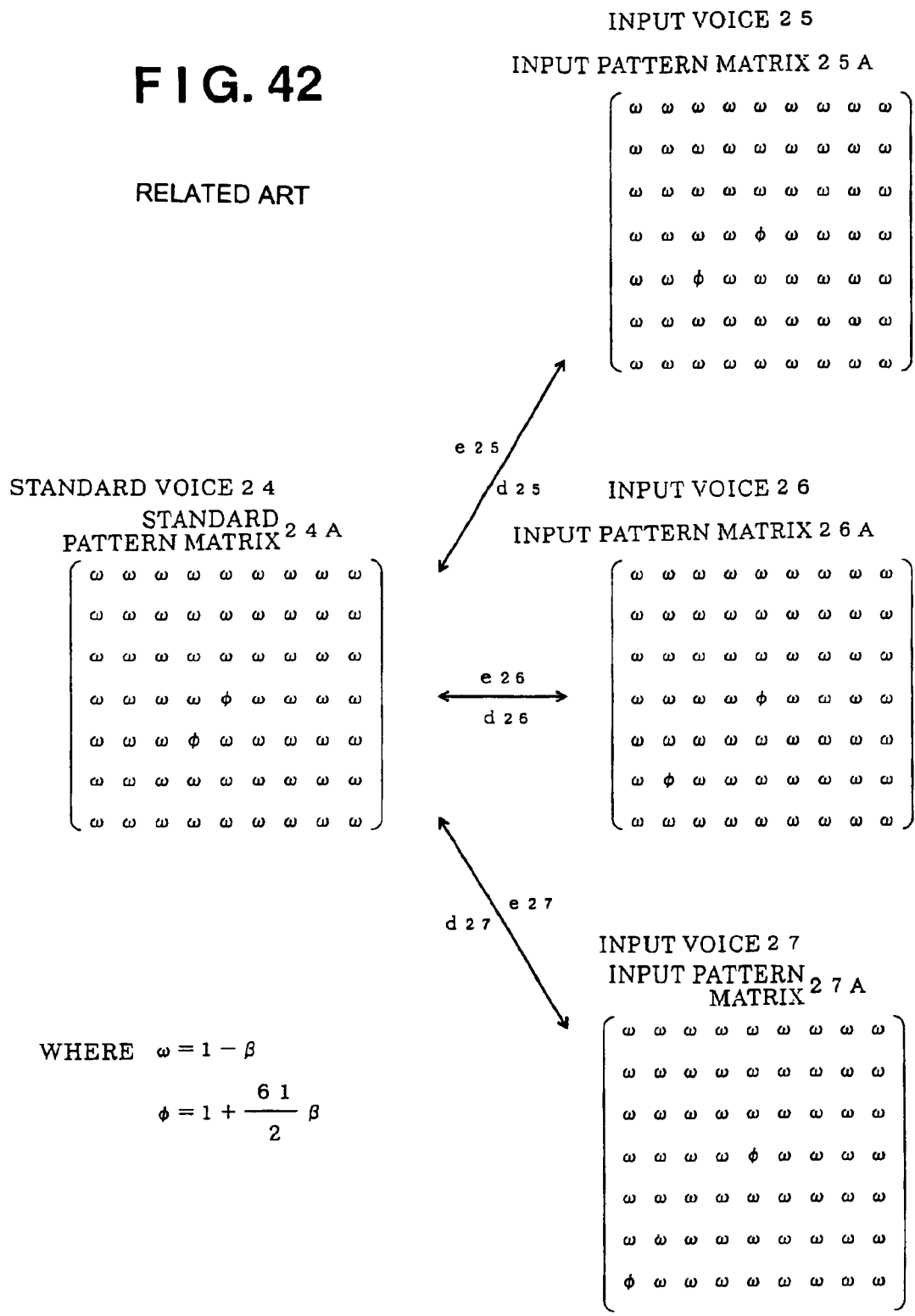

US 7,006,970 B2

METHOD FOR DETECTING SIMILARITY BETWEEN STANDARD INFORMATION AND INPUT INFORMATION AND METHOD FOR JUDGING THE INPUT INFORMATION BY USE OF DETECTED RESULT OF THE SIMILARITY

The entire disclosure of Japanese Patent Application No.2000-277749 filed on Sep. 13, 2000 including specification, claims, drawings and summary is incorporated herein by reference in its entirety.

BACKGROUND OF THE INVENTION

1. Field of the Invention

The present invention relates to a method for detecting a similarity between standard information and input information and to a method for recognizing whether or not the input information is the standard information by use of a value obtained by detecting the similarity (a detected value of the similarity) or for judging whether or not the input information is abnormal.

More specifically, the present invention relates to a method for detecting a similarity between a standard voice and an input voice with regard to a voice uttered by a human being and to a method for recognizing a voice by use of a detected value of the similarity. Moreover, the present invention relates to a method for detecting a similarity between a standard vibration wave and an arbitrary vibration wave with regard to a sound or a vibration uttered by equipment under operation or the like and to a method for judging an abnormality in a machine based on a detected value of the similarity. Furthermore, the present invention relates to a method for detecting a similarity between a standard image and an arbitrary image with regard to a letter or a pattern and to a method for recognizing the image by use of a detected value of the similarity. Still further, the present invention relates to a method for detecting a similarity between a standard solid and an arbitrary solid and to a method for recognizing a solid by use of a detected value of the similarity. Yet further, the present invention relates to a method for detecting a similarity between a standard moving picture and an arbitrary moving picture and to a method for recognizing a moving picture by use of a detected value of the similarity.

2. Description of the Related Art

A voice recognition apparatus, in which a computer automatically recognizes a voice uttered by a human being, is equipped with a means for detecting a similarity between a standard voice and an input voice and a means for recognizing the input voice from a detected value of the similarity when a known voice previously registered in the computer is set as the standard voice and an unknown voice newly inputted to the computer is set as the input voice.

In a conventional similarity detection for the voice, a method has been adopted, which includes the steps of: previously registering a standard pattern matrix with a feature amount, as a component, such as a power spectrum of the standard voice; preparing an input pattern matrix with a feature amount of the input voice as a component; and calculating an Euclid distance or an angle between the standard pattern matrix and the input pattern matrix. Moreover, in a conventional voice recognition, a method for recognizing a voice has been adopted, which includes the step of comparing a calculated value of the Euclid distance or the angle with an arbitrarily set acceptable value. Namely, supposed are pattern spaces with dimensions having a number equal to that of kinds of the feature quantities, and a similarity extent between two pattern matrices is numerically evaluated by use of a similarity measure representing a linear distance (Euclid distance) or an angle between a point of the standard pattern matrix and a point of the input pattern matrix, and then the voice is recognized based on the evaluated value.

As a first example of the related art, FIGS. 39 and 40 schematically show a state with regard to a standard voice 20 with a flat power spectrum shape and input voices 21, 22 and 23 with energies equal to that of the standard voice 20 but with different features of the power spectrum shapes. Specifically, FIGS. 39 and 40 show the following state. A standard pattern matrix 20A of seven rows and nine columns with the power spectrum of the standard voice 20 as a component is previously registered. And, each of input pattern matrices 21A, 22A and 23A of seven rows and nine columns with a power spectrum of each of the input voices 21, 22 and 23 as a component is prepared. Then, as a measure of a similarity between the standard pattern matrix 20A and each of the input pattern matrices 21A, 22A and 23A, the Euclid distance or a cosine of the angle indicated by e21, e22 or e23 is calculated.

Here, it is assumed that each of the input voices 21, 22 and 23 has relations $\gamma$, $\delta$, $\epsilon$, $\zeta$, $\eta$ and $\theta$ shown in FIG. 40 with regard to a parameter $\alpha$. Namely, in the relations shown in FIG. 40, the parameter $\alpha$ prescribes a change of the power spectrum shape of each of the input voices 21, 22 and 23 from the power spectrum shape of the standard voice 20. The Euclid distance is obtained as a square root of a value that is a sum of squares of differences between the respective components of the standard pattern matrix and corresponding components of the input pattern matrix. A cosine of the angle is obtained by dividing a sum of products of the respective components of two pattern matrices by a square root of a value that is a sum of squares of the respective components of the standard pattern matrix and a square root of a value that is a sum of squares of the respective components of the input pattern matrix.

As a second example of the related art, FIGS. 41 and 42 schematically show a state with regard to a standard voice 24 with two peaks in power spectrum shape and input voices 25, 26 and 27 with energies equal to that of the standard voice 24 but with different peak positions in the power spectrum shapes. Specifically, FIGS. 41 and 42 show the following state. A standard pattern matrix 24A of seven rows and nine columns with the power spectrum of the standard voice 24 as a component is previously registered. And, each of input pattern matrices 25A, 26A and 27A of seven rows and nine columns with a power spectrum of each of the input voices 25, 26 and 27 as a component is prepared. Then, as the measure of the similarity between the standard pattern matrix and each of the input pattern matrices, the Euclid distance or a cosine of the angle indicated by e25, e26 or e27 is calculated.

Here, it is assumed that the standard voice 24 and each of the input voices 25, 26 and 27 have relations $\omega$ and $\phi$ shown in FIG. 42 with regard to a parameter $\beta$. Namely, in the relations shown in FIG. 42, the parameter $\beta$ prescribes a change of the power spectrum shape of each of the input voices 25, 26 and 27 from the power spectrum shape of the standard voice 24.

However, in case of using the Euclid distance or the angle as the measure of the similarity, with regard to a plural input voices with power spectrum shapes different from one to another, calculated values of the Euclid distances or the angles from the standard voice happen to be equal. In such a case, it is impossible to distinguish input voices with features different from one to another, thus causing imprecise detection for the similarity of the voices. The following is detailed description.

As the first example, FIG. 43 shows changes of the calculated values e21, e22 and e23 of the Euclid distances when the value of the parameter α in FIG. 40 is increased from 0 to 1. FIG. 44 shows changes of the calculated values e21, e22 and e23 of the cosines of the angles when the value of the parameter α in FIG. 40 is increased from 0 to 1 similarly.

With reference to FIGS. 43 and 44, in this example, it is understood that the calculated values e21, e22 and e23 of the Euclid distances or the cosines of the angles are always equal from one to another (e21=e22=e23). And it is understood that, according to an increase of the parameter α, the values e21, e22 and e23 of the Euclid distances are increased and the values e21, e22 and e23 of the cosines of the angles are decreased. Such a decrease of each of the values e21, e22 and e23 of the cosines of the angles means an increase of values of the angles.

By the way, generally, a power spectrum shape of a white noise is flat, and a power spectrum shape of a fricative consonant /s/ in voice is nearly flat in many cases. Note that, though the fricative consonant /s/ has the power spectrum shape nearly flat, a phenomenon of a "sway of spectrum intensity" that such power spectrum shape is slightly changed according to time is also observed.

In FIGS. 39 and 40, it is assumed that the input voices 21 and 22 are fricative consonants /s/ with the "sway of spectrum intensity" and the input voice 23 is a voice different from the fricative consonant /s/ in a case where the parameter α is small.

As understood with reference to FIGS. 43 and 44, when the values of the parameter α prescribing the input voice are equal in the three input voices 21, 22 and 23, the values of the Euclid distances or the angles from the standard voice 20 are equal in the three input voices 21, 22 and 23. Therefore, when the values of the three input voices 21, 22 and 23 are compared with an arbitrarily set acceptable value, it is judged that the three input voices 21, 22 and 23 are standard voices, or conversely, it is judged that the three input voices 21, 22 and 23 are not standard voices, then it is impossible to distinguish the three input voices 21, 22 and 23 from one to another.

As the second example, FIG. 45 shows changes of the calculated values e25, e26 and e27 of the Euclid distances when the value of the parameter β, in FIG. 42 is increased from 0 to 1. FIG. 46 shows changes of the calculated values e25, e26 and e27 of the cosines of the angles when the value of the parameter β in FIG. 42 is increased from 0 to 1 similarly.

With reference to FIGS. 45 and 46, in this example, it is understood that the calculated values e25, e26 and e27 of the Euclid distances or the cosines of the angles are always equal from one to another (e25=e26=e27). And it is understood that, according to an increase of the parameter β, the values e25, e26 and e27 of the Euclid distances are increased and the values e25, e26 and e27 of the cosines of the angles are decreased. Such a decrease of each of the values e25, e26 and e27 of the cosines of the angles means an increase of values of the angles.

By the way, generally, a plurality of peaks referred to as formants are observed in the power spectrum shape of the voice. With regard to the formants of the voice, a "shift of frequency" phenomenon that a peak frequency of the power spectrum shape is slightly shifted or a "shift of time" phenomenon that a peak position is slightly shifted according to time is also observed even in the same voice.

Then, in FIGS. 41 and 42, it is assumed that the input voice 25 is the same as the standard voice 24, in which the "shift of frequency" or "shift of time" occurs in the peak, and that the input voices 26 and 27 are voices different from the standard voice 24.

As understood from FIGS. 45 and 46, when the values of the parameter β prescribing the standard voice and the input voices are equal from one to another in the standard voice 24 and the three input voices 25, 26 and 27, the values of the Euclid distances or the angles from the standard voice 24 are equal in the three input voices 25, 26 and 27. Therefore, when the values of the three input voices 25, 26 and 27 are compared with an arbitrarily set acceptable value, it is judged that the three input voices 25, 26 and 27 are standard voices, or conversely, it is judged that the three input voices 25, 26 and 27 are not standard voices, then it is impossible to distinguish the three input voices 25, 26 and 27 from one to another.

As described above, in the conventional method for detecting a similarity between voices, the similarity between the voices cannot be precisely detected, thus causing a problem that a sufficiently satisfactory precision cannot be obtained in recognizing the voice.

The reason is that, in the conventional method for detecting a similarity between voices, a difference between the shape formed by the standard pattern matrix and the shape formed by the input pattern matrix cannot be numerically evaluated as a geometric distance since the value of the Euclid distance or angle between the two pattern matrices is set as the measures of the similarity.

Meanwhile, in the case where the standard pattern matrix with the power spectrum of the standard voice as a component is previously registered, a method is conceived, in which individual standard voices having the "sway of spectrum intensity", the "shift of frequency" and the "shift of time" are previously registered as a large number of standard pattern matrices. However, since the registration number of the standard pattern matrices has limitations due to a problem such as a storage capacity or a processing time of a computer, there are limitations in judging, by use of this method, the "sway of spectrum intensity" of the standard voice, the "shift of frequency" of the standard voice or the "shift of time" of the standard voice, and the voice different from the standard voice.

Moreover, in the gazette of Japanese Patent Laid-Open No. Hei 10 (1998)-253444 (Japanese Patent Application No. Hei 9(1997)-61007, Title of the Invention: Method for Detecting Abnormal Sound, Method for Judging Abnormality in Machine by Use of the Detected Value, Method for Detecting Similarity Between Vibration Wave and Method for Recognizing Voice by Use of the Detected Value), description has been made for a method for calculating a value of a geometric distance between a standard pattern vector (one-dimension) and an input pattern vector (one-dimension). However, description has not been made for a method for calculating a value of a geometric distance between a standard pattern matrix (two-dimension) and an input pattern matrix (two-dimension) or a method for calculating a value of a geometric distance between a standard pattern matrix layer (three-dimension) and an input pattern matrix layer (three-dimension).

The present invention was made in order to solve the foregoing problems. A first object of the present invention is to provide a method for detecting a similarity between voices, which is capable of obtaining a precise value of a geometric distance between two pattern matrices that are a standard pattern matrix and an input pattern matrix. A second object of the present invention is to provide a method capable of recognizing a voice based on a detected value of the similarity between the voices with high precision.

A third object of the present invention is to provide a method for detecting a similarity between vibration waves, which is capable of obtaining a precise value of a geometric distance between two pattern matrices that are a standard pattern matrix and an input pattern matrix. A fourth object of the present invention is to provide a judgement method for judging an abnormality in a machine based on a detected value of the similarity between the vibration waves with high precision.

A fifth object of the present invention is to provide a method for detecting a similarity between images, which is capable of obtaining a precise value of a geometric distance between two pattern matrices that are a standard pattern matrix and an input pattern matrix. A sixth object of the present invention is to provide a method capable of recognizing an image based on a detected value of the similarity between the images with high precision.

A seventh object of the present invention is to provide a method for detecting a similarity between solids, which is capable of obtaining a precise value of a geometric distance between two pattern matrix layers that are a standard pattern matrix layer and an input pattern matrix layer. An eighth object of the present invention is to provide a method capable of recognizing a solid based on a detected value of the similarity between the solids with high precision.

A ninth object of the present invention is to provide a method for detecting a similarity between moving pictures, which is capable of obtaining a precise value of a geometric distance between two pattern matrix layers that are a standard pattern matrix layer and an input pattern matrix layer. A tenth object of the present invention is to provide a method capable of recognizing a moving picture based on a detected value of the similarity between the moving pictures with high precision.

Note that the present invention was made as the one, in which the method for calculating a value of a geometric distance described in the gazette of Japanese Patent Laid-Open No. Hei 10 (1998)-253444 (Japanese Patent Application No. Hei 9 (1997)-61007) is two-dimensionally extended to be applicable to voice recognition, judgment for an abnormality in a machine and image recognition, and further, is three-dimensionally extended to be applicable to solid recognition and moving picture recognition.

SUMMARY OF THE INVENTION

In order to solve the foregoing problems, according to a first aspect of the present invention, there is provided a method for detecting a similarity between voices, comprising the steps of: (a) preparing a standard pattern matrix with a feature amount of a standard voice as a component and an input pattern matrix with a feature amount of an input voice as a component; (b) preparing a normal distribution having a variance different for each specified component of the pattern matrices, and preparing a positive reference pattern vector and a negative reference pattern vector, each having a value of the normal distribution as a component; (c) with regard to each component of the pattern matrices, obtaining a length between the specified component and a component in each of the pattern matrices, calculating the numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix; (d) calculating a value of a difference between a kurtosis of the positive reference pattern vector and a kurtosis of the negative reference pattern vector; (e) obtaining a value of the difference between the kurtoses while the specified component of the pattern matrices being made to move to the position of each component in calculating the value of the difference between the kurtoses; and (f) obtaining a sum of squares of the values of the differences between the kurtoses or a square root of the sum of the squares as a value of a geometric distance between the standard pattern matrix and the input pattern matrix.

A second aspect of the present invention is the method for detecting a similarity between voices according to the first aspect, characterized in that, instead of the normal distribution having a variance different for each specified component of the pattern matrices, an arbitrary reference shape such as a rectangle having a variance different for each specified component of the pattern matrices is prepared, and the positive reference pattern vector and the negative reference pattern vector, each having a value of the reference shape as a component, are prepared.

According to a third aspect of the present invention, there is provided a method for recognizing a voice, comprising the steps of: obtaining a value of a geometric distance between a standard pattern matrix with a feature amount of a standard voice as a component and an input pattern matrix with a feature amount of an input voice as a component by use of the method for detecting a similarity according to any one of the first and second aspects; comparing the obtained value of the geometric distance with an arbitrarily set acceptable value; and judging that the input voice is not the standard voice when the value of the geometric distance exceeds the acceptable value, and judging that the input voice is the standard voice when the value of the geometric distance is within the acceptable value.

According to a fourth aspect of the present invention, there is provided a method for detecting a similarity between vibration waves, comprising the steps of: (a) preparing a standard pattern matrix with a feature amount of a standard vibration wave as a component and an input pattern matrix with a feature amount of an input vibration wave as a component; (b) preparing a normal distribution having a variance different for each specified component of the pattern matrices, and preparing a positive reference pattern vector and a negative reference pattern vector, each having a value of the normal distribution as a component; (c) with regard to each component of the pattern matrices, obtaining a length between the specified component and a component in each of the pattern matrices, calculating the numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix; (d) calculating a value of a difference between a kurtosis of the positive reference pattern vector and a kurtosis of the negative reference pattern vector; (e) obtaining a value of the difference between the kurtoses while the specified component of the pattern matrices being made to move to the position of each component in calculating the value of the difference between the kurtoses; and (f) obtaining a sum of squares of the values of the differences between the kurtoses or a square root of the sum of the squares as a value of a geometric distance between the standard pattern matrix and the input pattern matrix.

A fifth aspect of the present invention is the method for detecting a similarity between vibration waves according to the fourth aspect, characterized in that, instead of the normal distribution having the variance different for each specified component of the pattern matrices, an arbitrary reference shape such as a rectangle having a variance different for each specified component of the pattern matrices is prepared, and the positive reference pattern vector and the negative reference pattern vector, each having a value of the reference shape as a component, are prepared.

According to a sixth aspect of the present invention, there is provided a method for judging an abnormality in a machine, comprising the steps of: obtaining a value of a geometric distance between a standard pattern matrix with a feature amount of a standard vibration wave as a component and an input pattern matrix with a feature amount of an input vibration wave as a component by use of the method for detecting a similarity between vibration waves according to the fourth or fifth aspect; comparing the obtained value of the geometric distance with an arbitrarily set acceptable value; and judging that the machine is abnormal when the value of the geometric distance exceeds the acceptable value, and judging that the machine is normal when the value of the geometric distance is within the acceptable value.

According to a seventh aspect of the present invention, there is provided a method for detecting a similarity between images, comprising the steps of: (a) preparing a standard pattern matrix with a feature amount of a standard image as a component and an input pattern matrix with a feature amount of an input image as a component; (b) preparing a normal distribution having a variance different for each specified component of the pattern matrices, and preparing a positive reference pattern vector and a negative reference pattern vector, each having a value of the normal distribution as a component; (c) with regard to each component of the pattern matrices, obtaining a length between the specified component and a component in each of the pattern matrices, calculating the numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix; (d) calculating a value of a difference between a kurtosis of the positive reference pattern vector and a kurtosis of the negative reference pattern vector; (e) obtaining a value of the difference between the kurtoses while the specified component of the pattern matrices being made to move to the position of each component in calculating the value of the difference between the kurtoses; and (f) obtaining a sum of squares of the values of the differences between the kurtoses or a square root of the sum of the squares as a value of a geometric distance between the standard pattern matrix and the input pattern matrix.

An eighth aspect of the present invention is the method for detecting a similarity between images according to the seventh aspect, characterized in that, instead of the normal distribution having the variance different for each specified component of the pattern matrices, an arbitrary reference shape such as a rectangle having a variance different for each specified component of the pattern matrices is prepared, and the positive reference pattern vector and the negative reference pattern vector, each having a value of the reference shape as a component, are prepared.

According to a ninth aspect of the present invention, there is provided a method for recognizing an image, comprising the steps of: obtaining a value of a geometric distance between a standard pattern matrix with a feature amount of a standard image as a component and an input pattern matrix with a feature amount of an input image as a component by use of the method for detecting a similarity between images according to the seventh or eighth aspect; comparing the obtained value of the geometric distance with an arbitrarily set acceptable value; and judging that the input image is not the standard image when the value of the geometric distance exceeds the acceptable value, and judging that the input image is the standard image when the value of the geometric distance is within the acceptable value.

According to a tenth aspect of the present invention, there is provided a method for detecting a similarity between solids, characterized by comprising the steps of: (a) preparing a standard pattern matrix layer with a feature amount of a standard solid as a component and an input pattern matrix layer with a feature amount of an input solid as a component; (b) preparing a normal distribution having a variance different for each specified component of the pattern matrix layers, and preparing a positive reference pattern vector and a negative reference pattern vector, each having a value of the normal distribution as a component; (c) with regard to each component of the pattern matrix layers, obtaining a length between the specified component and a component in each of the pattern matrix layers, calculating the numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix layer and the standard pattern matrix layer when the component value of the input pattern matrix layer is greater than the component value of the standard pattern matrix layer, and increasing a value of the component of the number in the negative reference pattern vector by the absolute value of the difference between the component values of the input pattern matrix layer and the standard pattern matrix layer when the component value of the input pattern matrix layer is smaller than the component value of the standard pattern matrix layer; (d) calculating a value of a difference between a kurtosis of the positive reference pattern vector and a kurtosis of the negative reference pattern vector; (e) obtaining a value of the difference between the kurtoses while the specified component of the pattern matrix layers being made to move to the position of each component in calculating the value of the difference between the kurtoses; and (f) obtaining a sum of squares of the values of the differences between the kurtoses or a square root of the sum of the squares as a value of a geometric distance between the standard pattern matrix layer and the input pattern matrix layer.

An eleventh aspect of the present invention is the method for detecting a similarity between solids according to the tenth aspect, characterized in that, instead of the normal distribution having the variance different for each specified component of the pattern matrix layers, an arbitrary reference shape such as a rectangle having a variance different for each specified component of the pattern matrix layers is prepared, and the positive reference pattern vector and the negative reference pattern vector, each having a value of the reference shape as a component, are prepared.

According to a twelfth aspect of the present invention, there is provided a method for recognizing a solid, comprising the steps of: obtaining a value of a geometric distance between a standard pattern matrix layer with a feature amount of a standard solid as a component and an input pattern matrix layer with a feature amount of an input solid as a component by use of the method for detecting a similarity between solids according to the tenth or eleventh aspect; comparing the obtained value of the geometric distance with an arbitrarily set acceptable value; and judging that the input solid is not the standard solid when the value of the geometric distance exceeds the acceptable value, and judging that the input solid is the standard solid when the value of the geometric distance is within the acceptable value.

According to a thirteenth aspect of the present invention, there is provided a method for detecting a similarity between moving pictures, characterized by comprising the steps of: (a) preparing a standard pattern matrix layer with a feature amount of a standard moving picture as a component and an input pattern matrix layer with a feature amount of an input moving picture as a component; (b) preparing a normal distribution having a variance different for each specified component of the pattern matrix layers, and preparing a positive reference pattern vector and a negative reference pattern vector, each having a value of the normal distribution as a component; (c) with regard to each component of the pattern matrix layers, obtaining a length between the specified component and a component in each of the pattern matrix layers, calculating the numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix layer and the standard pattern matrix layer when the component value of the input pattern matrix layer is greater than the component value of the standard pattern matrix layer, and increasing a value of the component of the number in the negative reference pattern vector by the absolute value of the difference between the component values of the input pattern matrix layer and the standard pattern matrix layer when the component value of the input pattern matrix layer is smaller than the component value of the standard pattern matrix layer; (d) calculating a value of a difference between a kurtosis of the positive reference pattern vector and a kurtosis of the negative reference pattern vector; (e) obtaining a value of the difference between the kurtoses while the specified component of the pattern matrix layers being made to move to the position of each component in calculating the value of the difference between the kurtoses; and (f) obtaining a sum of squares of the values of the differences between the kurtoses or a square root of the sum of the squares as a value of a geometric distance between the standard pattern matrix layer and the input pattern matrix layer.

A fourteenth aspect of the present invention is the method for detecting a similarity between moving pictures according to the thirteenth aspect, characterized in that, instead of the normal distribution having the variance different for each specified component of the pattern matrix layers, an arbitrary reference shape such as a rectangle having a variance different for each specified component of the pattern matrix layers is prepared, and the positive reference pattern vector and the negative reference pattern vector, each having a value of the reference shape as a component, are prepared.

According to a fifteenth aspect of the present invention, there is provided a method for recognizing a moving picture, comprising the steps of: obtaining a value of a geometric distance between a standard pattern matrix layer with a feature amount of a standard moving picture as a component and an input pattern matrix layer with a feature amount of an input moving picture as a component by use of the method for detecting a similarity between moving pictures according to the thirteenth or fourteenth aspect; comparing the obtained value of the geometric distance with an arbitrarily set acceptable value; and judging that the input moving picture is not the standard moving picture when the value of the geometric distance exceeds the acceptable value, and judging that the input moving picture is the standard moving picture when the value of the geometric distance is within the acceptable value.

BRIEF DESCRIPTION OF THE DRAWINGS

FIG. 5A is a diagram showing a method for expressing a standard pattern matrix on a (frequency-time) plane.

FIG. 5B is a diagram showing a method for expressing an input pattern matrix on the (frequency-time) plane.

FIG. 10A is a pattern diagram showing a typical example of a shape in a standard pattern matrix, the shape being the same as that of FIG. 10B.

FIG. 10B is a pattern diagram showing a typical example of a shape in an input pattern matrix, the shape being the same as that of FIG. 10A.

FIG. 10C is a diagram showing a shape in a positive reference pattern vector and a shape in a negative reference pattern vector, the both shapes being the same, in the case of setting the $j_1 j_2$ component as a specified component of the pattern matrix.

FIG. 14A is a pattern diagram showing the typical example of the shape in the standard pattern matrix, the shape being the same as that of FIG. 10A.

FIG. 14B is a pattern diagram showing a typical example of a shape in an input pattern matrix, the shape having an $m_1 1$ component decreased than that of the shape in the standard pattern matrix, in the case of setting the $j_1 j_2$ component as a specified component of the pattern matrix.

FIG. 14C is a diagram showing the shape in the positive reference pattern vector and a shape change in a negative reference pattern vector when the $m_1 1$ component is decreased.

FIG. 16A is a pattern diagram showing the typical example of the shape in the standard pattern matrix, the shape being the same as that of FIG. 10A.

FIG. 16B is a pattern diagram showing a typical example of a shape in an input pattern matrix, the shape having an $i_1 i_2$ component decreased than that of the shape in the standard pattern matrix, in the case of setting the $j_1 j_2$ component as a specified component of the pattern matrix.

FIG. 16C is a diagram showing the shape in the positive reference pattern vector and a shape change in a negative reference pattern vector when the $i_1 i_2$ component is decreased.

FIG. 17A is a pattern diagram showing a shape example of the standard pattern matrix.

FIG. 17B is a pattern diagram showing a shape example of an input pattern matrix with the $i_1 i_2$ component increased than that of the standard pattern matrix.

FIG. 24 is a flowchart for recognizing the voice.

FIG. 27A is a diagram showing a method for expressing a standard pattern matrix on an (x-y) plane.

FIG. 27B is a diagram showing a method for expressing an input pattern matrix on the (x-y) plane.

FIG. 28 is diagrams showing examples of densities of a standard image and input images.

FIG. 29 is views showing pattern matrices of the standard image and the input images, corresponding to FIG. 28.

FIG. 30A is a bar graph showing values of Euclid distances between the standard image and an input image same as the standard image and between the standard image and input images different from the standard image, the bar graph being obtained as a result of an experiment.

FIG. 30B is a bar graph showing values of cosines of angles between the standard image and the input image same as the standard image and between the standard image and the input images different from the standard image, the bar graph being obtained as the result of the experiment.

FIG. 30C is a bar graph showing values of geometric distances between the standard image and the input image same as the standard image and between the standard image and the input images different from the standard image, the bar graph being obtained as the result of the experiment.

FIG. 40 is diagrams showing examples of pattern matrices of the standard voice and the input voices, corresponding to FIG. 39.

FIG. 41 is diagrams showing other examples of the power spectrums of the standard voice and the input voices.

FIG. 42 is diagrams showing examples of pattern matrices of the standard voice and the input voices, corresponding to FIG. 41.

DETAILED DESCRIPTION OF THE PREFERRED EMBODIMENTS

Figure 1:
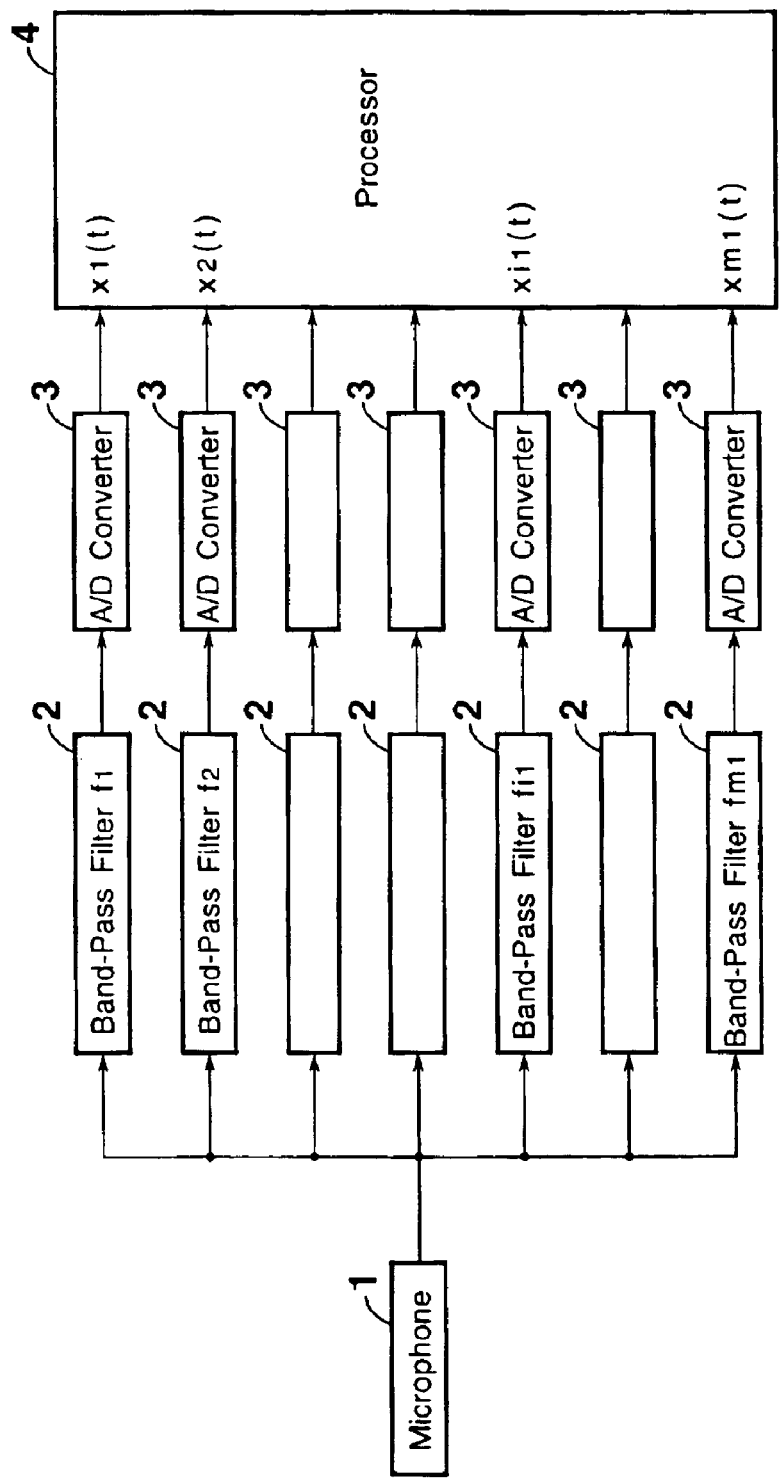
FIG. 1 is a block diagram showing a configuration of a measurement apparatus for a voice or a vibration wave in one embodiment of the present invention.

Hereinbelow, description will be made for embodiments of the present invention.

[Description of Principle]

First, description will be made for a principle of the present invention with regard to the case of using a normal distribution as a reference shape.

In a statistical analysis, the normal distribution is usually used as a model of a phenomenon. Then, it is important to verify whether or not a target phenomenon follows the normal distribution, therefore, a statistic that is a "kurtosis" is used for the verification. A value of the kurtosis is equal to 3 when the target phenomenon follows the normal distribution. In a distribution sharper than the normal distribution, a value of the kurtosis is greater than 3. Conversely, in a distribution broader than the normal distribution, a value of the kurtosis is less than 3. These relations are always correct regardless of a variance of the normal distribution.

Therefore, a shape change between a standard pattern matrix (or a standard pattern matrix layer) and an input pattern matrix (or an input pattern matrix layer) is replaced with shape changes of reference pattern vectors with values of the normal distribution as components. Moreover, amounts of the shape changes of the reference pattern vectors are numerically evaluated as amounts of changes in the kurtosis. Thus, it is possible to calculate, as a value of a geometric distance, a degree of the similarity between the standard pattern matrix (or the standard pattern matrix layer) and the input pattern matrix (or the input pattern matrix layer). However, generally, it is impossible to define a negative value as a vector component in an equation for calculating the kurtosis in the shape of the vector. Namely, it is necessary that each component value of the reference pattern vectors not be negative in any relation in size between the standard pattern matrix (or the standard pattern matrix layer) and the input pattern matrix (or the input pattern matrix layer).

Concretely, a normal distribution having a different variance for each specified component of the pattern matrix (or the pattern matrix layer) is prepared, a positive reference pattern vector with a value of the normal distribution as a component and a negative reference pattern vector with the value of the normal distribution as a component are previously prepared. Here, a method for calculating the variance according to the pattern matrix is the one, in which a centerline of the normal distribution is set so as to pass through a point of the specified component of the pattern matrix and to be vertical to a plane formed by the pattern matrix, and a principal portion of the normal distribution covers the entire pattern matrix when the normal distribution is rotated around the centerline as an axis. Moreover, a method for calculating the variance according to the pattern matrix layer is obtained by extending the method for calculating the variance with regard to the pattern matrix by one-dimension. (The method for calculating the variance with regard to the pattern matrix layer cannot be geometrically expressed.) Then, for each component of the pattern matrix (or the pattern matrix layer), processing is performed in the following manner. A length between the specified component and each component in the pattern matrix is obtained. And, the numbers of the components of the positive reference pattern vector and the negative reference pattern vector, the components being proximate to positions apart by the length from centers of the positive reference pattern vector and the negative reference pattern vector are calculated. Then, a component value of the component number of the positive reference pattern vector is increased by an absolute value of a difference therebetween when the component value of the input pattern matrix (or the input pattern matrix layer) is greater than the component value of the standard pattern matrix (or the standard pattern matrix layer). A component value of the component number of the negative reference pattern vector is increased when the foregoing component value of the input pattern matrix is smaller than the foregoing component value of the standard pattern matrix. Next, the kurtosis of the positive reference pattern vector with the shape changed is calculated, and the kurtosis of the negative vector with the shape changed is calculated, then a difference between the kurtosis of the positive vector and the kurtosis of the negative vector is calculated.

At every calculation of the difference of the kurtosis, the kurtosis of the positive reference pattern vector with the shape changed and the kurtosis of the negative reference pattern vector with the shape changed are different from each other according to a positional relation between the center of the normal distribution and each of the components of the standard pattern matrix and the input pattern matrix (or of the standard pattern matrix layer and the input pattern matrix layer). Thus, while moving the center of the normal distribution to the positions of the respective components of the pattern matrix (or the pattern matrix layer), values of the foregoing differences are obtained. And, a square root of a value that is a sum of squares of these differences or the sum of the squares itself is detected as a value of the geometric distance between the standard pattern matrix (or the standard pattern matrix layer) and the input pattern matrix (or the input pattern matrix layer).

The geometric distance value as described above precisely detects a shape change of the pattern matrix between the standard voice and the input voice, precisely detects a similarity between the standard vibration wave and the input vibration wave, and precisely detects a similarity between the standard image and the input image. Moreover, the geometric distance value precisely detects a shape change of the pattern matrix layer between the standard solid and the input solid. Furthermore, the geometric distance value precisely detects a similarity between the standard moving picture and the input moving picture.

Therefore, when the voice recognition is preformed by using the geometric distance value obtained as described above, since it is possible to precisely detect the shape change between the standard pattern matrix and the input pattern matrix, it is possible to significantly raise the precision of the voice recognition. Moreover, when the detection for an abnormality in a machine is performed by using the geometric distance value as described above, since it is possible to precisely detect the shape change between the standard pattern matrix and the input pattern matrix, it is possible to significantly raise the precision of the detection for an abnormality in a machine. Furthermore, when the image recognition is performed by using the geometric distance value as described above, since it is possible to precisely detect the shape change between the standard pattern matrix and the input pattern matrix, it is possible to significantly raise the precision of the image recognition. Still further, when the solid recognition is performed by using the geometric distance value as described above, since it is possible to precisely detect the shape change between the standard pattern matrix layer and the input pattern matrix layer, it is possible to significantly raise the precision of the solid recognition. Yet further, when the moving picture recognition is performed by using the geometric distance value as described above, since it is possible to precisely detect the shape change between the standard pattern matrix layer and the input pattern matrix layer, it is possible to significantly raise the precision of the moving picture recognition.

The above description is adaptive to any reference shape such as a rectangle including the normal distribution.

[Embodiment]

Hereinbelow, description will be made for an embodiment of the preset invention with reference to the accompanying drawings. In this embodiment, description will be sequentially made for a method for recognizing a voice, a method for judging an abnormality in a machine and a method for recognizing an image, each using a detected value of a similarity between (two-dimensional) two pattern matrices, and a method for recognizing a solid and a method for recognizing a moving picture, each using a detected value of a similarity between (three-dimensional) two pattern matrix layers.

(I) Method for Recognizing Voice

Description will be made for a method for detecting a similarity between voices and a method for recognizing a voice by use of the detected value. In this embodiment, for recognizing a voice, a change with time of a frequency distribution of the voice, that is, a voiceprint is normalized, and a standard pattern matrix and an input pattern matrix are prepared. Then, a shape change between these pattern matrices is replaced with shape changes of reference pattern vectors with values of a normal distribution as components, and sizes of the shape changes of the reference pattern vectors are numerically evaluated as amounts of changes in kurtosis. Thus, the similarity between the voices is detected. Furthermore, the voice is recognized by use of the detected value.

FIG. 1 shows a configuration of a measurement apparatus for detecting a similarity between voices. A reference numeral 1 denotes a microphone. The microphone 1 is disposed at a predetermined position near a person uttering a voice. The microphone 1 measures a voice uttered by a human being and outputs the voice as a signal. The output signal from the microphone 1 is inputted to a plurality ($m_1$ pieces) of band-pass filters 2 having passbands different from one to another. Then, each voice wave signal having a frequency component corresponding to each band-pass filter 2 is extracted, and given to each A/D converter 3. These signals are converted to digital signals cyclically at the same time in the A/D converter 3, and given to a processor 4 such as a computer. The processor 4 is constructed to detect a similarity between voices based on the output signal from the microphone 1 in the following manner. Here, a central frequency of an $i_1$-th ($i_1$=1, 2, . . . , $m_1$) band-pass filter 2 is set at $fi_1$, and the output signal of the $i_1$-th band-pass filter 2 is inputted to an $i_1$-th A/D converter 3.

Next, description will be made for a processing procedure for detecting the similarity between the voices by use of the measuring apparatus of FIG. 1.

Figure 2:
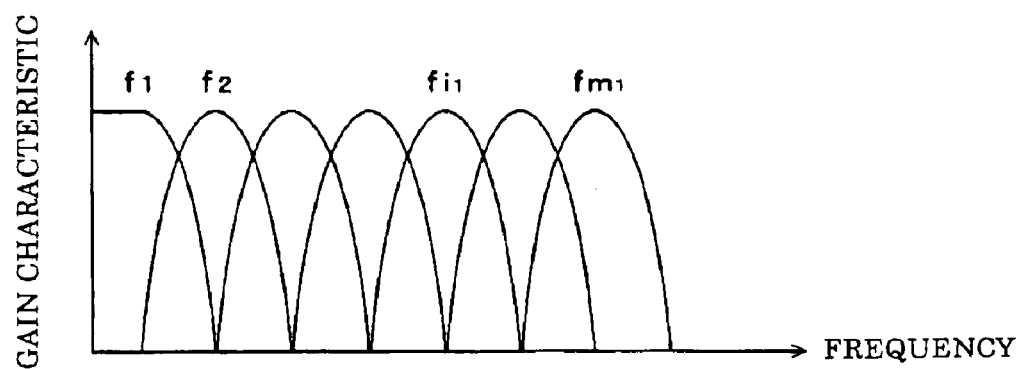
FIG. 2 is a graph showing one example of a frequency gain characteristic of a group of band-pass filters.

While many kinds of methods for extracting a power spectrum of a voice have been developed, in this embodiment, the processing procedure will be described for the case where a method using a group of analog band-pass filters is employed. The method has been used for a long time and a performance in the method is stable. FIG. 2 shows an example of a frequency gain characteristic of the group of the band-pass filters 2. It is understood that a frequency component having a band of which central frequency is $fi_1$ can be extracted by inputting the voice into the $i_1$-th band-pass filter. If each band-pass filter is constructed in the above manner, it is possible to extract a feature of a frequency distribution of the voice.

Figure 3:
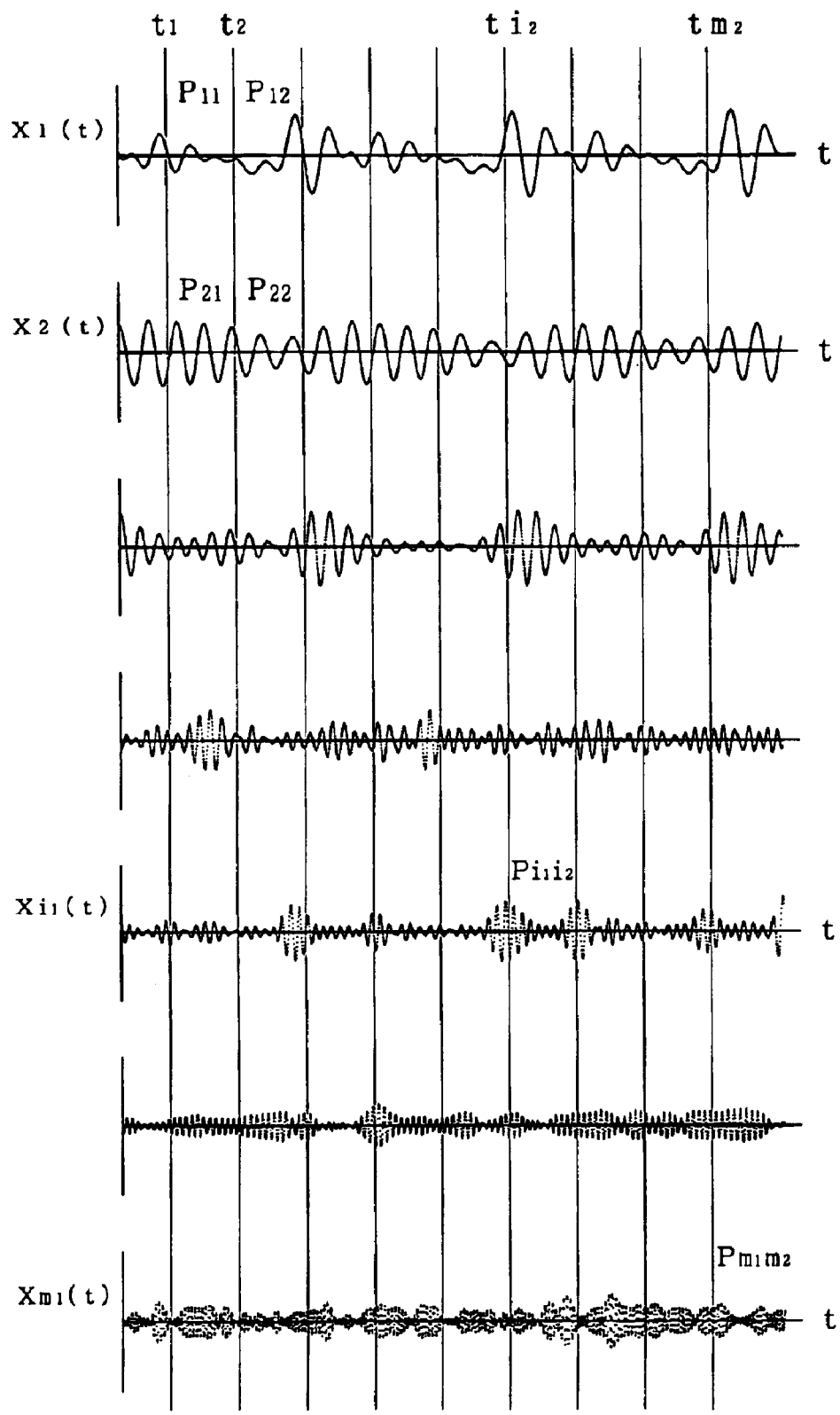
FIG. 3 is graphs for explaining a method for extracting features of changes of power spectrums with time from frequency component waves of the voice or the vibration wave through the band-pass filters.

As shown in FIG. 1, assuming that the output signal from the $i_1$-th A/D converter 3 is $xi_1(t)$ ($i_1=1, 2, \ldots, m_1$) as a function of time t, the function $xi_1(t)$ is a frequency component wave of the voice extracted by the $i_1$-th band-pass filter 2. FIG. 3 shows an example of the function $xi_1(t)$. As shown in FIG. 3, assuming that an $i_2$-th time is $ti_2$ ($i_2=1, 2, \ldots, m_2$), the function $xi_1(t)$ is measured individually for each time, thus it is possible to extract a feature of a change with time of the frequency distribution of the voice. Therefore, a power spectrum $Pi_1i_2$ at the $i_2$-th time in the $i_1$-th frequency band can be calculated by the following equation 1, in which a time length T for calculating a sum of squares of the function $xi_1(t)$ is arbitrarily set so that a feature of the voice, which changes according to time, can remarkably appear.

[Equation 1]

$$Pi_1 i_2 = \sum_{t=ti_2}^{ti_2+T} \{X i_1(t)\}^2 \quad (1)$$

$$(i_1 = 1, 2, 3, \ldots, m_1)$$

$$(i_2 = 1, 2, 3, \ldots, m_2)$$

In this embodiment, a normalized power spectrum is used. Namely, generally in the detection of a similarity between voices, a tone quality is often a factor more important than a volume. In such a case, it is important to detect a shape change of the power spectrum. For this purpose, it is convenient to use the power spectrum obtained by normalizing the power spectrum $Pi_1i_2$ of the equation 1 with a total energy. The normalized power spectrum $pi_1i_2$ at the $i_2$-th time in the $i_1$-th frequency band can be calculated by the following equation 2.

[Equation 2]

$$pi_1 i_2 = \frac{Pi_1 i_2}{\sum_{j1=1}^{m1} \sum_{j2=1}^{m2} Pj_1 j_2} \quad (2)$$

$$(i_1 = 1, 2, 3, \ldots, m_1)$$

$$(i_2 = 1, 2, 3, \ldots, m_2)$$

Figure 4A:
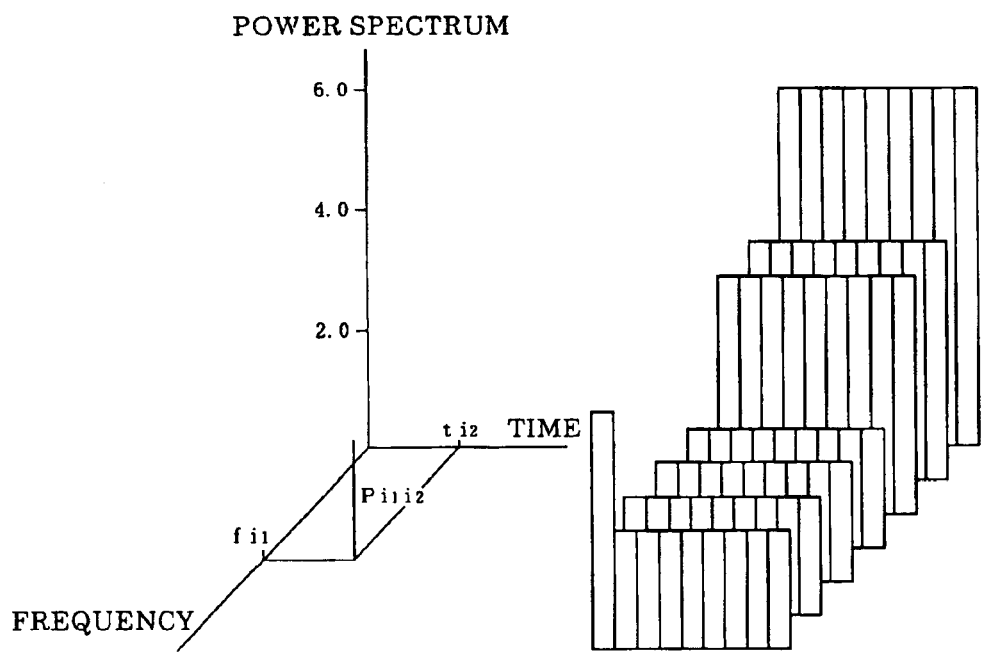
FIG. 4A is diagrams showing one example of a power spectrum.
Figure 4B:
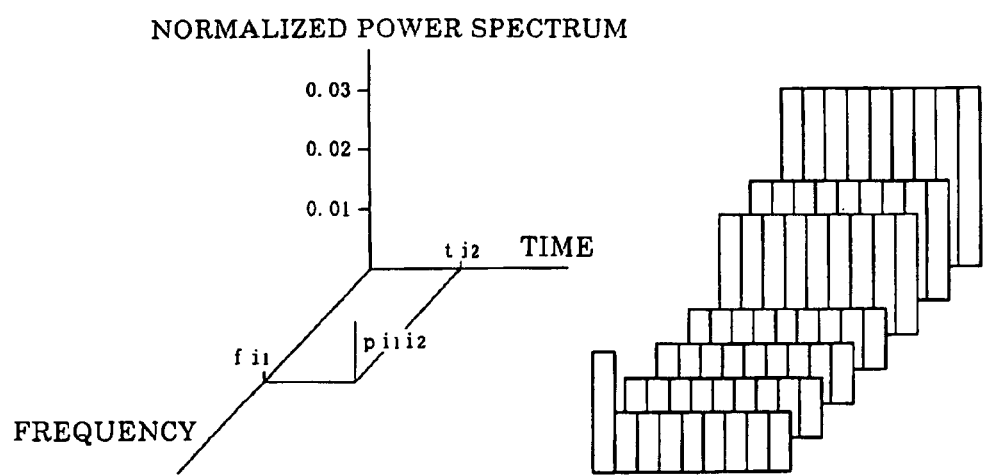
FIG. 4B is diagrams showing a normalized power spectrum of FIG. 4A.

FIG. 4A shows an example of the power spectrum calculated by the equation 1, and FIG. 4B shows a power spectrum obtained by normalizing the power spectrum of FIG. 4A by the equation 2. As shown in the figures, it is understood that the power spectrum and the normalized power spectrum are similar to each other.

Next, a standard pattern matrix H and an input pattern matrix N are produced. The standard pattern matrix H has a normalized power spectrum $pi_1i_2$ ($i_1=1, 2, \ldots, m_1$) ($i_2=1, 2, \ldots, m_2$) of the standard voice as a component, and the input pattern matrix N has a normalized power spectrum $pi_1i_2$ ($i_1=1, 2, \ldots, m_1$) ($i_2=1, 2, \ldots, m_2$) of the input voice as a component. The standard pattern matrix H and the input pattern matrix N are expressed as shown in the following equation 3. The equation 3 expresses shapes of the normalized power spectrums of the standard voice and the input voice by $m_1 \times m_2$ pieces of component values of the pattern matrices.

[Equation 3]

$$H = \begin{bmatrix} h11 & h12 & \ldots & h1i_2 & \ldots & h1m_2 \\ h21 & h22 & \ldots & h2i_2 & \ldots & h2m_2 \\ \vdots & \vdots & & \vdots & & \vdots \\ hi_1 1 & hi_1 2 & \ldots & hi_1 i_2 & \ldots & hi_1 m_2 \\ \vdots & \vdots & & \vdots & & \vdots \\ hm_1 1 & hm_1 2 & \ldots & hm_1 i_2 & \ldots & hm_1 m_2 \end{bmatrix} \quad (3)$$

$$N = \begin{bmatrix} n11 & n12 & \ldots & n1i_2 & \ldots & n1m_2 \\ n21 & n22 & \ldots & n2i_2 & \ldots & n2m_2 \\ \vdots & \vdots & & \vdots & & \vdots \\ ni_1 1 & ni_1 2 & \ldots & ni_1 i_2 & \ldots & ni_1 m_2 \\ \vdots & \vdots & & \vdots & & \vdots \\ nm_1 1 & nm_1 2 & \ldots & nm_1 i_2 & \ldots & nm_1 m_2 \end{bmatrix}$$

Figure 6:
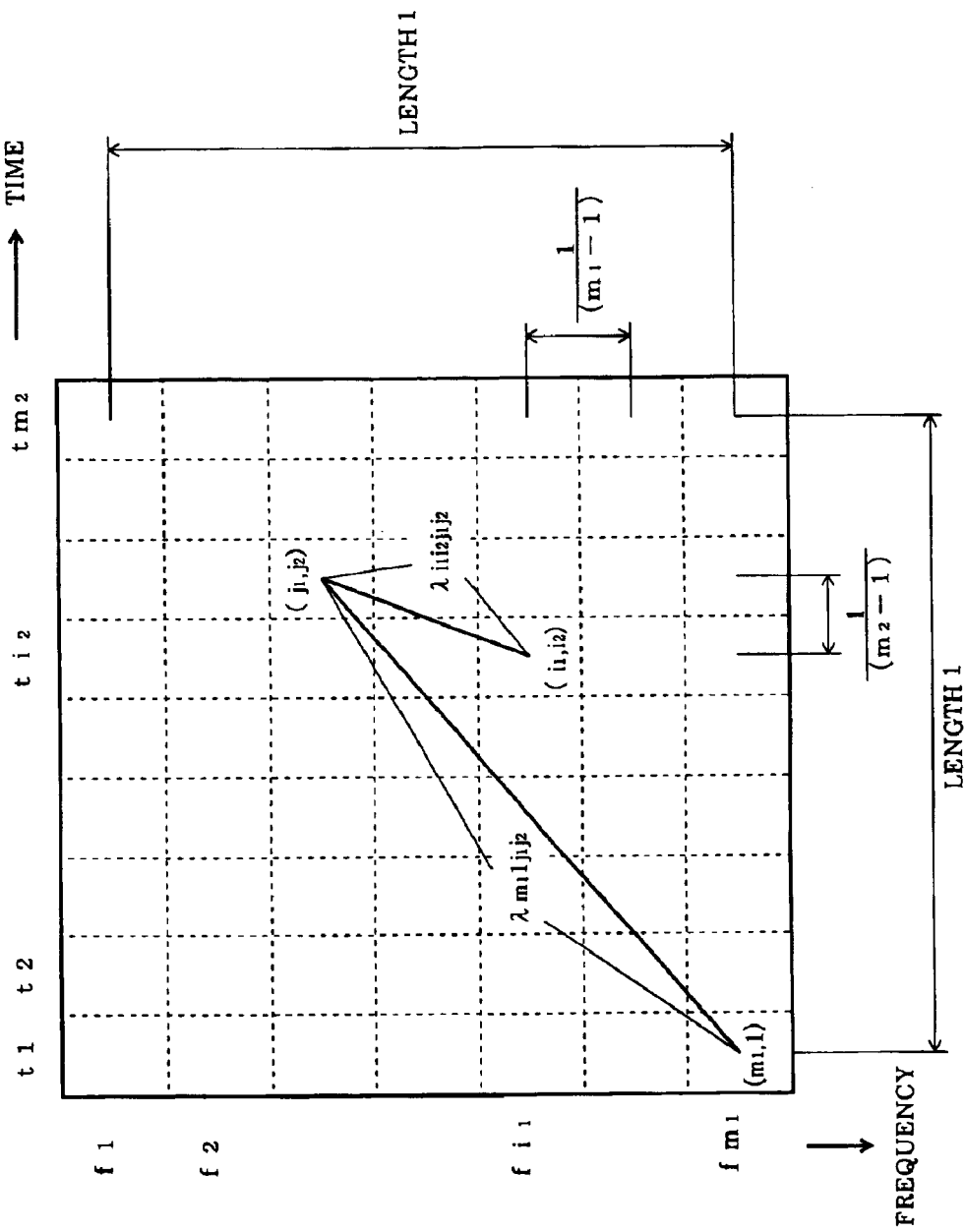
FIG. 6 is a diagram showing a (frequency-time)-normalized plane.

FIG. 5A shows the standard pattern matrix H expressed on a (frequency-time) plane, and FIG. 5B shows the input pattern matrix N expressed on the plane. Moreover, FIG. 6 shows a (frequency-time)-normalized plane, in which a longitudinal length and a lateral length of each plane of FIGS. 5A and 5B are set as 1, respectively. In this embodiment, in the case which bandwidths of the frequency bands shown in FIG. 2 are different from each other, FIG. 6 is constructed so that the elements of the power spectrum are allocated in the same pitch. Accordingly, as shown in FIG. 6, a longitudinal length between the components is represented as: $1/(m_1-1)$, and a lateral length between the components is represented as: $1/(m_2-1)$.

The following equation 4 is an equation for a probability density function of the normal distribution, where $\mu$ indicates a mean value and $\sigma^2$ indicates a variance.

[Equation 4]

$$f(y) = \frac{1}{\sigma\sqrt{2\pi}} \exp\left\{-\frac{1}{2}\left(\frac{y-\mu}{\sigma}\right)^2\right\} \quad (4)$$

Figure 7A:
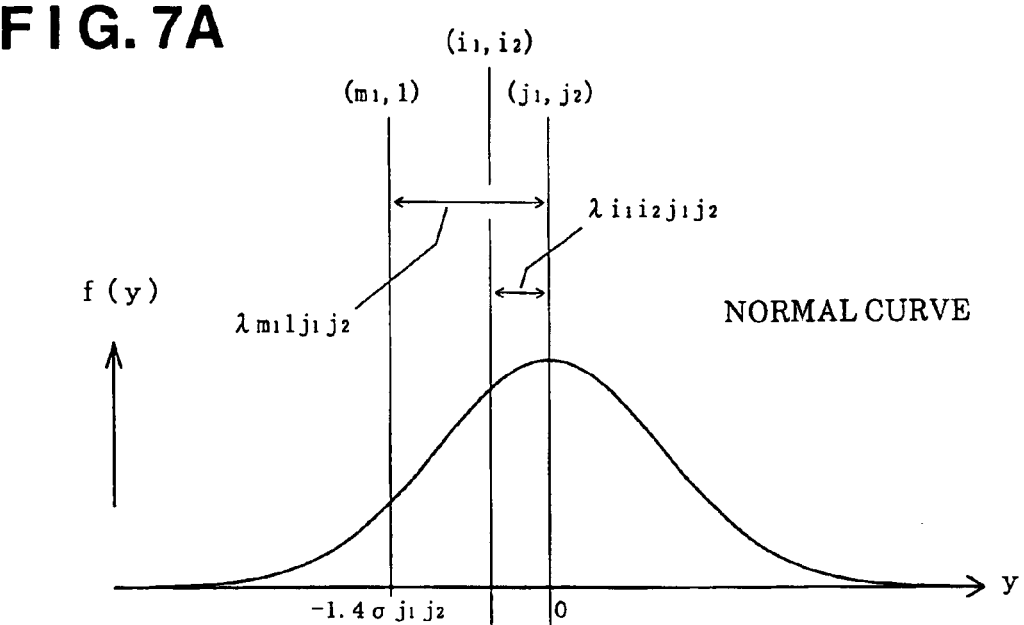
FIG. 7A is a graph showing a normal curve.
Figure 7B:
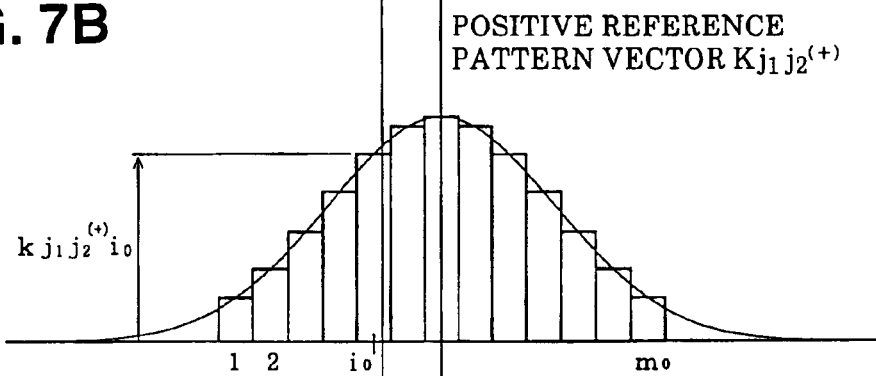
FIG. 7B is a graph showing a positive reference pattern vector with a value of the normal curve as a component.
Figure 7C:
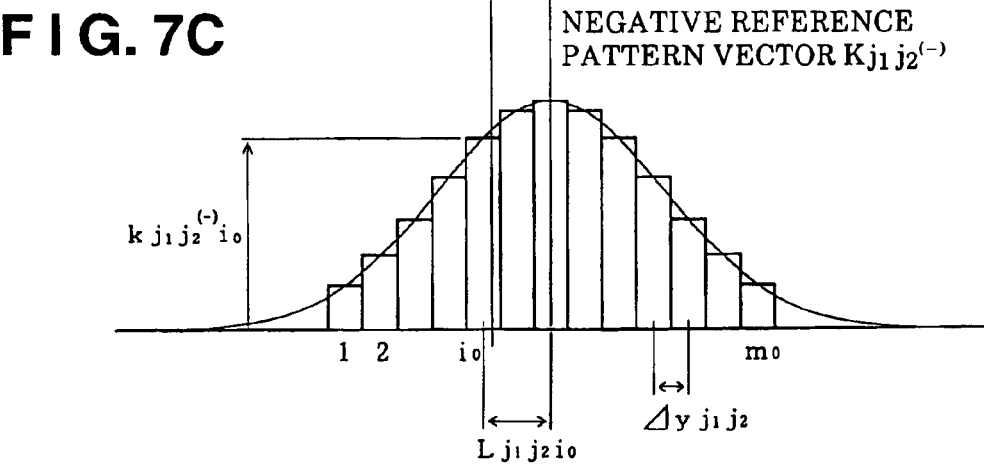
FIG. 7C is a graph showing a negative reference pattern vector with the value of the normal curve as a component.

FIG. 7A is a graph of the normal distribution (a normal curve) expressed by the equation 4, where the mean value $\mu=0$, and the variance is $\sigma j_1 j_2{}^2$. And in FIGS. 7B and 7C, bar graphs of which heights are equal to the function value of the normal curve are shown. A positive reference pattern vector $Kj_1j_2{}^{(+)}$ having a height value of the bar graph as a component is prepared as shown in FIG. 7B. A negative reference pattern vector $Kj_1j_2{}^{(-)}$ having a height value of the bar graph as a component is prepared as shown in FIG. 7C. These vectors are expressed as in the equation 5. The equation 5 expresses each shape of the normal distribution by $m_0$ pieces of component values of the vector. While the equation 3 expresses (two-dimensional) matrices, the equation 5 expresses (one-dimensional) vectors. As understood from FIGS. 7A to 7C, a pair of these reference pattern vectors $Kj_1j_2{}^{(+)}$ and $Kj_1j_2{}^{(-)}$ are originally of the same vector. Note that the index $j_1j_2$ in the equation 5 corresponds to the point $(j_1, j_2)$ shown in FIG. 6, and that $m_0$ in the equation 5 may be an arbitrary natural number different from $m_1$ and $m_2$ in the equation 3.

[Equation 5]

$$Kj_1j_2^{(+)} = (kj_1j_2^{(+)}1, kj_1j_2^{(+)}2, \ldots, kj_1j_2^{(+)}i_0, \ldots, kj_1j_2^{(+)}m_0)$$

$$Kj_1j_2^{(-)} = (kj_1j_2^{(-)}1, kj_1j_2^{(-)}2, \ldots, kj_1j_2^{(-)}i_0, \ldots, kj_1j_2^{(-)}m_0)$$

$$(j_1=1, 2, 3, \ldots, m_1)$$

$$(j_2=1, 2, 3, \ldots, m_2) \quad (5)$$

The mean value $\mu$ and the variance $\sigma j_1 j_2^2$ of the normal distribution may be set at arbitrary values in a range where a feature in the shape of the normal distribution can be expressed by the $m_0$ pieces of component values of the vector. In this embodiment, it is assumed that the mean value is at a central position in the components of the reference pattern vector and the variance is equal to a value described below. Moreover, while it is assumed that the number $m_0$ is an odd number in this embodiment, the same discussion holds also in the case where the number $m_0$ is an even number.

Figure 8:
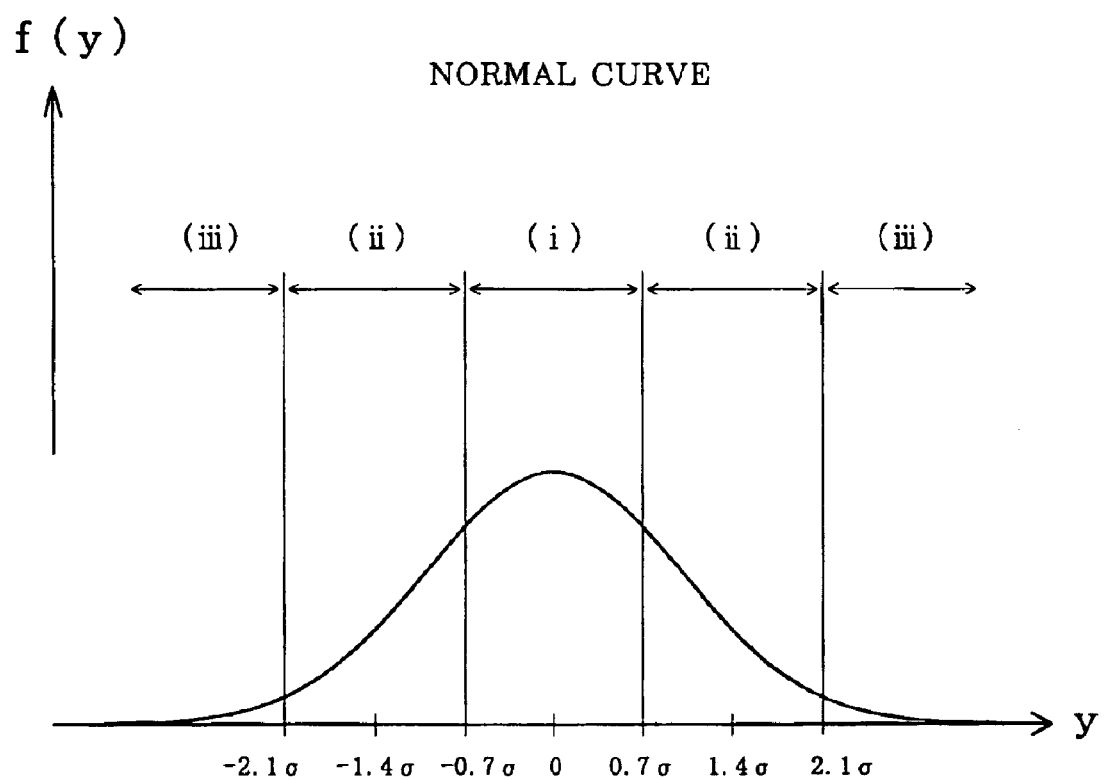
FIG. 8 is a graph showing a relation between a shape change and a kurtosis value of the normal curve.

FIG. 8 shows the normal curve of the equation 4, where the mean value $\mu=0$ and the variance is $\sigma^2$. A value of the kurtosis is equal to 3. Here, when a value of f(y) is increased to be larger than the value of the normal curve in a range of y indicated by a reference code (i) in FIG. 8, the value of the kurtosis is greater than 3. And when the value of f(y) is increased to be larger than the value of the normal curve in each range of y indicated by a reference code (ii), the value of the kurtosis is smaller than 3. Moreover, when the value of f(y) is increased to be larger than the value of the normal curve in a point of y in a boundary between the ranges indicated by the codes (i) and (ii) (vicinity of a point where y=−0.7σ or y=+0.7σ), an amount of change in the value of the kurtosis is small, and the value of the kurtosis falls in a value nearly equal to 3. Meanwhile, when the value of f(y) is increased to be larger than the value of the normal curve in each range of y indicated by a reference code (iii), the value of the kurtosis becomes unstable, that is, sometimes greater than 3, and sometimes smaller than 3. These relations are always correct regardless of the value of the variance $\sigma^2$ of the normal distribution.

Therefore, when the shape change between the standard pattern matrix and the input pattern matrix is replaced with the shape changes of the reference pattern vectors with the values of the normal distribution as components, and the sizes of the shape changes of the reference pattern vectors are numerically evaluated as amounts of changes in the kurtosis, the value of f(y) is set to be increased in a range of: −2.1σ≦y≦+2.1σ (a range of y indicated by the codes (i) and (ii) in FIG. 8). Then, the value of the kurtosis is stable. In this embodiment, a range of: −1.4σ≦y≦+1.4σ is used so that the range of y where the value of the kurtosis is greater than 3 and the range of y where the value of the kurtosis is smaller than 3 can be in a ratio approximately equal to each other.

Meanwhile, in FIG. 6, the point $(j_1, j_2)$ and the point $(i_1, i_2)$ on the (frequency-time)-normalized plane are shown. Moreover, the farthest point $(m_1, 1)$ from the point $(j_1, j_2)$ among all of the points on the plane is also shown. Accordingly, a length $\lambda i_1 i_2 j_1 j_2$ between the point $(j_1, j_2)$ and the point $(i_1, i_2)$ can be calculated by the following equation 6. Similarly, a length $\lambda m_1 1 j_1 j_2$ between the point $(j_1, j_2)$ and the point $(m_1, 1)$ can be calculated by the following equation 7. The length $\lambda m_1 1 j_1 j_2$ is the maximum value between the point $(j_1, j_2)$ and each point.

[Equation 6]

When $i_1=1, 2, 3, \ldots, m_1$, and $i_2=1, 2, 3, \ldots, m_2$;

$$\lambda i_1 i_2 j_1 j_2 = \sqrt{\left\{\frac{(i_1 - j_1)}{(m_1 - 1)}\right\}^2 + \left\{\frac{(i_2 - j_2)}{(m_2 - 1)}\right\}^2} \quad (6)$$

$$(j_1 = 1, 2, 3, \ldots, m_1)$$

$$(j_2 = 1, 2, 3, \ldots, m_2)$$

[Equation 7]

$$\lambda m_1 1 j_1 j_2 = \sqrt{\left\{\frac{(m_1 - j_1)}{(m_1 - 1)}\right\}^2 + \left\{\frac{(1 - j_2)}{(m_2 - 1)}\right\}^2} \quad (7)$$

$$(j_1 = 1, 2, 3, \ldots, m_1)$$

$$(j_2 = 1, 2, 3, \ldots, m_2)$$

Figure 9:
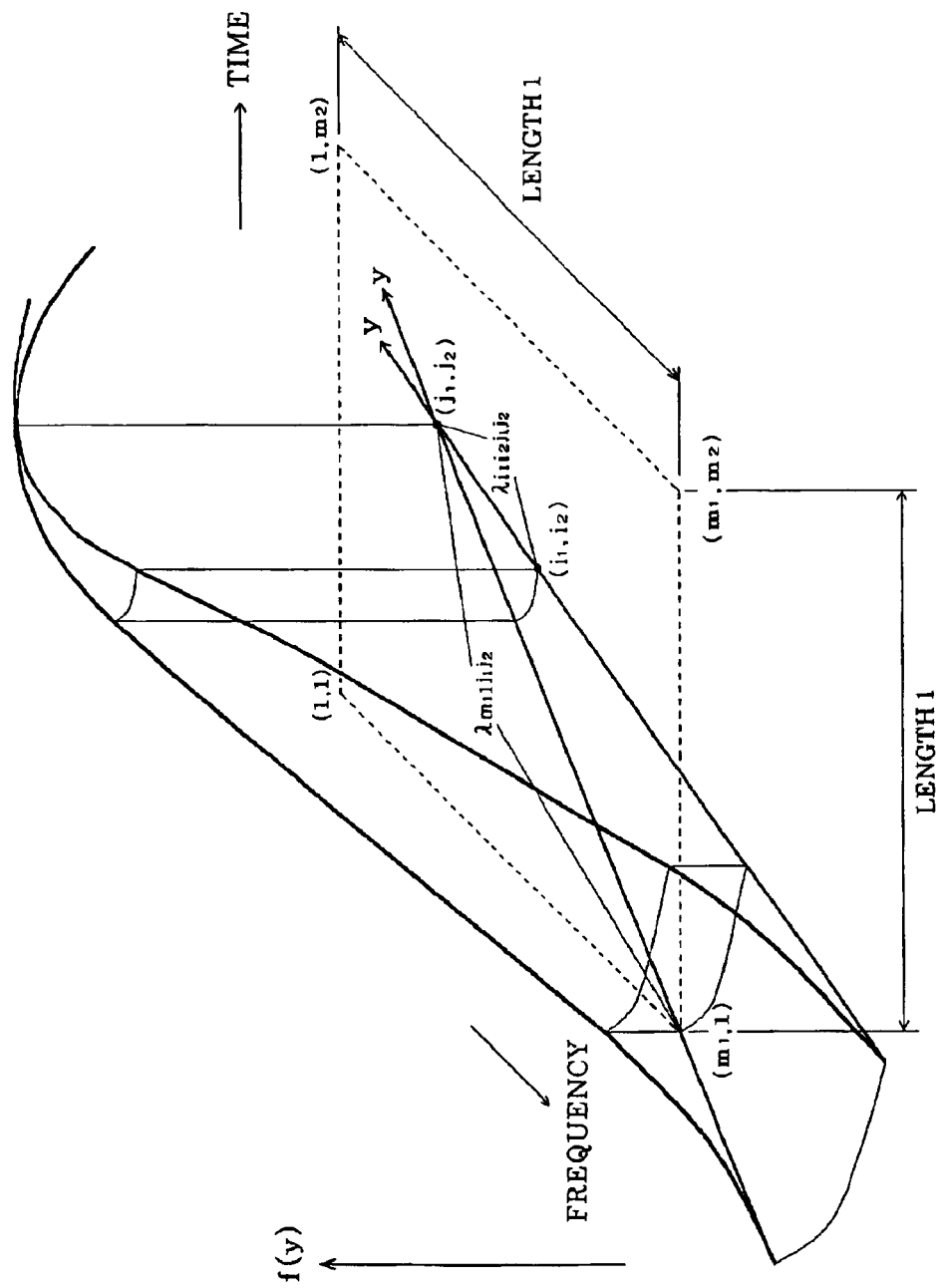
FIG. 9 is a graph showing the (frequency-time)-normalized plane three-dimensionally.

FIG. 9 three-dimensionally shows the (frequency-time)-normalized plane shown in FIG. 6. FIG. 9 shows a normal curve, of which centerline of the normal distribution passes the point $(j_1, j_2)$ and is vertical to the (frequency-time)-normalized plane, and of which y-axis of the normal distribution passes the point $(m_1, 1)$. Moreover, FIG. 9 also shows a normal curve, of which centerline of the normal distribution passes the point $(j_1, j_2)$ and is vertical to the foregoing plane, and of which y-axis of the normal distribution passes the point $(i_1, i_2)$. It is assumed that the variances $\sigma j_1 j_2^2$ of the two normal curves have values equal to each other. Hence, when the two normal curves are rotated around the centerline as an axis, the normal curves coincide with each other.

Moreover, the normal curve shown in FIG. 7A two-dimensionally shows the two normal curves shown in FIG. 9 in a superposed manner. In FIG. 7A, the point $(j_1, j_2)$ is made to correspond to y=0, and the point $(m_1, 1)$ is made to correspond to y=−1.4σ$j_1 j_2$. Accordingly, the point $(i_1, i_2)$ will correspond to y between y=0 and y=−1.4σ$j_1 j_2$.

Moreover, the length $\lambda m_1 1 j_1 j_2$ between the point $(j_1, j_2)$ and the point $(m_1, 1)$ can be calculated by the equation 7. This length is also a length between 0 and −1.4σ$j_1 j_2$ on the y-axis shown in FIG. 7A. Accordingly, the value of the variance in the normal distribution can be calculated by the following equation 8.

[Equation 8]

$$\sigma j_1 j_2 = \frac{\lambda m_1 1 j_1 j_2}{1.4} \quad (8)$$

$$(j_1 = 1, 2, 3, \ldots, m_1)$$

$$(j_2 = 1, 2, 3, \ldots, m_2)$$

If the value of the variance in the normal distribution is calculated by the foregoing method, the principal components in the normal distribution (in the range of: −1.4σ≦y≦+1.4σ in the case of the equation 8) can cover the entire (frequency-time)-normalized plane. Specifically, the value of the variance in the normal distribution, which is obtained by the equation 8, is applied to the equation 4, thus the normal curve is determined. Moreover, the value is applied to FIGS. 7B and 7C and the equation 5, thus the positive reference pattern vector $Kj_1 j_2^{(+)}$ and the negative reference pattern vector $Kj_1 j_2^{(-)}$ can be prepared.

Here, while the $j_1 j_2$ component as a specified component of the pattern matrix is fixed by a pair of values among the values $j_1=1$ to $m_1$ and $j_2=1$ to $m_2$, each $i_1 i_2$ component ($i_1=1, 2, \ldots, m_1$) ($i_2=1, 2, \ldots, m_2$) is considered. A length $\lambda i_1 i_2 j_1 j_2$ between the point $(j_1, j_2)$ and the point $(i_1, i_2)$ can be calculated by the equation 6. The length $\lambda i_1 i_2 j_1 j_2$ is also a value of deviation from the mean value of the normal distribution as shown in FIG. 7A.

Meanwhile, when each interval between the adjacent components of the reference pattern vector is set as $\Delta y j_1 j_2$ as shown in FIG. 7C, a deviation value $L j_1 j_2 i_0$ from the mean value of the normal distribution, which corresponds to a component number $i_0$ ($i_0=1, 2, \ldots, m_0$), can be calculated by the following equation 9. Note that it is assumed here that each interval between the adjacent components of the reference pattern vector is equal to the other. Moreover, in the equation 9, $(m_0+1)/2$ is a component number of the center of the reference pattern vector.

[Equation 9]

$$L j_1 j_2 i_0 = \left| i_0 - \frac{m_0 + 1}{2} \right| \times \Delta y j_1 j_2 \quad (9)$$

$$(i_0 = 1, 2, 3, \ldots, m_0)$$
$$(j_1 = 1, 2, 3, \ldots, m_1)$$
$$(j_2 = 1, 2, 3, \ldots, m_2)$$

In FIGS. 7A, 7B and 7C, a relation between the foregoing values $\lambda i_1 i_2 j_1 j_2$ and $L j_1 j_2 i_0$ is shown. FIG. 7A shows that the value $\lambda i_1 i_2 j_1$ length between the point $(j_1, j_2)$ and the point $(i_1, i_2)$. And, FIG. 7B and 7C show the following. Specifically, $i_0$ is the number of a component of each of the positive reference pattern vector and the negative reference pattern vector, the component being proximate to a position apart from the center of each of the positive reference pattern vector and the negative reference pattern vector by the length $\lambda i_1 i_2 j_1 j_2$. Moreover, $L j_1 j_2 i_0$ is a deviation value from the mean value of the normal distribution, which corresponds to the component number $i_0$.

Specifically, when the $j_1 j_2$ component and the $i_1 i_2$ component of the pattern matrix are given, the length $\lambda i_1 i_2 j_1 j_2$ between the two points thereof is calculated by the equation 6. Next, with regard to the reference pattern vectors, obtained are the component number $i_0$, the deviation value $L j_1 j_2 i_0$ from the mean value of the normal distribution and the component values $k j_1 j_2^{(+)} i_0$ and $k j_1 j_2^{(-)} i_0$.

If the number $m_0$ of components of the reference pattern vector is sufficiently increased, specifically, if the interval $\Delta y j_1 j_2$ is sufficiently shortened, an error between the value of $\lambda i_1 i_2 j_1 j_2$ and the value of $L j_1 j_2 i_0$ can be sufficiently reduced, thus a highly precise calculation result is obtained. Moreover, since the component number $i_0$ and the component number $(m_0-i_0+1)$ are symmetrical with respect to the mean value of the normal distribution, the component number $(m_0-i_0+1)$ may be used instead of the component number $i_0$.

Next, a shape change between the standard pattern matrix H and the input pattern matrix N is replaced with shape changes of the positive reference pattern vector $K j_1 j_2^{(+)}$ and the negative reference pattern vector $K j_1 j_2^{(-)}$. Specifically, with regard to the $i_1 i_2$ component ($i_1=1, 2, \ldots, m_1$) ($i_2=1, 2, \ldots, m_2$) of the pattern matrix, an attention is paid to an absolute value $|n i_1 i_2 - h i_1 i_2|$ of the amount of change between the component value $h i_1 i_2$ of the standard pattern matrix H and the component value $n i_1 i_2$ of the input pattern matrix N. Then, as shown in the following equation 10, the component value $k j_1 j_2^{(+)} i_0$ of the positive reference pattern vector $K j_1 j_2^{(+)}$ is increased by the absolute value $|n i_1 i_2 - h i_1 i_2|$ of the amount of change when the component value $n i_1 i_2$ is greater than the component value $h i_1 i_2$. When the component value $n i_1 i_2$ is smaller than the component value $h i_1 i_2$, the component value $k j_1 j_2^{(-)} i_0$ of the negative reference pattern vector $K j_1 j_2^{(-)}$ is increased by the absolute value $|n i_1 i_2 - h i_1 i_2|$ of the amount of change.

[Equation 10]

When $i_1=1, 2, 3, \ldots, m_1$ and $i_2=1, 2, 3, \ldots, m_2$;

if $n i_1 i_2 > h i_1 i_2$, $k j_1 j_2^{(+)} i_0$ is increased by $|n i_1 i_2 - h i_1 i_2|$, if $n i_1 i_2 < h i_1 i_2$, $k j_1 j_2^{(-)} i_0$ is increased by $|n i_1 i_2 - h i_1 i_2|$.

$(j_1=1, 2, 3, \ldots, m_1)$ $(j_2=1, 2, 2, \ldots, m_2)$ (10)

Accordingly, if the value of the variance of the normal distribution is calculated by the equation 8, and the component values $k j_1 j_2^{(+)} i_0$ and $k j_1 j_2^{(-)} i_0$ of the reference pattern vectors are increased by the equation 10, then, for every combination of the $j_1 j_2$ components and the $i_1 i_2$ components of the pattern matrix, the value of f(y) can be increased in the range of: $-1.4\sigma \leq y \leq +1.4\sigma$.

Next, description will be made for the equation 10 with reference to typical examples shown in pattern diagrams of FIGS. 10 to 16. Each diagram denoted by a code A and each diagram denoted by a code B in FIGS. 10 to 16 express the $m_1 \times m_2$ pieces of component values of the pattern matrix as a shape of the matrix by the diagram. Each diagram denoted by a code C in FIGS. 10 to 16 expresses the $m_0$ pieces of component values of the reference pattern vector as a shape of the vector by the diagram. Note that, in the case where a power spectrum of only one component in the entire pattern matrix is increased, when normalization is performed by the equation 2, a normalized power spectrum of each of other components is relatively decreased according to the increase of such a normalized power spectrum of the component. However, in FIGS. 10 to 16, an increase or a decrease is indicated only at a noticed component in the input pattern matrix shape, and any change in the other components is not indicated for simplicity and easy understanding. Moreover, the shape of the negative reference pattern vector is indicated upside down for facilitating a comparison thereof with the shape of the positive reference pattern vector.

Description of FIGS. 10 to 16 will be made below for the case where the $j_1 j_2$ component as a specified component of the pattern matrix is fixed to the position shown in FIGS. 6 and 9 and the centerline of the normal distribution passes the $j_1 j_2$ component.

(1) FIGS. 10A to 10C show the case where a shape in a standard pattern matrix and a shape in an input pattern matrix are equal to each other. In this case, the positive reference pattern vector and the negative reference pattern vector are the same as that of a normal distribution.

Figure 11A:
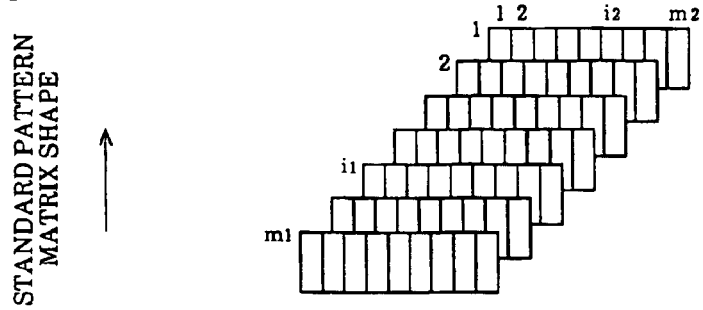
FIG. 11A is a pattern diagram showing the typical example of the shape in the standard pattern matrix, the shape being the same as that of FIG. 10A.
Figure 11B:
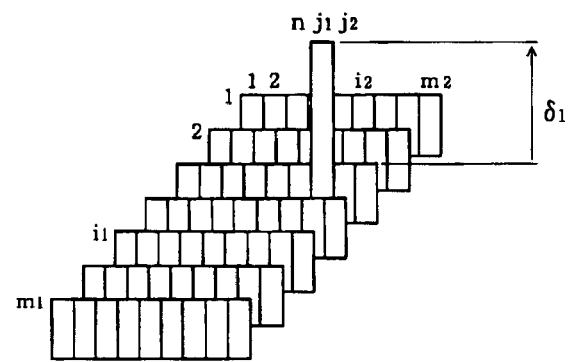
FIG. 11B is a pattern diagram showing a typical example of a shape in an input pattern matrix, the shape having a $j_1 j_2$ component increased than that of the shape in the standard pattern matrix, in the case of setting the $j_1 j_2$ component as a specified component of the pattern matrix.
Figure 11C:
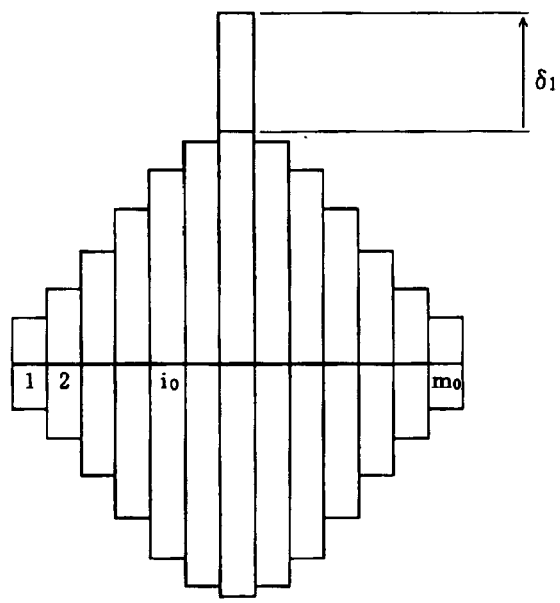
FIG. 11C is a diagram showing a shape change in a positive reference pattern vector when the $j_1 j_2$ component is increased and the shape in the negative reference pattern vector.

(2) FIGS. 11A to 11C show the case where only a $j_1 j_2$ component of a shape in an input pattern matrix is increased by $\delta_1$ than that of a shape in a standard pattern matrix. In this case, a center portion of a shape of a positive reference pattern vector is increased by $\delta_1$, but a shape of a negative reference pattern vector is not changed.

Figure 12A:
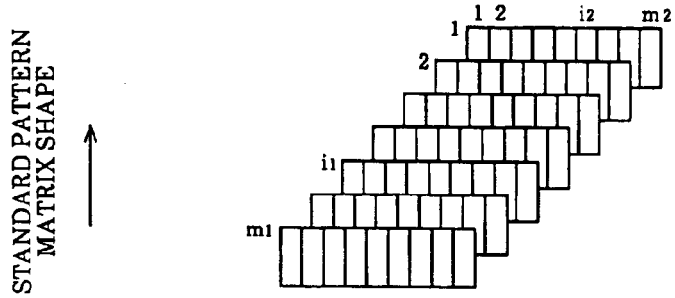
FIG. 12A is a pattern diagram showing the typical example of the shape in the standard pattern matrix, the shape being the same as that of FIG. 10A.
Figure 12B:
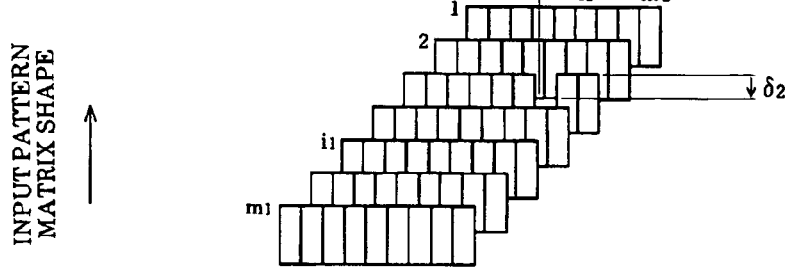
FIG. 12B is a pattern diagram showing a typical example of a shape in an input pattern matrix, the shape having a $j_1 j_2$ component decreased than that of the shape in the standard pattern matrix, in the case of setting the $j_1 j_2$ component as a specified component of the pattern matrix.
Figure 12C:
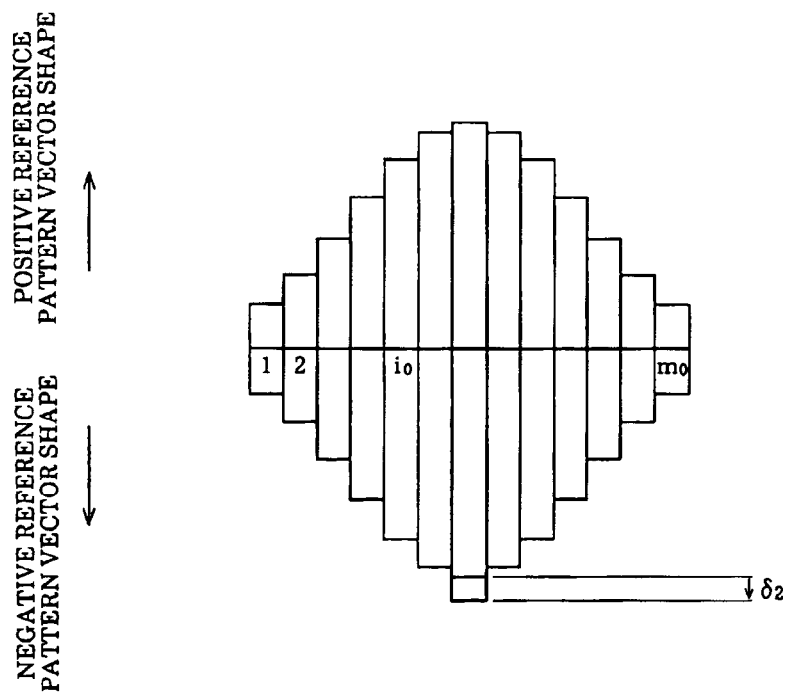
FIG. 12C is a diagram showing the shape in the positive reference pattern vector and a shape change in a negative reference pattern vector when the $j_1 j_2$ component is decreased.

(3) FIGS. 12A to 12C show the case where only a $j_1 j_2$ component of a shape in an input pattern matrix is decreased by $\delta_2$ than that of a shape in a standard pattern matrix. In this case, a shape of a positive reference pattern vector is not changed, but a center portion of a shape of a negative reference pattern vector is increased by $\delta_2$.

Figure 13A:
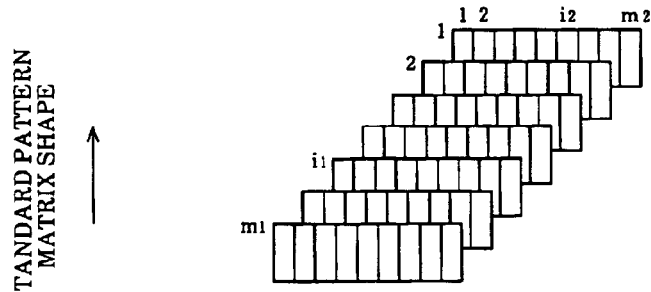
FIG. 13A is a pattern diagram showing the typical example of the shape in the standard pattern matrix, the shape being the same as that of FIG. 10A.
Figure 13B:
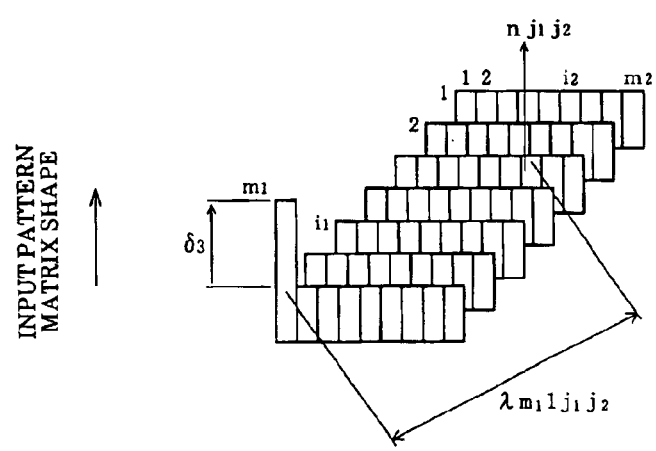
FIG. 13B is a pattern diagram showing a typical example of a shape in an input pattern matrix, the shape having an $m_1 1$ component increased than that of the shape in the standard pattern matrix, in the case of setting the $j_1 j_2$ component as a specified component of the pattern matrix.
Figure 13C:
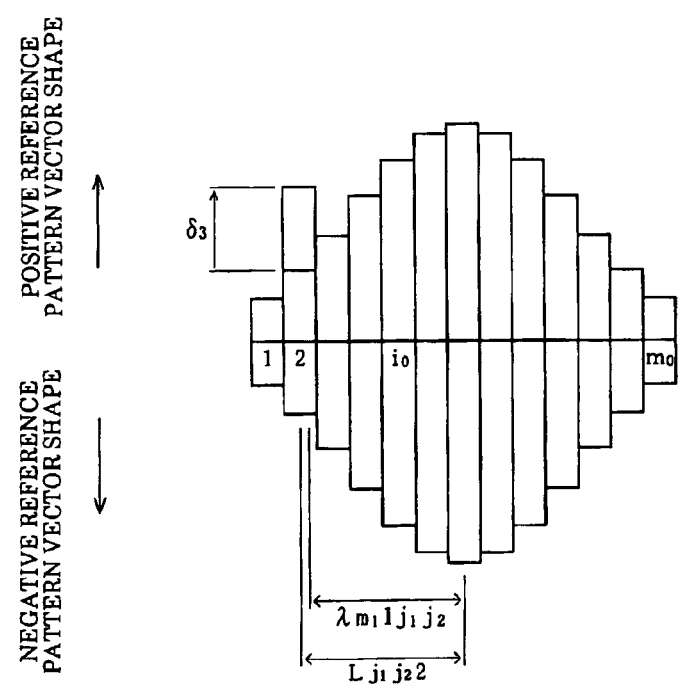
FIG. 13C is a diagram showing a shape change in a positive reference pattern vector when the $m_1 1$ component is increased and the shape in the negative reference pattern vector.

(4) FIGS. 13A to 13C show the case where only an $m_1 1$ component of a shape in an input pattern matrix is increased by $\delta_3$ than that of a shape in a standard pattern matrix. In this case, as shown in FIG. 13B, a length between a $j_1j_2$ component and the $m_1 1$ component is $\lambda m_1 1 j_1 j_2$. And as shown in FIG. 13C, a component of a shape in a positive reference pattern vector, which is proximate to a position apart by $\lambda m_1 1 j_1 j_2$ from a center of the shape in the positive reference pattern vector, is denoted by a component number 2. The component value of the component 2 in the shape of the positive reference pattern vector is increased by $\delta_3$. Meanwhile, the shape in the negative reference pattern vector is not changed.

(5) FIGS. 14A to 14C show the case where only an $m_1 1$ component of a shape in an input pattern matrix is decreased by $\delta_4$ than that of a shape in a standard pattern matrix. In this case, as shown in FIG. 14B, a length between a $j_1j_2$ component and the $m_1 1$ component is $\lambda m_1 1 j_1 j_2$. And as shown in FIG. 14C, a component of a shape in a negative reference pattern vector, which is proximate to a position apart by $\lambda m_1 1 j_1 j_2$ from a center of the shape in the negative reference pattern vector, has a component number 2. The component value of the component 2 in the shape of the negative reference pattern vector is increased by $\delta_4$. Meanwhile, the shape in the positive reference pattern vector is not changed.

Figure 15A:
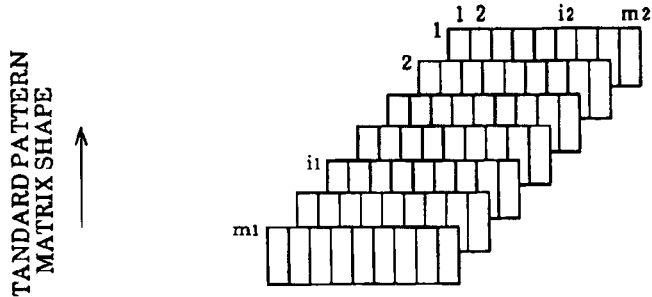
FIG. 15A is a pattern diagram showing the typical example of the shape in the standard pattern matrix, the shape being the same as that of FIG. 10A.
Figure 15B:
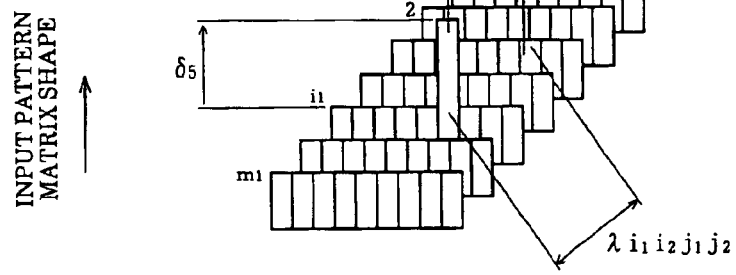
FIG. 15B is a pattern diagram showing a typical example of a shape in an input pattern matrix, the shape having an $i_1 i_2$ component increased than that of the shape in the standard pattern matrix, in the case of setting the $j_1 j_2$ component as a specified component of the pattern matrix.
Figure 15C:
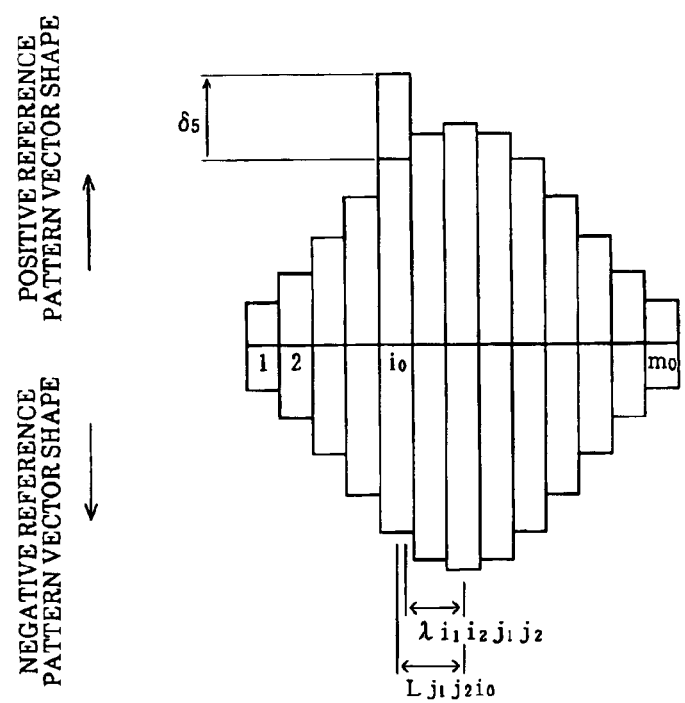
FIG. 15C is a diagram showing a shape change in a positive reference pattern vector when the $i_1 i_2$ component is increased and the shape in the negative reference pattern vector.

(6) FIGS. 15A to 15C show the case where only an $i_1 i_2$ component of a shape in an input pattern matrix is increased by $\delta_5$ than that of a shape in a standard pattern matrix. Also in this case, as shown in FIG. 15B, a length between a $i_1 i_2$ component and the $i_1 i_2$ component is $\lambda i_1 i_2 j_1 j_2$. And as shown in FIG. 15C, a component of a shape in a positive reference pattern vector, which is proximate to a position apart by $\lambda i_1 i_2 j_1 j_2$ from a center of the shape in the positive reference pattern vector, has a component number $i_0$. The component value of the component $i_0$ in the shape of the positive reference pattern vector is increased by $\delta_6$.

(7) FIGS. 16A to 16C shown the case where only an $i_1 i_2$ component of a shape in an input pattern matrix is decreased by $\delta_6$ than that of a shape in a standard pattern matrix. Also in this case, as shown in FIG. 16B, a length between a $i_1 i_2$ component and the $i_1 i_2$ component is $\lambda i_1 i_2 j_1 j_2$. And as shown in FIG. 16C, a component of a shape in a negative reference pattern vector, which is proximate to a position apart by $\lambda i_1 i_2 j_1 j_2$ from a center of the shape in the negative reference pattern vector, has a component number $i_0$. The component value of the component $i_0$ in the shape of the negative reference pattern vector is increased by $\delta_6$.

FIGS. 10 to 16 show typical examples, each indicating the shapes in the standard pattern matrix and the input pattern matrix. However, in the usual case, almost all portions of the shape in the input pattern matrix are changed from the shape in the standard pattern matrix. Hence, the equation 6 is executed to calculate every length in all changed portions, and the equation 10 is executed to calculate every shape change in all the changed portions. Moreover, the equation 10 is set for obtaining not an absolute shape but a relative shape change. Accordingly, the equation 10 is applicable to any arbitrary standard pattern matrix and any arbitrary input pattern matrix.

Next, with regard to a pair of the reference pattern vectors (the positive reference pattern vector $Kj_1j_2^{(+)}$ and the negative reference pattern vector $Kj_1j_2^{(-)}$), in which shapes are changed by the equation 10, each size of such shape change is numerically evaluated as an amount of change in kurtosis.

Here, a kurtosis $Aj_1j_2^{(+)}$ of the positive reference pattern vector $Kj_1j_2^{(+)}$ and a kurtosis $Aj_1j_2^{(-)}$ of the negative reference pattern vector $Kj_1j_2^{(-)}$ can be calculated by the following equation 11, respectively. As shown in FIGS. 10A to 10C, $Lj_1j_2i_0$ ($i_0=1, 2, \ldots, m_0$) in the equation 11 is a deviation value from the mean value of the normal distribution, which is previously set by the equation 9 at an arbitrary value in a range where a feature of the shape in the normal distribution can be expressed.

[Equation 11]

$$Aj_1j_2^{(+)} = \frac{\left\{\sum_{i0=1}^{m0} kj_1j_2^{(+)}i_0\right\} \cdot \left\{\sum_{i0=1}^{m0} (Lj_1j_2i_0)^4 \cdot kj_1j_2^{(+)}i_0\right\}}{\left\{\sum_{i0=1}^{m0} (Lj_1j_2i_0)^2 \cdot kj_1j_2^{(+)}i_0\right\}^2} \quad (11)$$

$$Aj_1j_2^{(-)} = \frac{\left\{\sum_{i0=1}^{m0} kj_1j_2^{(-)}i_0\right\} \cdot \left\{\sum_{i0=1}^{m0} (Lj_1j_2i_0)^4 \cdot kj_1j_2^{(-)}i_0\right\}}{\left\{\sum_{i0=1}^{m0} (Lj_1j_2i_0)^2 \cdot kj_1j_2^{(-)}i_0\right\}^2}$$

$(j_1 = 1, 2, 3, \ldots, m_1)$
$(j_2 = 1, 2, 3, \ldots, m_2)$

The kurtosis $Aj_1j_2^{(+)}$ and the kurtosis $Aj_1j_2^{(-)}$, which are calculated by the equation 11, are ratios of a biquadratic moment around the mean value (center) of the normal distribution to a square of a quadratic moment around the mean value of the normal distribution.

Not only the kurtosis value of the normal distribution but also a kurtosis value of any arbitrary reference shape can be calculated by the equation 11.

As described above, in general, a component value of a vector cannot be defined in the case of being negative in an equation for calculating the kurtosis of the vector shape. Accordingly, it is necessary that each component value of the reference pattern vector not be negative in any relation in size between the component values of the standard pattern matrix and the input pattern matrix.

For this reason, the positive reference pattern vector $Kj_1j_2^{(+)}$ and the negative reference pattern vector $Kj_1j_2^{(-)}$ are prepared, in which initial shapes thereof are equal to each other. By the equation 10, these component values are changed, butt are set not to be decreased. By the equation 11, the kurtosis $Aj_1j_2^{(+)}$ and the kurtosis $Aj_1j_2^{(-)}$ are calculated, respectively.

Next, from two amounts of changes of the kurtosis $Aj_1j_2^{(+)}$ of the positive reference pattern vector and the kurtosis $Aj_1j_2^{(-)}$ of the negative reference pattern vector, a difference between these two kurtoses ($Aj_1j_2^{(+)} - Aj_1j_2^{(-)}$) is calculated to be set as a shape change amount $Dj_1j_2$ representing a similarity between the standard pattern matrix and the input pattern matrix.

For example, a value of the kurtosis $Aj_1j_2^{(+)}$ of the reference pattern vector $Kj_1j_2^{(+)}$ and a value of the kurtosis $A_{j_1j_2}^{(-)}$ of the reference pattern vector $Kj_1j_2^{(-)}$, which are initially set in the shape of the normal distribution by the equation 5, are equal to 3. Therefore, the amount of change in the kurtosis of the positive reference pattern vector and the amount of change in the kurtosis of the negative reference pattern vector, both of which shapes are changed by the equation 10, are equal to $\{Aj_1j_2^{(+)}-3\}$ and $\{Aj_1j_2^{(-)}-3\}$, respectively. Specifically, the amount of change in a positive direction is $\{Aj_1j_2^{(+)}-3\}$, and the amount of change in a negative direction is $\{Aj_1j_2^{(-)}-3\}$. The overall amount of change is a difference therebetween. Hence, the shape change amount $Dj_1j_2$ can be calculated by the following equation 12.

[Equation 12]

$$Dj_1j_2 = \{Aj_1j_2^{(+)} - 3\} - \{Aj_1j_2^{(-)} - 3\} \quad (12)$$
$$= Aj_1j_2^{(+)} - Aj_1j_2^{(-)}$$

$(j_1 = 1, 2, 3, \ldots, m_1)$ $(j_2 = 1, 2, 3, \ldots, m_2)$

Next, with regard to each of the typical examples of the shapes in the standard pattern matrices and the shapes in the input pattern matrices, which are shown in FIG. 10A to FIG. 16C, consideration is made for the value of the shape change amount $Dj_1j_2$ calculated by the equation 12, which is summarized as below.

(1) As shown in FIGS. 10A to 10C, in the case where the shape in the standard pattern matrix and the shape in the input pattern matrix are equal to each other, $Aj_1j_2^{(+)}=3$ and $Aj_1j_2^{(-)}=3$, then the shape change amount $Dj_1j_2=0$.

(2) As shown in FIGS. 11A to 11C, in the case where the $j_1j_2$ component of the shape in the input pattern matrix is increased than that of the shape in the standard pattern matrix, $Aj_1j_2^{(+)}>3$ and $Aj_1j_2^{(-)}=3$, then $Dj_1j_2>0$.

(3) As shown in FIGS. 12A to 12C, in the case where the $j_1j_2$ component of the shape in the input pattern matrix is decreased than that of the shape in the standard pattern matrix, $Aj_1j_2^{(+)}=3$ and $Aj_1j_2^{(-)}>3$, then $Dj_1j_2<0$.

(4) As shown in FIGS. 13A to 13C, in the case where the portion far apart from the $j_1j_2$ component of the shape in the input pattern matrix is increased than that of the shape in the standard pattern matrix, $Aj_1j_2^{(+)}<3$ and $Aj_1j_2^{(-)}=3$, then $Dj_1j_2<0$.

(5) As shown in FIGS. 14A to 14C, in the case where the portion far apart from the $j_1j_2$ component of the shape in the input pattern matrix is decreased than that of the shape in the standard pattern matrix, $Aj_1j_2(+)=3$ and $Aj_1j_2^{(-)}<3$, then $Dj_1j_2>0$.

(6) As shown in FIGS. 15A to 15G. in the case where the portion intermediately apart from the $j_1j_2$ component of the shape in the input pattern matrix is increased than that of the shape in the standard pattern matrix, the value of f(y) in the boundary between the codes (i) and (ii) shown in FIG. 8 (vicinity of th point where y=−0.7σ or y=+0.7σ) is increased than that of the normal curve, and the amount of change in the kurtosis value is small. Thus, $Aj_1j_2^{(+)}-3$ and $Aj_1j_2^{(-)}-3$, then $Dj_1j_2-0$.

(7) As shown in FIGS. 16A to 16C, in the case where the portion intermediately apart from the $j_1j_2$ component of the shape in the input pattern matrix is decreased than that of the shape in the standard pattern matrix, the value of f(y) in the boundary between the codes (i) and (ii) shown in FIG. 8 (vicinity of the point where y=−0.7σ or y=07σ) is increased than that of the normal curve, and the amount of change in the kurtosis value is small. Thus, $Aj_1j_2^{(+)}-3$ and $Aj_1j_2^{(-)}-3$ then $Dj_1j_2-0$.

Specifically, when the normalized power spectrum of the input voice is relatively stronger than the normalized power spectrum of the standard voice near the center of the normal distribution (vicinity of $j_1j_2$ component of the shape in the pattern matrix), the shape change amount $Dj_1j_2$ is positive, and increases in proportion to the relative strength. Conversely, when the normalized power spectrum of the input voice is relatively weaker than the normalized power spectrum of the standard voice near the center of the normal distribution, the shape change amount $Dj_1j_2$ is negative, and decreases in proportion to the relative strength.

Figure 18:
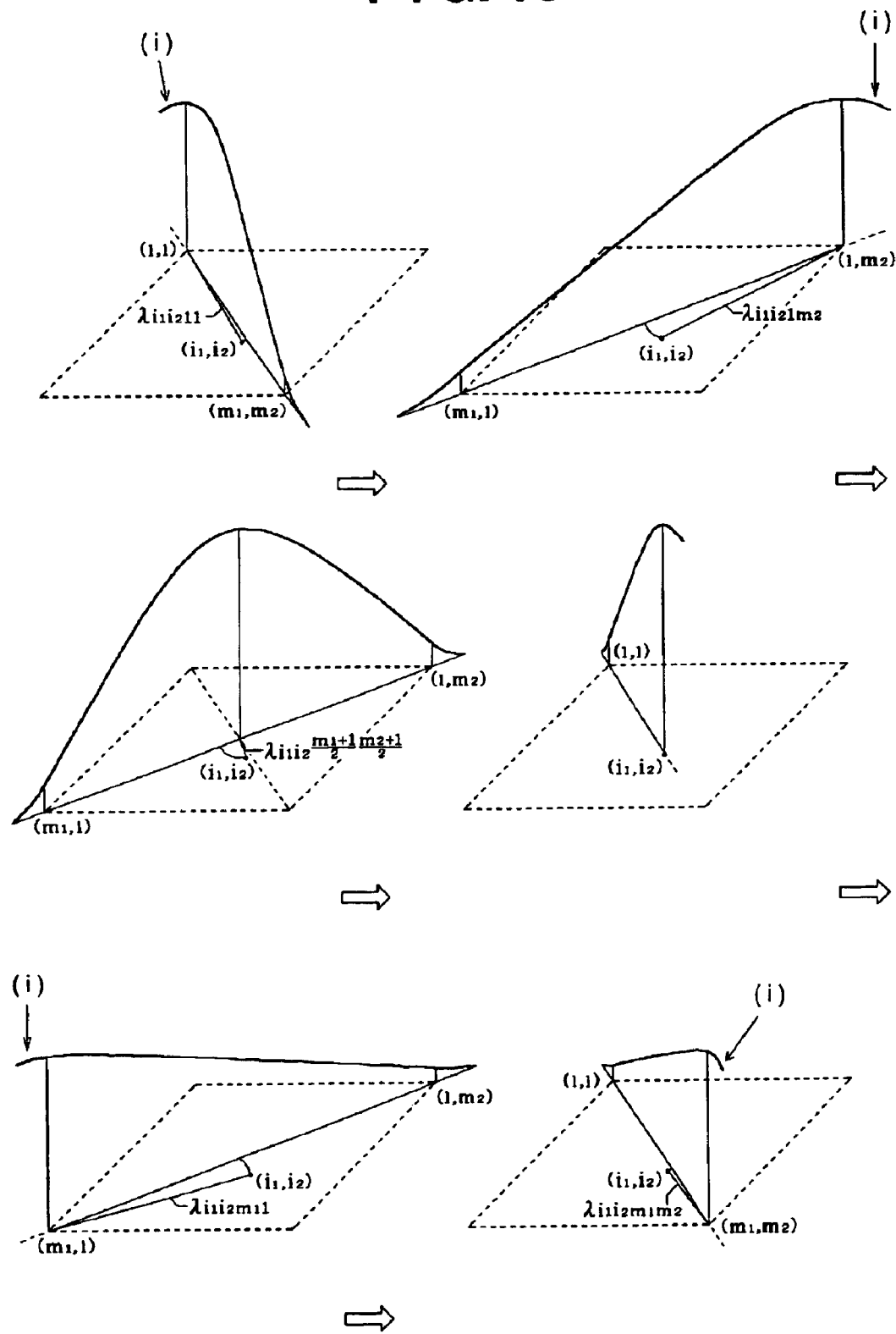
FIG. 18 is graphs showing change examples of variances of normal distributions when mean values of the normal distributions move, and showing change examples of length, each between the mean value of the normal distribution and a point $(i_1, i_2)$.
Figure 19:
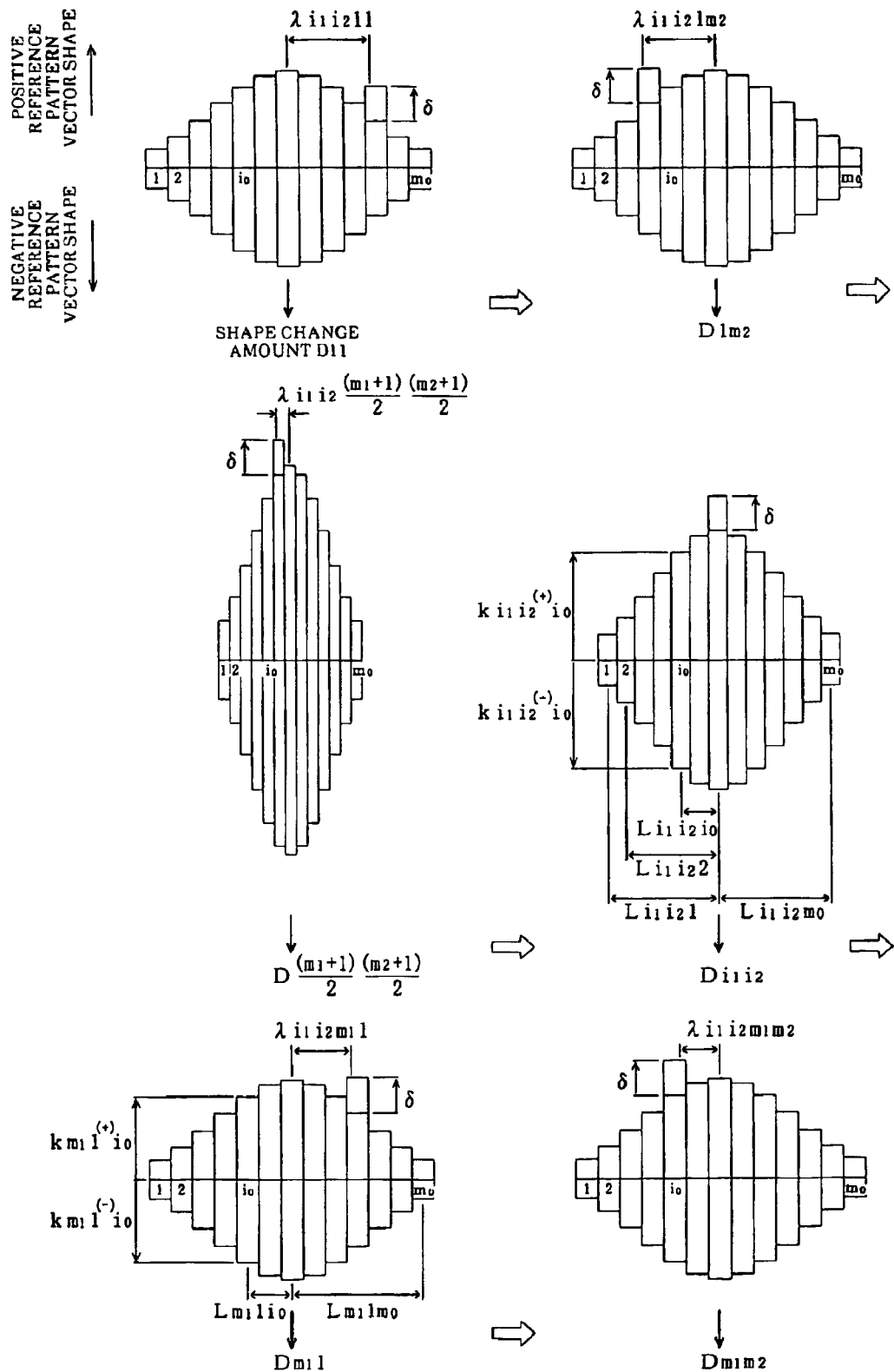
FIG. 19 is pattern diagrams showing shape change examples of the positive reference pattern vectors and the negative reference pattern vectors when the mean values of the normal distributions move.

Next, in the case where the mean value of the normal distribution sequentially is moved to each position of the component of the shape in the standard pattern matrix, the shape change amount at each position is obtained. FIGS. 17A and 17B show an example where only the $i_1i_2$ component of the shape in the input pattern matrix is increased than that of the shape in the standard pattern matrix. FIG. 18 shows the normal distribution having a variance different from others and the length $\lambda i_1i_2j_1j_2$ ($j_1=1, 2, \ldots, m_1$) ($j_2=1, 2, \ldots, m_2$) between the mean value of the normal distribution and the point ($i_1, i_2$) in each case where the mean value of the normal distribution is moved to the position of the point ($i_1, j_2$) ($j_1=1, 2, \ldots, m_1$) ($j_2=1, 2, \ldots, m_2$) in the example shown in FIGS. 17A and 17B. FIG. 19 shows the shape in the positive reference pattern vector and the shape in the negative reference pattern vector in each case shown in FIG. 18.

In FIG. 18, in each case of the point ($j_1, j_2$) ($j_1=1, 2, \ldots, m_1$) ($j_2=1, 2, \ldots, m_2$), the farthest point from the point ($j_1, j_2$) among all of the points on the (frequency-time)-normalized plane is applied to the equation 7 to obtain the maximum value of the length between the point ($j_1, j_2$) and each point. Thus, the normal distribution having a variance different for each point ($j_1, j_2$) is prepared by the equation 8. Hence, the centerline of the normal distribution is set to pass the point ($j_1, j_2$) and to be vertical to the foregoing plane. When the normal distribution is rotated around the centerline as an axis, the principal portion of the normal distribution can always cover the entire plane regardless of the position of the mean value of the normal distribution. In this connection, in FIG. 19, each shape in the positive reference pattern vector and each shape in the negative reference pattern vector are different from the others in response to each case of the points ($j_1, j_2$).

FIGS. 17A and 17B show that the $i_1i_2$ component of the shape in the input pattern matrix of FIG. 17B is increased by δ than that of the shape in the standard pattern matrix of FIG. 17A. FIG. 18 shows the length $\lambda i_1i_2j_1j_2$ ($j_1=1, 2, \ldots, m_1$) ($j_2=1, 2, \ldots, m_2$) between the mean value of the normal distribution and the point ($i_1, i_2$). FIG. 19 shows that, only in each positive reference pattern vector, the portion corresponding to the component number thereof proximate to the position apart by $\lambda i_1i_2j_1j_2$ from the center thereof is increased by the same value δ, and that the shape of the negative reference pattern vector remains unchanged.

Moreover, in the case where the mean value of the normal distribution is apart from the center position of the shape in the standard pattern matrix, each portion denoted by a reference code (i) in FIG. 18 does not correspond to the component number ($i_1=1, 2, \ldots, m_1$) ($i_2=1, 2, \ldots, m_2$) of the standard pattern matrix or the input pattern matrix. Therefore, the shape in the positive reference pattern vector corresponding to the portion always remains unchanged.

In the equation 11, the deviation value $Lj_1j_2i_0$ from the mean value of the normal distribution is squared or made biquadratic. Meanwhile, in the positive reference pattern vector and the negative reference pattern vector, the component number $i_0$ and the component number ($m_0-i_0+1$) are symmetrical with respect to the mean value of the normal distribution. Therefore, the value obtained by squaring the deviation value $Lj_1j_2i_0$ from the mean value of the normal distribution or making the same biquadratic is equal to the value obtained by squaring $Lj_1j_2(m_0-i_0+1)$ or making the same biquadratic. Accordingly, the component number ($m_0-i_0+1$) may be used instead of the component number $i_0$.

In the paragraph "0066" of the gazette of Japanese Patent Laid-Open No. Hei 10 (1998)-253444 (Japanese Patent Application No. Hei 9 (1997)-61007), described is: "A value in a part indicated by (ii) in FIG. 11 is never changed in spite of the change of the input pattern vector indicated by the dotted line because this part is outside of the range of the positive reference pattern vector and the negative reference pattern vector." In the present invention, for example, the normal distribution having a variance different for each point ($j_1$, $j_2$) is prepared by the equations 7 and 8, and the principal portion of the normal distribution always covers the entire pattern matrix regardless of the position of the mean value of the normal distribution. Hence, it is made possible to always change the values of all component numbers of the standard pattern matrix and the input pattern matrix. Thus, all of the shape changes between the standard pattern matrix and the input pattern matrix are reflected to the values of kurtosis, thus the performance for detecting a similarity is improved.

As described above, with regard to each case where the mean value of the normal distribution is moved to the position of the $j_1j_2$ component of the shape in the standard pattern matrix, the shape change amount $Dj_1j_2$ ($j_1$=1, 2, ..., $m_1$) ($j_2$=1, 2, ..., $m_2$) is calculated by the processing procedure using sequentially the equations 7, 8, 5, 9, 6, 10, 11 and 12 similarly to the foregoing manner. FIGS. 18 and 19 show the state in such calculation. As shown in FIG. 19, $Lj_1j_2i_0$ ($i_0$=1, 2, ..., $m_0$) in the equation 11 is a deviation value from the mean value of each moved normal distribution, and $kj_1j_2^{(+)}i_0$ and $kj_1j_2^{(-)}i_0$ ($i_0$=1, 2, ..., $m_0$) correspond to this $Lj_1j_2^{(+)}{}_{i_0}$.

Figure 20:
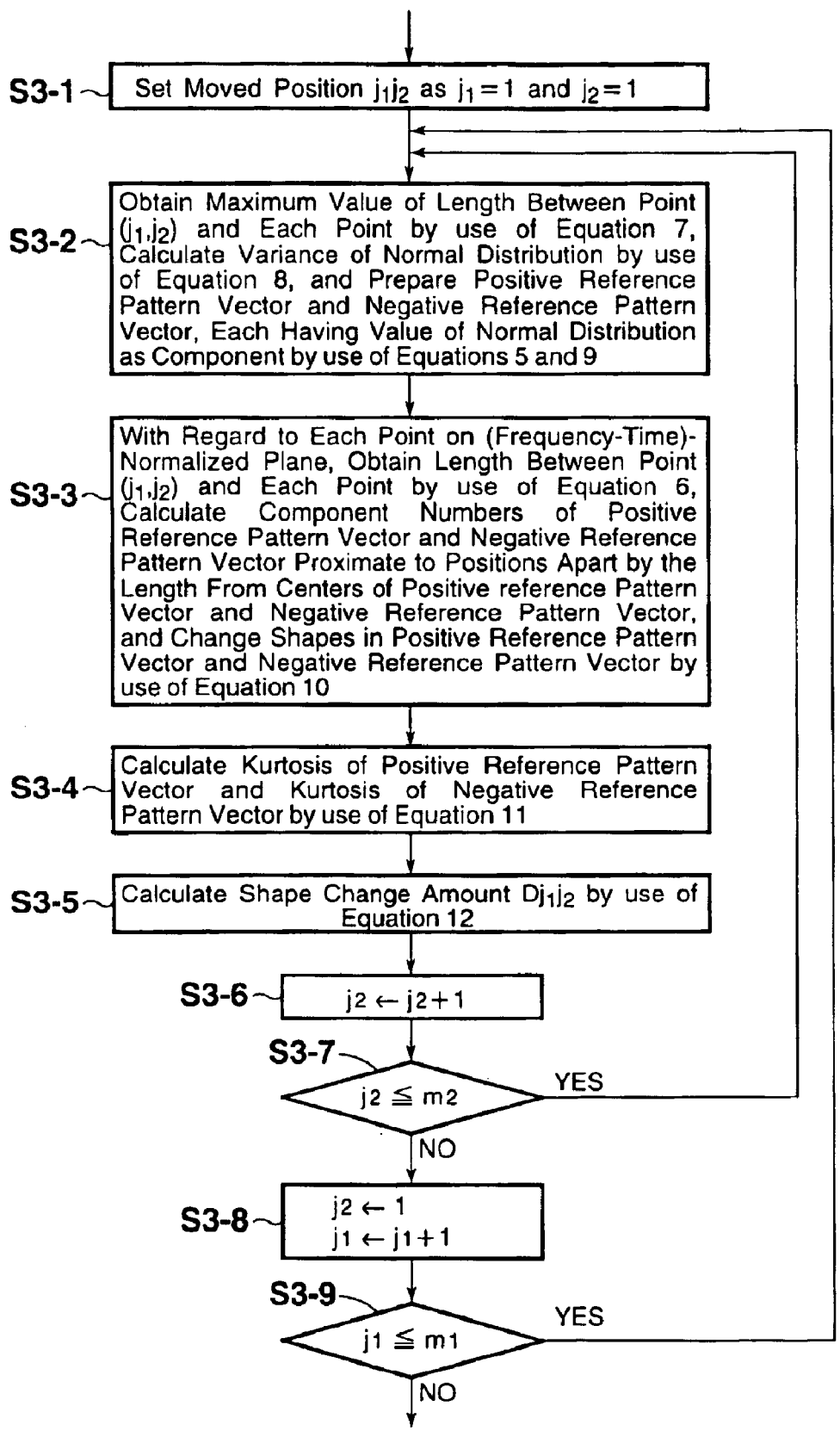
FIG. 20 is a flowchart for calculating a shape change amount (difference of kurtoses between the positive reference pattern vector and the negative reference pattern vector).

FIG. 20 is a flowchart showing a processing procedure for calculating $m_1 \times m_2$ pieces of the shape change amounts $Dj_1j_2$ by use of the equations 5 to 12. Here, the processing procedure after the standard pattern matrix H and the input pattern matrix N are prepared by the equation 3 is shown. Steps S3-1 to S3-9 in FIG. 20 show also a detail of step 3 in FIG. 24.

In FIG. 20, in the first step S3-1, initial setting is made as $j_i$=1 and $j_2$=1. In the next steps S3-2 to S3-7, the loop for calculating the shape change amount $Dj_1j_2$ starts by $j_2$ being increased one by one until $j_2$=$m_2$. And in the steps S3-2 to S3-9, the loop for calculating the shape change amount $Dj_1j_2$ starts by $j_1$ being increased one by one until $j_1$=$m_1$.

In Step S3-2 in the loop for calculating the shape change amount, a pair of the reference pattern vectors (the positive reference pattern vector $Kj_1j_2^{(+)}$ and the negative reference pattern vector $Kj_1j_2^{(-)}$) are prepared by sequentially using the equations 7, 8, 5 and 9. Specifically, each time the loop is executed, the maximum value of the length between the point ($i_1$, $j_2$) and each point is obtained by the equation 7, the variance of the normal distribution is calculated by the equation 8, the positive reference pattern vector and the negative reference pattern vector with the values of the normal distribution as components are prepared by the equations 5 and 9. Next, in steps S3-3 to S3-5, the shape change amount $Dj_1j_2$ is calculated by sequentially using the equations 6, 10, 11 and 12. Specifically, in step S3-3, the length between each point on the (frequency-time)-normalized plane and the point ($j_1$, $j_2$) is obtained by the equation 6. Then, the numbers of the components of the positive reference pattern vector and the negative reference pattern vector are calculated, the components being proximate to positions apart by the foregoing length from the centers of the positive reference pattern vector and the negative reference pattern vector. The shapes of the positive reference pattern vector $Kj_1j_2^{(+)}$ and the negative reference pattern vector $Kj_1j_2^{(-)}$ are changed by the equation 10. Then, in step S3-4, the kurtosis $Aj_1j_2^{(+)}$ of the positive reference pattern vector and the kurtosis $Aj_1j_2^{(-)}$ of the negative reference pattern vector are calculated by the equation 11.

And, in step S3-5, the shape change amount $Dj_1j_2$ is calculated by the equation 12.

In accordance with the processing procedure as described above, in the respective cases corresponding to the $j_1j_2$ components ($j_1$=1, 2, ..., $m_1$) ($j_2$=1, 2, ..., $m_2$), the $m_1 \times m_2$ pieces of shape change amounts $Dj_1j_2$ can be calculated.

Figure 21:
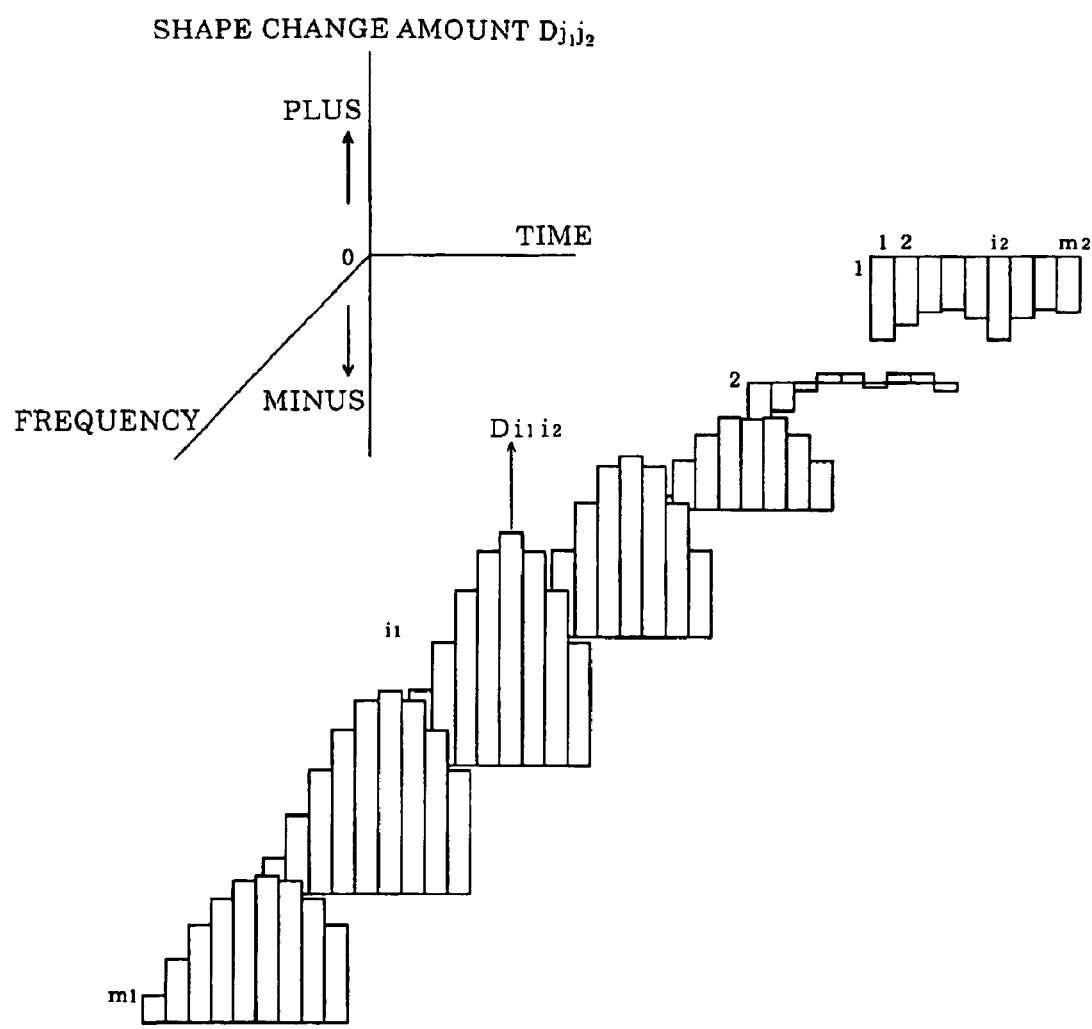
FIG. 21 is diagrams showing a shape change amount for each component of the pattern matrix.

FIG. 21 is a pattern diagram of the shape change amount for each component of the pattern matrix calculated by the processing procedure of FIG. 20 with regard to the shape in the standard pattern matrix and the shape in the input pattern matrix, which are shown in FIGS. 17A to 19.

What is understood from FIG. 20 is that, when the mean value of the normal distribution is moved to the same position as the portion where the shape in the input pattern matrix is larger than the shape in the standard pattern matrix as in FIGS. 18 and 19, the shape change amount becomes maximum as shown in FIG. 21 (in the portion indicated by $Di_1i_2$ in the figure), and when the mean value is moved to a portion apart therefrom, the shape change amount becomes negative.

In the paragraph "0076" of the gazette of Japanese Patent Laid-Open No. Hei 10 (1998)-25344 (Japanese Patent Application No. Hei 9 (1997)-61007), described is: "When the mean value of the normal distribution is moved to a position further apart, since a portion denoted by (ii) in FIG. 11 occurs, the shape change amount corresponding to the band of the center frequency f1 in FIG. 13 becomes 0 as shown therein." However, in the present invention, it is made possible to always change the values in all the component numbers of the standard pattern matrix and the input pattern matrix. Therefore, the shape change amount is no longer fixed to 0. Thus, all the shape changes between the standard pattern matrix and the input pattern matrix are reflected to the values of kurtosis, and the performance of detecting the similarity is improved.

As described above, the shape change amount $Dj_1j_2$, that is, the difference ($Aj_1j_2^{(+)}$–$Aj_1j_2^{(-)}$) between the kurtosis of the positive reference pattern vector and the kurtosis of the negative reference pattern vector, of which shapes are changed, is increased in the case where the center of the reference shape is moved to the same position as the portion where the shape in the input pattern matrix is larger than the shape in the standard pattern matrix.

Specifically, with regard to the normalized power spectrum of the input voice, it is possible to detect which component of the pattern matrix thereof is stronger than that of the normalized power spectrum of the standard voice and how strong the component is, as a shape change amount.

Next, a difference between the shape in the standard pattern matrix and the shape in the input pattern matrix is numerically evaluated as one value of the geometric distance between two pattern matrices by using the $m_1 \times m_2$ pieces of shape change amounts $Dj_1j_2$ ($j_1$=1, 2, ..., $m_1$) ($j_2$=1, 2, ..., obtained in the above-described manner.

It is conceived that the value of the geometric distance is a sum of the $m_1 \times m_2$ pieces of shape change amounts $Dj_1j_2$. Hence, the value d of the geometric distance can be calculated by the following equation 13.

[Equation 13]

$$d = \sqrt{\sum_{j_1=1}^{m_1} \sum_{j_2=1}^{m_2} (Dj_1 j_2)^2} \qquad (13)$$

In the equation 13, the value of the geometric distance is obtained by calculating a square root of a value that is a sum of squares of the $m_1 \times m_2$ pieces of shape change amounts $Dj_1j_2$. However, as in the following equation 14, the sum itself of the squares of the $m_1 \times m_2$ pieces of shape change at amounts $Dj_1j_2$ can be calculated to obtain the value d of the geometric distance.
[Equation 14]

$$d = \sum_{j_1=1}^{m_1} \sum_{j_2=1}^{m_2} (Dj_1j_2)^2 \qquad (14)$$

Description has been made as above for the method for calculating the value of the geometric distance. Next, with regard to the standard voice 20 and the input voices 21, 22 and 23 shown in FIGS. 39 and 40, the values d21, d22 and d23 of the geometric distances between the standard pattern matrix 20A and each of the input pattern matrices 21A, 22A and 23A are calculated by use of the above-described method.

Figure 22:
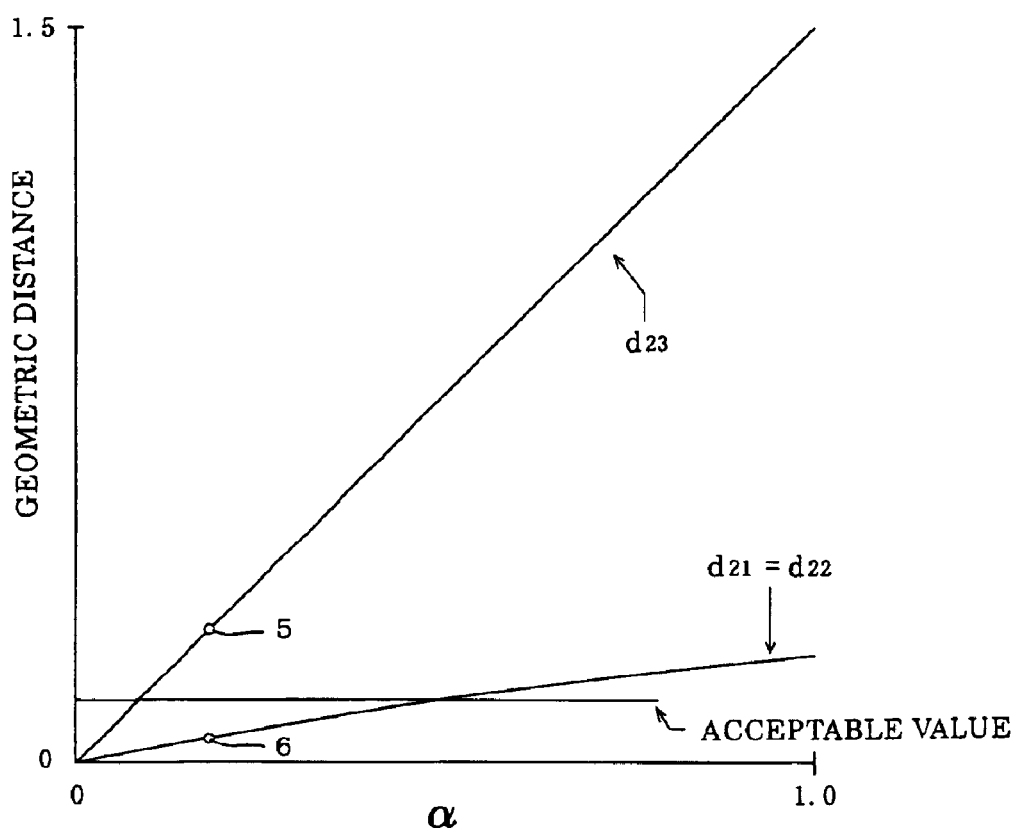
FIG. 22 is a graph showing a state where values of geometric distances, each between the standard pattern matrix and the input pattern matrix, are changed with respect to a in FIG. 40.

FIG. 22 is a graph showing a state how the values d21, d22 and d23 of the geometric distances are changed when the parameter α in FIG. 40 is increased from 0 to 1. From FIG. 22, it is understood that, in the example of FIGS. 39 and 40, a relation among the values of the geometric distances is always as: d21=d22<d23, and that the values d21, d22 and d23 of the geometric distances are increased according to an increase of the parameter α.

Figure 39:
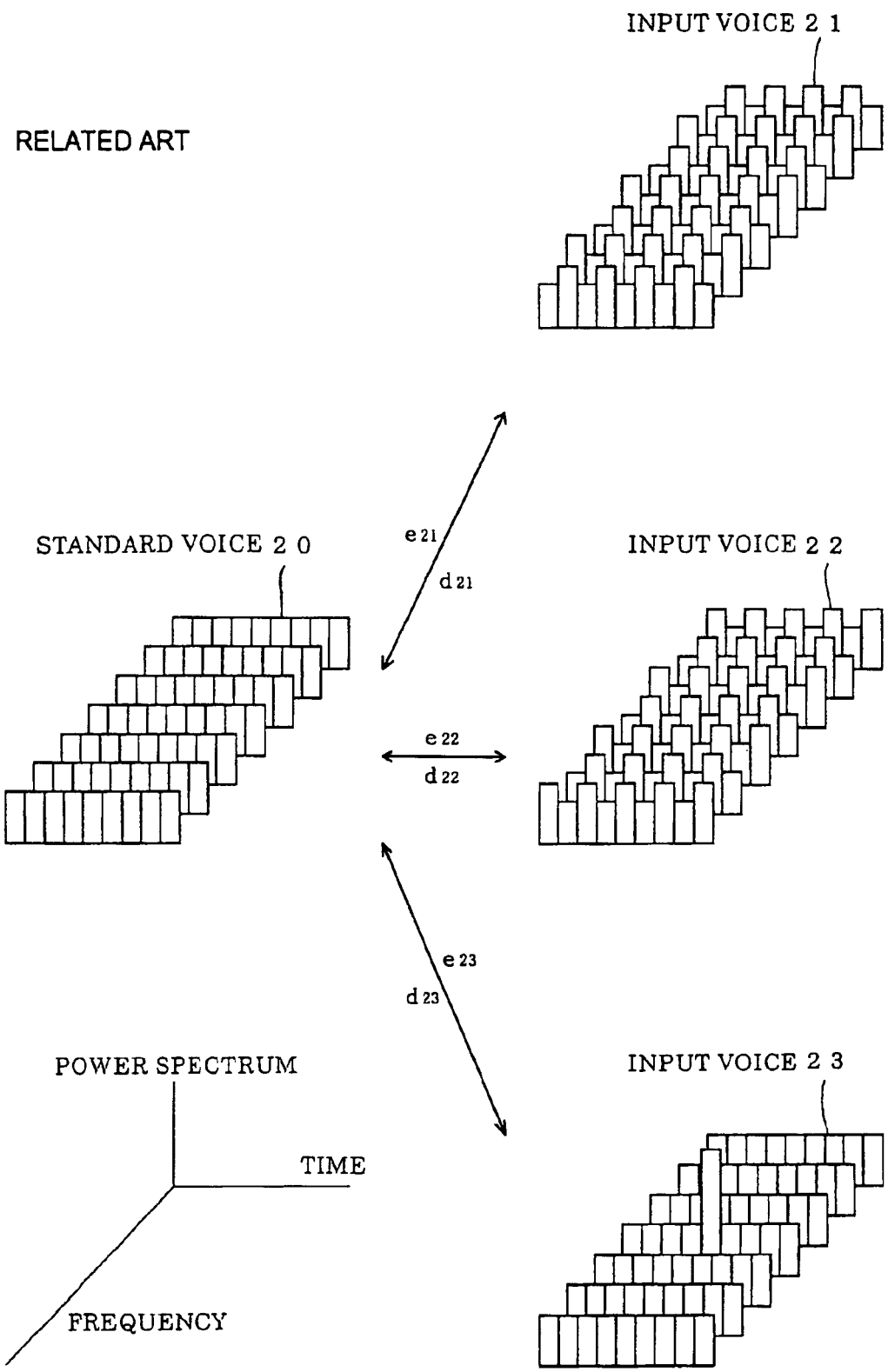
FIG. 39 is diagrams showing examples of power spectrums of a standard voice and input voices.

In the case where the parameter α is small in the example of FIGS. 39 and 40, it is assumed that the input voice 21 and the input voice 22 are "sway of spectrum intensity" of the fricative consonants /s/, and that the input voice 23 is a voice different from the fricative consonants /s/.

Figure 43:
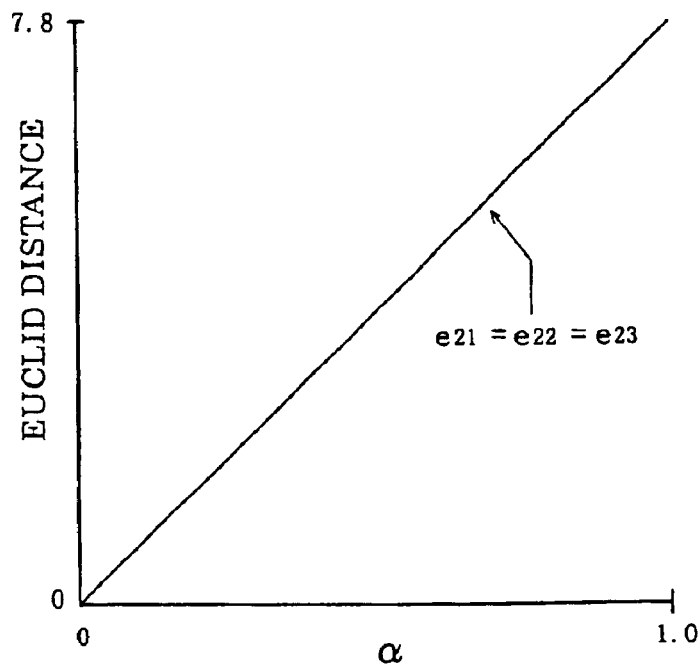
FIG. 43 is a graph showing a state where the value of the Euclid distance between the pattern matrices of the standard voice and the input voices is changed with respect to a parameter $\alpha$ in FIG. 40 regarding the prior art.
Figure 44:
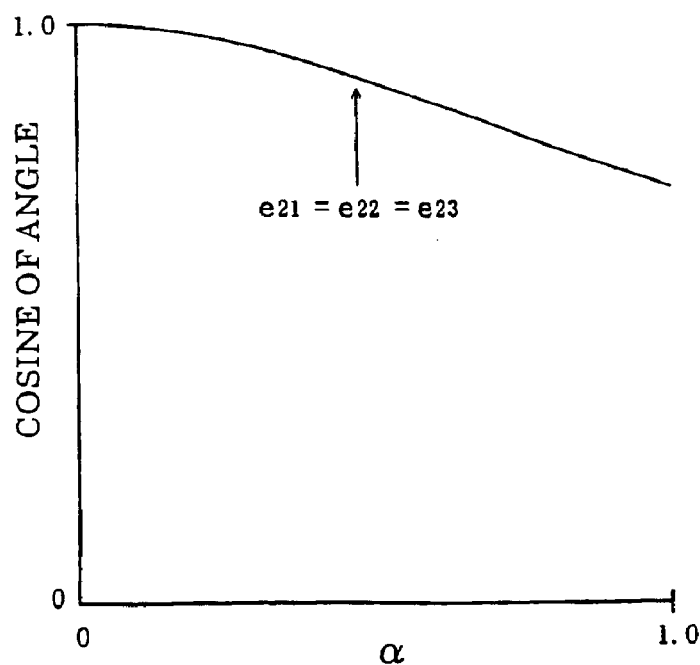
FIG. 44 is a graph showing a state where the value of the cosine of the angle between the pattern matrices of the standard voice and the input voices is changed with respect to the parameter $\alpha$ in FIG. 40 regarding the prior art.

Heretofore, the Euclid distance or the angle from the standard voice has been used. Therefore, when the values of the parameter α are equal among the input voices 21, 22 and 23 in FIGS. 39 and 40, as shown in FIGS. 43 and 44, it has been impossible to judge that the input voices 21 and 22 are the standard voices, and that the input voice 23 is not the standard voice.

However, in the present invention, even if the values of the parameter α are equal among the input voices 21, 22 and 23, by comparing the values d21, d22 and d23 of the geometric distances from the standard voice with an arbitrarily set acceptable value as shown by white marks 5 and 6 in FIG. 22, judgment can be made that the input voices of the white mark 6 are the standard voice, and that the input voice of the white mark 5 is not the standard voice. Specifically, the input voices 21 and 22 of the fricative consonants /s/ and the input voice 23 different from the fricative consonant /s/ can be distinguished.

Moreover, with regard to the standard voice 24 and the input voices 25, 26 and 27 shown in FIGS. 41 and 42, it is conceived that the values d25, d26 and d27 of the geometric distances between the standard pattern matrix 24A and each of the input pattern matrices 25A, 26A and 27A are calculated by using the above-described method for calculating the value of the geometric distance.

Figure 23:
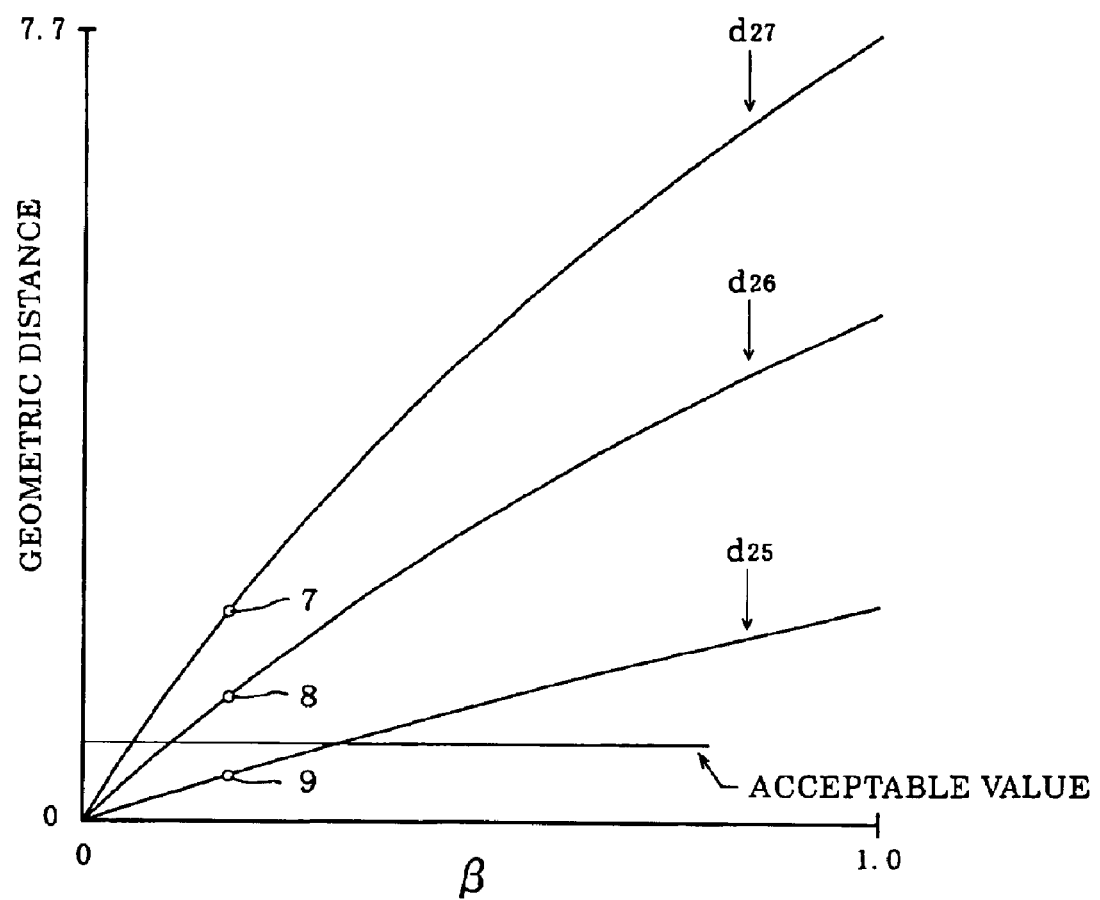
FIG. 23 is a graph showing a state where the values of the geometric distances, each between the standard pattern matrix and the input pattern matrix, are changed with respect to β in FIG. 42.

FIG. 23 is a graph showing a state how the values d25, d26 and d27 of the geometric distances are changed when the parameter β in FIG. 42 is increased from 0 to 1. From FIG. 23, it is understood that, in the example of FIGS. 41 and 42, a relation among the values of the geometric distances is always as: d25<d26<d27, and that the values d25, d26 and d27 of the geometric distances are increased according to an increase of the parameter β.

In the example of FIGS. 41 and 42, it is assumed that the input voice 25 is the same voice as the standard voice 24, in which the "shift of frequency" or the "shift of time" occurs in its peak, and that the input voices 26 and 27 are voices different from the standard voice 24.

Figure 45:
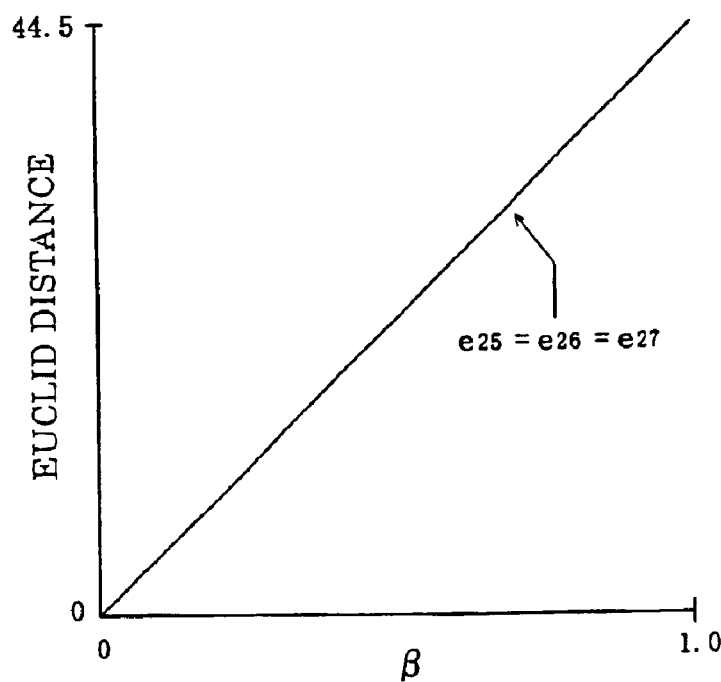
FIG. 45 is a graph showing a state where the value of the Euclid distance between the pattern matrices of the standard voice and the input voices is changed with respect to a parameter $\beta$ in FIG. 42 regarding the prior art.
Figure 46:
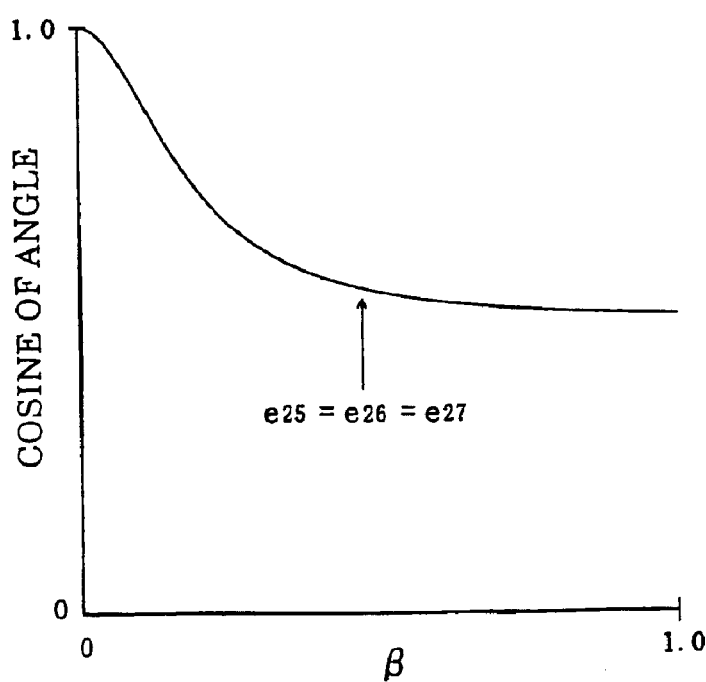
FIG. 46 is a graph showing a state where the value of the cosine of the angle between the pattern matrices of the standard voice and the input voices is changed with respect to the parameter $\beta$ in FIG. 42 regarding the prior art.

Heretofore, the Euclid distance or the angle from the standard voice has been used. Therefore, when the values of the parameter β of the input voices 25, 26 and 27 are equal thereamong in FIGS. 41 and 42, as shown in FIGS. 45 and 46, it has been impossible to judge that the input voice 25 is the standard voice, and that the input voices 26 and 27 are not the standard voice.

However, in the present invention, even if the values of the parameter β are equal among the input voices 25, 26 and 27, by comparing the values d25, d26 and d27 of the geometric distances from the standard voice with an arbitrarily set acceptable value as shown by three white marks 7, 8 and 9 in FIG. 23, judgment can be made that the input voice of the white mark 9 is the standard voice, and that the input voices of the white marks 7 and 8 are not the standard voice. Specifically, the input voice 25 same as the standard voice 24 and the input voices 26 and 27 different from the standard voice 24 can be distinguished.

Moreover, in FIGS. 41 and 42, a size of the "shifts of frequency" or the "shifts of time" in the peaks of the input voices 25, 26 and 27 with respect to the peak in the standard voice 24 is increased in the order of the input voices 25, 26 and 27. Meanwhile, in FIG. 23, the relation among the values of the geometric distances is as: d25<d26<d27. Accordingly, if the values of the geometric distances are used, the sizes of the "shifts of frequency" or the "shifts of time" in such peaks can be detected.

Next, with reference to FIG. 24, description will be made for an example where a computer continuously detects the similarity between the voices one of which is continuously recognized by using the above-described method for detecting the similarity between the voices.

FIG. 24 is a flowchart showing steps executed by the computer for recognizing the voice. In FIG. 24, first, in step S1, the standard pattern matrix is previously prepared from the standard voice. In the next step S2, the input pattern matrix is prepared from the input voice. In step S3, the shape change amount $Dj_1j_2$ ($j_1$=1, 2, . . . , $m_1$) ($j_2$=1, 2, . . . , $m_2$) is calculated. Here, the procedure of calculating the shape change amount in step S3 is constituted of the above-described steps S3-1 to S3-9 in FIG. 20. Then, in step S4, the value d of the geometric distance is calculated. In step S5, the value d is compared with the acceptable value to judge whether or not the input voice is the standard voice. After the judgment, the processing is iterated from step S2.

In accordance with such processing procedure, the voices can be continuously recognized. When the value d of the geometric distance exceeds the acceptable value, it is judged that the input voice is not the standard voice in step S6. And when the value d of the geometric distance is within the acceptable value, it is judged that the input voice is the standard voice in step S7.

Incidentally, in general, recognition is made as to which voice in a plurality of voices, such as voices /a/, /i/, /u/, /e/ and /o/, an input voice is in many cases in the voice recognition. In such a case, each of the voices /a/, /i/, /u/, /e/ and /o/ is conceived as an individual standard voice, and five standard pattern matrices are previously prepared from these standard voices.

Next, one input pattern matrix is prepared from the input voice. Then, the value of the geometric distance between the input pattern matrix and each of the five standard pattern matrices is calculated. The minimum value among the values of the geometric distances thus calculated is compared with an arbitrarily set acceptable value. When the minimum value of the geometric distance does not exceed the acceptable value, it is judged that the input voice is the standard voice giving the minimum value of the geometric distance. When the minimum value of the geometric distance exceeds the acceptable value, it is judged that the input voice is not any of the five standard voices.

Figure 25:
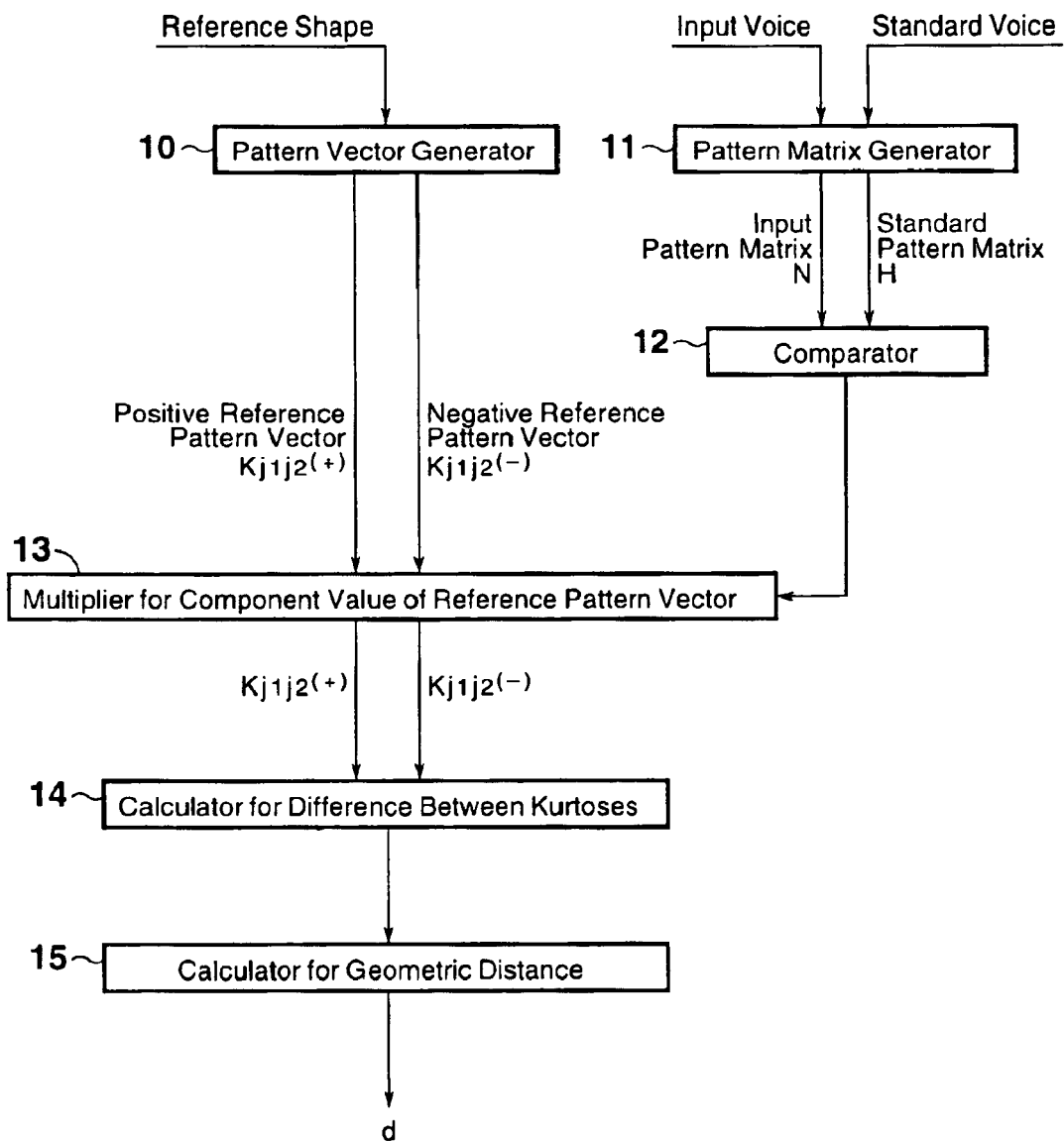
FIG. 25 is a block diagram showing a configuration of a detection apparatus for the similarity between the voices.

FIG. 25 is a block diagram showing an apparatus of detecting similarity between voices for realizing the foregoing processing procedure. In FIG. 25, a reference numeral 10 denotes a pattern vector generator. A numeral 11 denotes a pattern matrix generator. A numeral 12 denotes a comparator. And, numerals 13, 14 and 15 denote calculators, respectively.

The pattern vector generator 10 generates the positive reference pattern vector $Kj_1j_2^{(+)}$ and the negative reference pattern vector $Kj_1j_2^{(-)}$, both having the values of the normal distribution as components. The pattern matrix generator 11 generates the standard pattern matrix H with a feature amount of the standard voice as a component and the input pattern matrix N with a feature amount of the input voice as a component. The comparator 12 compares the component value of the input pattern matrix with the component value of the standard pattern matrix in size with regard to each component of the pattern matrices. The calculator 13 obtains a length between the specified component and a component in each of the pattern matrices, calculates the numbers of the components of the reference pattern vectors, the components being proximate to the positions apart by the the foregoing length from the centers of the reference pattern vectors. When the component value of the input pattern matrix is greater than the component value of the standard pattern matrix, the calculator 13 increases the component value of the foregoing component number of the positive reference pattern vector $Kj_1j_2^{(+)}$ by an absolute value of a difference therebetween. When the component value of the input pattern matrix is smaller than the component value of the standard pattern matrix, the calculator 13 increases the component value of the foregoing component number of the negative reference pattern vector $Kj_1j_2^{(-)}$ by an absolute value of a difference therebetween. The calculator 14 calculates a difference between the value of the kurtosis of the positive reference pattern vector $Kj_1j_2^{(+)}$ generated by the calculator 13 (value increasing means) and the value of the kurtosis of the negative reference pattern vector $Kj_1j_2^{(-)}$ generated by the calculator 13. Here, in calculating the difference between the values of the kurtoses, the difference therebetween is obtained while moving the specified component of the pattern matrix to the position of each component. The calculator 15 calculates a square root of a value that is a sum of squares of such differences therebetween to obtain a geometric distance between the standard pattern matrix ant the input pattern matrix.

In short, as shown in FIG. 24, the standard pattern matrix with the feature amount of the standard voice as a component and the input pattern matrix with the feature amount of the input voice as a component are prepared (steps S1 and S2). Then, the reference shape with the variance different for each specified component of the pattern matrices is prepared, and the positive reference pattern vector and the negative reference pattern vector, each having the foregoing reference shape as a component, are prepared. Subsequently, while moving the specified component of the pattern matrices (center of the reference shape) sequentially to the positions of the respective components of $j_1=1$ to $m_1$, $j_2=1$ to $m_2$ of the standard pattern matrix, the change in shape between the standard pattern matrix and the input pattern matrix is replaced with the changes in shapes of the positive reference pattern vector and the negative reference pattern vector. Then, the amount of kurtosis change between the positive reference pattern vector and the negative reference pattern vector is numerically evaluated to obtain the shape change amount $Dj_1j_2$ (step S3). Based on the shape change amount $Dj_1j_2$ ($j_1=1, 2, \ldots, m_1$) ($j_2=1, 2, \ldots, m_2$), the value d of the geometric distance between the shapes in the pattern matrices of the standard voice and the input voice is calculated (step S4). Thus, a precise detected value of the similarity between the voices can be obtained. Moreover, the detected value of the voice similarity (value d of the geometric distance) is compared with an arbitrarily set acceptable value (step S5), it is judged that the input voice when the value d of the geometric distance exceeds the acceptable value is not the standard voice (step S6), and it is judged that the input voice when the value d of the geometric distance is within the acceptable value is the standard voice (step S7). Thus, a precise voice recognition result can be obtained.

(II) Method for Judging Abnormality in Machine

Next, description will be made for a method for detecting a similarity between vibration waves and a method for judging an abnormality in a machine by use of the detected value. In this embodiment, for judging an abnormality in a machine, a change with time of a frequency distribution of the vibration wave is normalized, and a standard pattern matrix and an input pattern matrix are prepared. Then, a shape change between these pattern matrices is replaced with shape changes of reference pattern vectors with values of a normal distribution as components, and sizes of the shape changes of the reference pattern vectors are numerically evaluated as amounts of changes in kurtosis. Thus, the similarity between the vibration waves is detected. Furthermore, an abnormality in a machine is judged by used of the detected value.

In FIG. 1, instead of the microphone, a vibration wave in a machine is measured by an appropriate vibration sensor. As shown in FIG. 1, assuming that the output signal from the $i_1$-th A/D converter 3 is $xi_1(t)$ ($i_1=1, 2, \ldots, m_1$) as a function of time t, the function $xi_1(t)$ is a frequency component wave of the vibration wave extracted by the $i_1$-th band-pass filter 2. Moreover, in FIG. 3, assuming that an $i_2$-th time is $ti_2$ ($i_2=1, 2, \ldots, m_2$), the function $xi_1(t)$ is measured individually for each time, thus it is possible to extract a feature of a change with time of the frequency distribution of the vibration wave. Therefore, a power spectrum $Pi_1i_2$ at the $i_2$-th time in the $i_1$-th frequency band can be calculated by the equation 1. Note that a time length T for calculating a sum of squares of the function $xi_1(t)$ is arbitrarily set so that a feature of the vibration wave, which changes according to time, can remarkably appear.

The above-described processing procedure for detecting a similarity between voices is applied to the power spectrum $Pi_1i_2$ of the vibration wave calculated in the foregoing manner. Thus, the abnormality in a machine is judged.

Concretely, the standard pattern matrix with a feature amount of a standard vibration wave as a component and the input pattern matrix with a feature amount of an input vibration wave as a component are prepared. Then, the change in shape between these pattern matrices is replaced with the changes in shapes of the positive reference pattern vector and the negative reference pattern vector. And, sizes of these shape changes are defined as amounts of changes in the kurtosis. Based on a difference between the kurtosis values of the positive reference pattern vector and the negative reference pattern vector, a value of a geometric distance between the standard pattern matrix and the input pattern matrix is calculated. The value of the geometric distance thus obtained is compared with an arbitrarily set acceptable value. When the value of the geometric distance exceeds the acceptable value, it is judged that the machine is abnormal. When the value of the geometric distance is within the acceptable value, it is judged that the machine is normal.

(III) Method for Recognizing Image

Next, description will be made for a method for detecting a similarity between images and a method for recognizing an image by use of the detected value. In this embodiment, for recognizing an image, a density pattern of an image is normalized, and a standard pattern matrix and an input pattern matrix are prepared. Then, a shape change between the pattern matrices is replaced with shape changes of reference pattern vectors with values of a normal distribution as components, and sizes of the shape changes of the reference pattern vectors are numerically evaluated as amounts of changes in kurtosis. Thus, the similarity between the images is detected. Furthermore, an image is recognized by use of the detected value.

Figure 26:
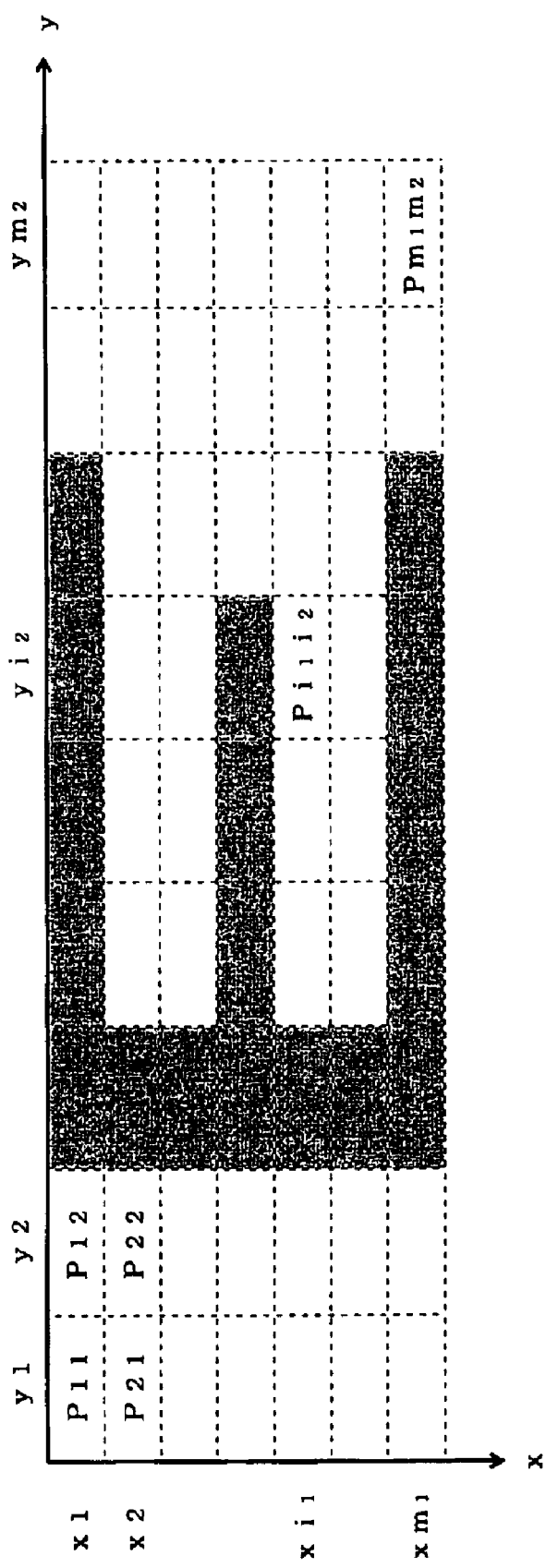
FIG. 26 is a view showing one example of an image of an alphabet "E".

FIG. 26 is an example of an image of an alphabet "E". As shown in FIG. 26, the image is constituted of $m_1 \times m_2$ pieces of pixels obtained by partitioning the image into $m_1$ pieces in an x-direction and $m_2$ pieces in a y-direction. Here, if it is assumed that a density of an image in a pixel of the $i_1$-th in the x-direction and of the $i_2$-th in the y-direction is $Pi_1i_2$, a normalized density $pi_1i_2$ is calculated by the equation 2.

Next, a standard pattern matrix H with a normalized density $pi_1i_2$ ($i_1=1, 2, \ldots, m_1$) ($i_2=1, 2, \ldots, m_2$) of a standard image as a component and an input pattern matrix N with a normalized density $pi_1i_2$ ($i_1=1, 2, \ldots, m_1$) ($i_2=1, 2, \ldots, m_2$) of an input image as a component are prepared. These standard pattern matrix H and input pattern matrix N are expressed as in the equation 3. Note that, the equation 3 is interpreted such that the shapes in the normalized densities of the standard image and the input image are expressed by the $m_1 \times m_2$ pieces of component values of the pattern matrix.

FIG. 27A shows the standard pattern matrix H expressed on an (x-y) plane, and FIG. 27B shows the input pattern matrix N expressed on an (x-y) plane.

The foregoing processing procedure for detecting a similarity between voices is applied to the standard pattern matrix H and the input pattern matrix N of the image, which have been prepared in the above-described manner. Thus, the image is recognized.

Concretely, the standard pattern matrix with a feature amount of the standard image as a component and the input pattern matrix with a feature amount of the input image as a component are prepared. Then, the shape change between these pattern matrices is replaced with the shape changes of the positive reference pattern vector and the negative reference pattern vector, and sizes of the shape changes are defined as the amounts of changes in kurtosis. Based on a difference between values of the kurtoses of the positive reference pattern vector and the negative reference pattern vector, a value of a geometric distance between the standard pattern matrix and the input pattern matrix is calculated. Then, the value of the geometric distance thus obtained is compared with an arbitrarily set acceptable value. When the value of the geometric distance exceeds the acceptable value, it is judged that the input image is not the standard image, and when the value of the geometric distance is within the acceptable value, it is judged that the input image is the standard image.

[Experiment]

Next, description will be made for an experiment with reference to FIGS. 28, 29, 30A, 30B and 30C. FIGS. 28 and 29 show a state as below with regard to a standard image 16 having a density shape of a code "+" and input images 17, 18 and 19, each having total densities of the entire pixels equal to that of the standard image but having a sideline different in position from that of the standard image. Specifically, a standard pattern matrix 16A of seven rows and nine columns with the density of the standard image 16 as a component is previously registered, and the input pattern matrices 17A, 18A and 19A, each having seven rows and nine columns with each density of the input images 17, 18 and 19 as a component is prepared. Then, as a scale of the similarity between the standard pattern matrix 16A and each of the input pattern matrices 17A, 18A and 19A, Euclid distances or cosines of angles e17, e18 and e19 and the geometric distances d17, d18 and d19 are calculated. For simplicity, FIG. 29 shows unnormalized component values of the standard pattern matrix H and the input pattern matrix N.

FIGS. 30A, 30B and 30C are bar graphs showing values e17, e18 and e19 of the Euclid distances, values e17, e18 and e19 of the cosines of the angles, and values d17, d18 and d19 of the geometric distances, which are obtained by the experiment, respectively.

As described above, FIGS. 30A, 30B and 30C are the bar graphs showing the respective values of the distances, each between the standard image and the input image obtained by calculating the value of the Euclid distance, the value of the cosine of the angle and the value of the geometric distance from the same measurement data. In accordance with FIGS. 30A, 30B and 30C, the following can be said.

(1) In FIGS. 28 and 29, sizes of "shifts of positions" of the sidelines in the input images 17, 18 and 19 with respect to the sideline of the standard image 16 are increased in the order of the input images 17, 18 and 19. In FIGS. 30A and 30B, a relation among the values e17, e18 and e19 of the both Euclid distances and the cosines of the angles are: e17=e18=e19. Therefore, even if the Euclid distances or the cosines of the angles are used, the sizes of the "shifts of positions" of the sidelines cannot be detected. Meanwhile, in FIG. 30C, a relation among the values of the geometric distances is: d17<d18<d19. If the geometric distances are used, the sizes of the "shifts of positions" of the sidelines can be detected.

(2) In FIGS. 28 and 29, it is assumed that the input image 17 and the standard image 16 are the same image and the "shifts of positions" occur in the sidelines thereof, and that the input image 18 and the input image 19 are images different from the standard image 16. Here, when the Euclid distances or the cosines of the angles are used, even if the acceptable values are set at any positions in FIGS. 30A and 30B, it is impossible to judge that the input image 17 is the standard image and that the input images 18 and 19 are not the standard images. Meanwhile, when the geometric distances are used, if the acceptable value is set at the position shown in FIG. 30C, it is possible to judge that the input image 17 is the standard image and that the input images 18 and 19 are not the standard images.

From the above results of the experiment, it can be understood that the geometric distances are more preferable than the Euclid distances or the cosines of the angles for use in detecting a similarity between the images more precisely.

(IV) Method for Recognizing Solid

Next, description will be made for a method for detecting a similarity between solids and a method for recognizing a solid by use of the detected value. In this embodiment, for recognizing a solid, a density pattern of a solid (mass of a unit volume) is normalized, and a standard pattern matrix layer and an input pattern matrix layer are prepared. Then, a shape change between the pattern matrix layers is replaced with shape changes of reference pattern vectors with values of a normal distribution as components, and sizes of the shape changes of the reference pattern vectors are numerically evaluated as amounts of changes in kurtosis. Thus, the similarity between the solids is detected. Furthermore, a solid is recognized by use of the detected value.

Here, the above-described method for detecting a similarity between (two-dimensional) two pattern matrices such as voices, vibration waves and images is extended to the method for detecting a similarity between (three-dimensional) two pattern matrix layers.

Figure 31:
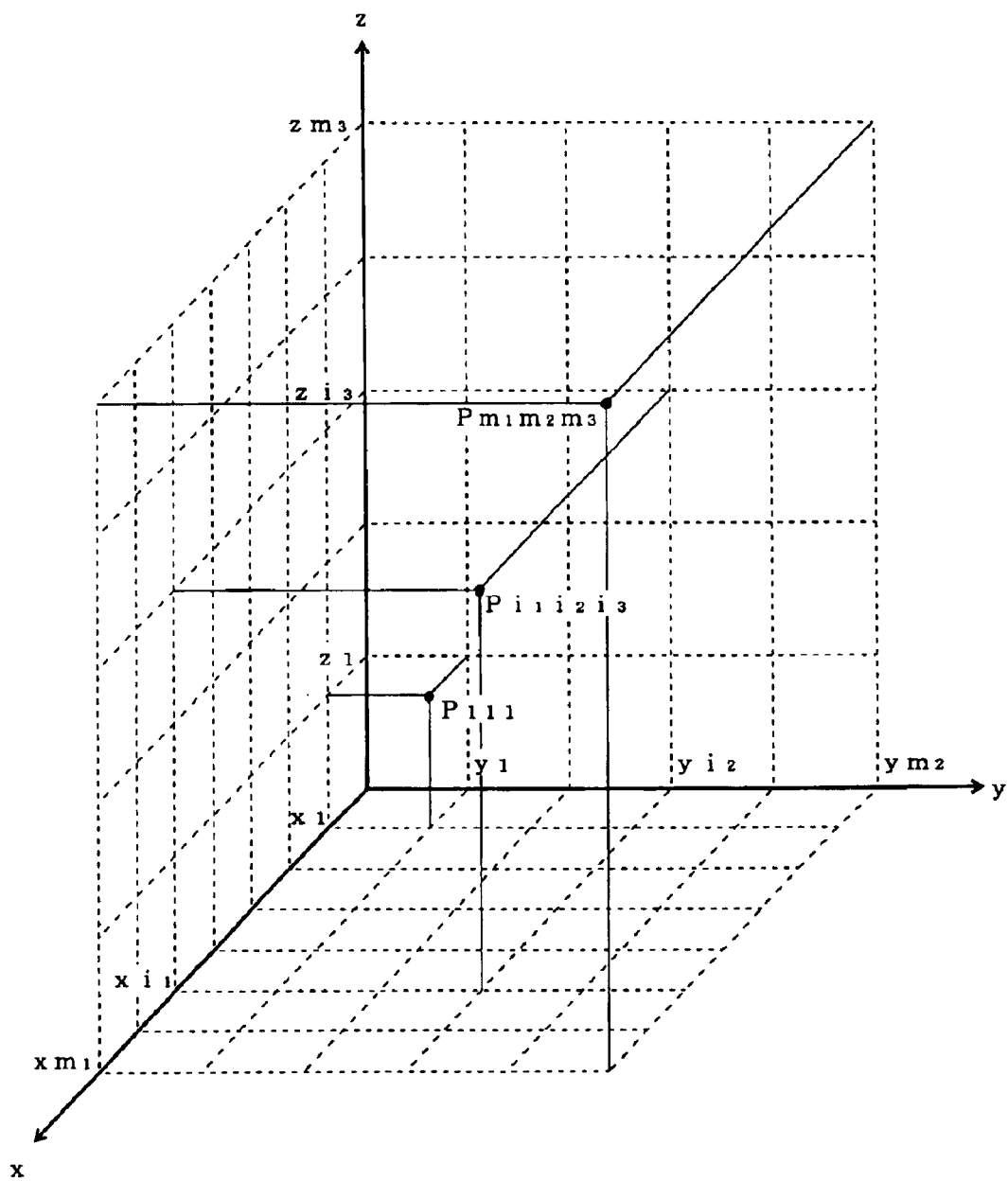
FIG. 31 is a diagram showing a density distribution of a solid.

FIG. 31 shows a distribution of a solid density (mass of a unit volume). As shown in FIG. 31, the solid is constituted of $m_1 \times m_2 \times m_3$ pieces of sections obtained by partitioning the solid into $m_1$ pieces in an x-direction, $m_2$ pieces in a y-direction and $m_3$ pieces in a z-direction. Here, if it is assumed that a density of a solid in a section of the $i_1$-th in the x-direction, of the $i_2$-th in the y-direction and of the $i_3$-th in the z-direction is $Pi_1 i_2 i_3$, a normalized density $pi_1 i_2 i_3$ can be calculated by the following equation 15 instead of the equation 2.

[Equation 15]

$$pi_1 i_2 i_3 = \frac{P i_1 i_2 i_3}{\sum_{j_1=1}^{m_1} \sum_{j_2=1}^{m_2} \sum_{j_3=1}^{m_3} P j_1 j_2 j_3} \quad (15)$$

$(i_1 = 1, 2, 3, \ldots, m_1)$ $(i_2 = 1, 2, 3, \ldots, m_2)$ $(i_3 = 1, 2, 3, \ldots, m_3)$ Next, a standard pattern matrix layer H with a normalized density $pi_1 i_2 i_3$ ($i_1=1, 2, \ldots, m_1$) ($i_2=1, 2, \ldots, m_2$) ($i_3=1, 2, \ldots$, component and an input pattern matrix layer N with a normalized density $pi_1 i_2 i_3$ ($i_2=1, 2, \ldots, m_1$) ($i_2=1, 2, \ldots, m_2$) ($i_3=1, 2, \ldots$, component are prepared. These standard pattern matrix layer H and input pattern matrix layer N are expressed as in the following equations 16 and 17 instead of the equation 3. Note that, the equation 16 expresses the shape of the normalized density of the standard solid by the $m_1 \times m_2 \times m_3$ pieces of component values of the pattern matrix layer, and the equation 17 expresses the shape of the normalized density of the input solid by the $m_1 \times m_2 \times m_3$ pieces of component values of the pattern matrix layer.

[Equation 16]

$$H = \begin{pmatrix} h1 1 m_3 & \cdots & h1 i_2 m_3 & \cdots & h1 m_2 m_3 \\ h2 1 m_3 & \cdots & h2 i_2 m_3 & \cdots & h2 m_2 m_3 \\ \vdots & & \vdots & & \vdots \\ hi_1 1 m_3 & \cdots & hi_1 i_2 m_3 & \cdots & hi_1 m_2 m_3 \\ \vdots & & \vdots & & \vdots \\ hm_1 1 m_3 & \cdots & hm_1 i_2 m_3 & \cdots & hm_1 m_2 m_3 \end{pmatrix} \quad (16)$$

$$\begin{pmatrix} \cdots & \cdots & \cdots & \cdots & \cdots \\ \cdots & \cdots & \cdots & \cdots & \cdots \\ \vdots & & \vdots & & \vdots \\ \cdots & \cdots & \cdots & \cdots & \cdots \\ \vdots & & \vdots & & \vdots \\ \cdots & \cdots & \cdots & \cdots & \cdots \end{pmatrix}$$

$$\begin{pmatrix} h1 1 i_3 & \cdots & h1 i_2 i_3 & \cdots & h1 m_2 i_3 \\ h2 1 i_3 & \cdots & h2 i_2 i_3 & \cdots & h2 m_2 i_3 \\ \vdots & & \vdots & & \vdots \\ hi_1 1 i_3 & \cdots & hi_1 i_2 i_3 & \cdots & hi_1 m_2 i_3 \\ \vdots & & \vdots & & \vdots \\ hm_1 1 i_3 & \cdots & hm_1 i_2 i_3 & \cdots & hm_1 m_2 i_3 \end{pmatrix}$$

$$\begin{pmatrix} \cdots & \cdots & \cdots & \cdots & \cdots \\ \cdots & \cdots & \cdots & \cdots & \cdots \\ \vdots & & \vdots & & \vdots \\ \cdots & \cdots & \cdots & \cdots & \cdots \\ \vdots & & \vdots & & \vdots \\ \cdots & \cdots & \cdots & \cdots & \cdots \end{pmatrix}$$

$$\begin{pmatrix} h1 1 1 & \cdots & h1 i_2 1 & \cdots & h1 m_2 1 \\ h2 1 1 & \cdots & h2 i_2 1 & \cdots & h2 m_2 1 \\ \vdots & & \vdots & & \vdots \\ hi_1 1 1 & \cdots & hi_1 i_2 1 & \cdots & hi_1 m_2 1 \\ \vdots & & \vdots & & \vdots \\ hm_1 1 1 & \cdots & hm_1 i_2 1 & \cdots & hm_1 m_2 1 \end{pmatrix}$$

[Equation 17]

$$N = \begin{pmatrix} n1 1 m_3 & \cdots & n1 i_2 m_3 & \cdots & n1 m_2 m_3 \\ n2 1 m_3 & \cdots & n2 i_2 m_3 & \cdots & n2 m_2 m_3 \\ \vdots & & \vdots & & \vdots \\ ni_1 1 m_3 & \cdots & ni_1 i_2 m_3 & \cdots & ni_1 m_2 m_3 \\ \vdots & & \vdots & & \vdots \\ nm_1 1 m_3 & \cdots & nm_1 i_2 m_3 & \cdots & nm_1 m_2 m_3 \end{pmatrix} \quad (17)$$

$$\begin{pmatrix} \cdots & \cdots & \cdots & \cdots & \cdots \\ \cdots & \cdots & \cdots & \cdots & \cdots \\ \vdots & & \vdots & & \vdots \\ \cdots & \cdots & \cdots & \cdots & \cdots \\ \vdots & & \vdots & & \vdots \\ \cdots & \cdots & \cdots & \cdots & \cdots \end{pmatrix}$$

$$\begin{pmatrix} n1 1 i_3 & \cdots & n1 i_2 i_3 & \cdots & n1 m_2 i_3 \\ n2 1 i_3 & \cdots & n2 i_2 i_3 & \cdots & n2 m_2 i_3 \\ \vdots & & \vdots & & \vdots \\ ni_1 1 i_3 & \cdots & ni_1 i_2 i_3 & \cdots & ni_1 m_2 i_3 \\ \vdots & & \vdots & & \vdots \\ nm_1 1 i_3 & \cdots & nm_1 i_2 i_3 & \cdots & nm_1 m_2 i_3 \end{pmatrix}$$

-continued $$\begin{pmatrix} \cdots & \cdots & \cdots & \cdots & \cdots \\ \cdots & \cdots & \cdots & \cdots & \cdots \\ \vdots & & \vdots & & \vdots \\ \cdots & \cdots & \cdots & \cdots & \cdots \\ \vdots & & \vdots & & \vdots \\ \cdots & \cdots & \cdots & \cdots & \cdots \end{pmatrix}$$

$$\begin{pmatrix} n111 & \cdots & n1i_2 1 & \cdots & n1m_2 1 \\ n211 & \cdots & n2i_2 1 & \cdots & n2m_2 1 \\ \vdots & & \vdots & & \vdots \\ ni_1 11 & \cdots & ni_1 i_2 1 & \cdots & ni_1 m_2 1 \\ \vdots & & \vdots & & \vdots \\ nm_1 11 & \cdots & nm_1 i_2 1 & \cdots & nm_1 m_2 1 \end{pmatrix}$$

Figure 32:
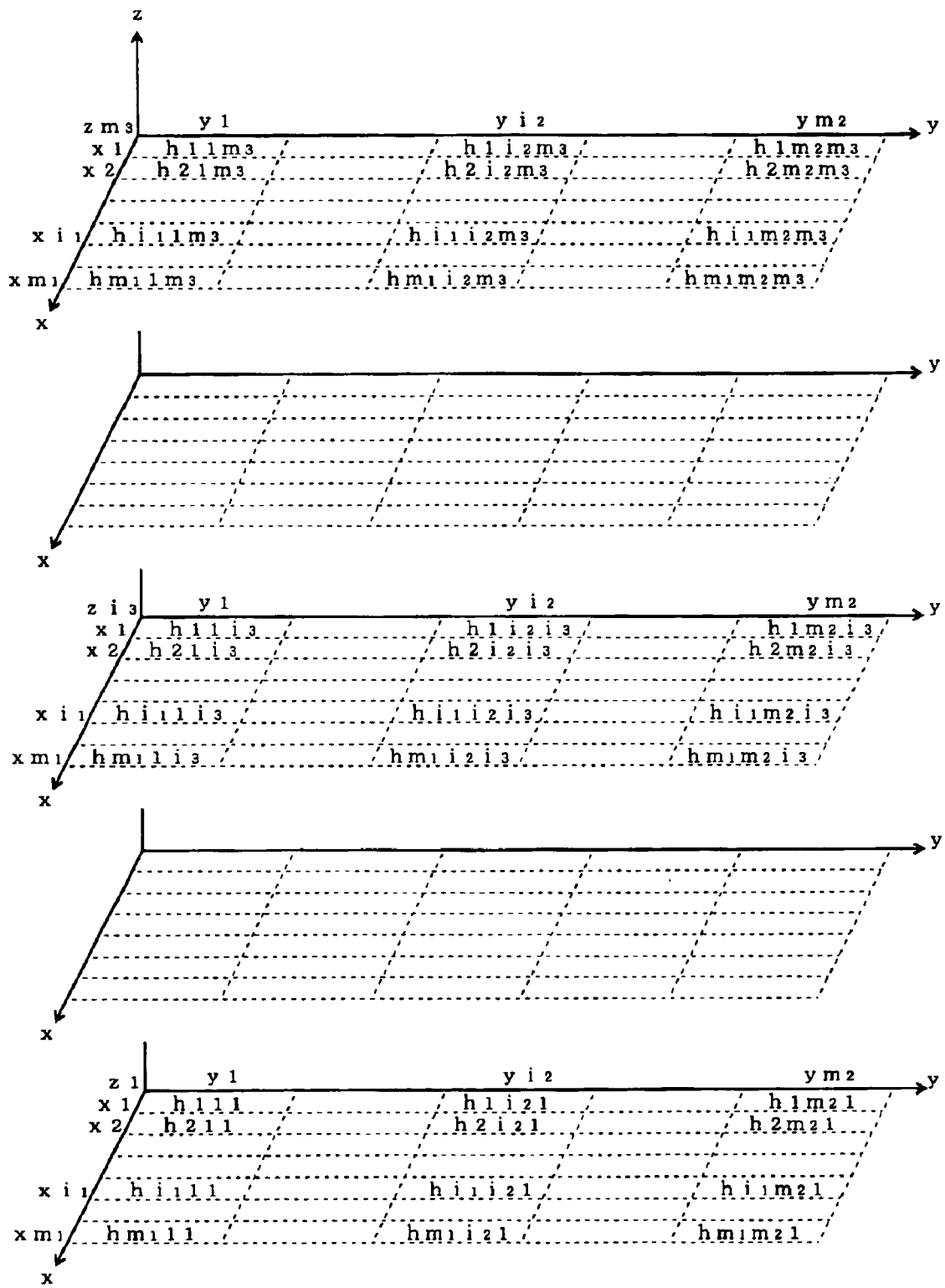
FIG. 32 is diagrams showing a method for expressing a standard pattern matrix layer in an (x-y-z) space.
Figure 33:
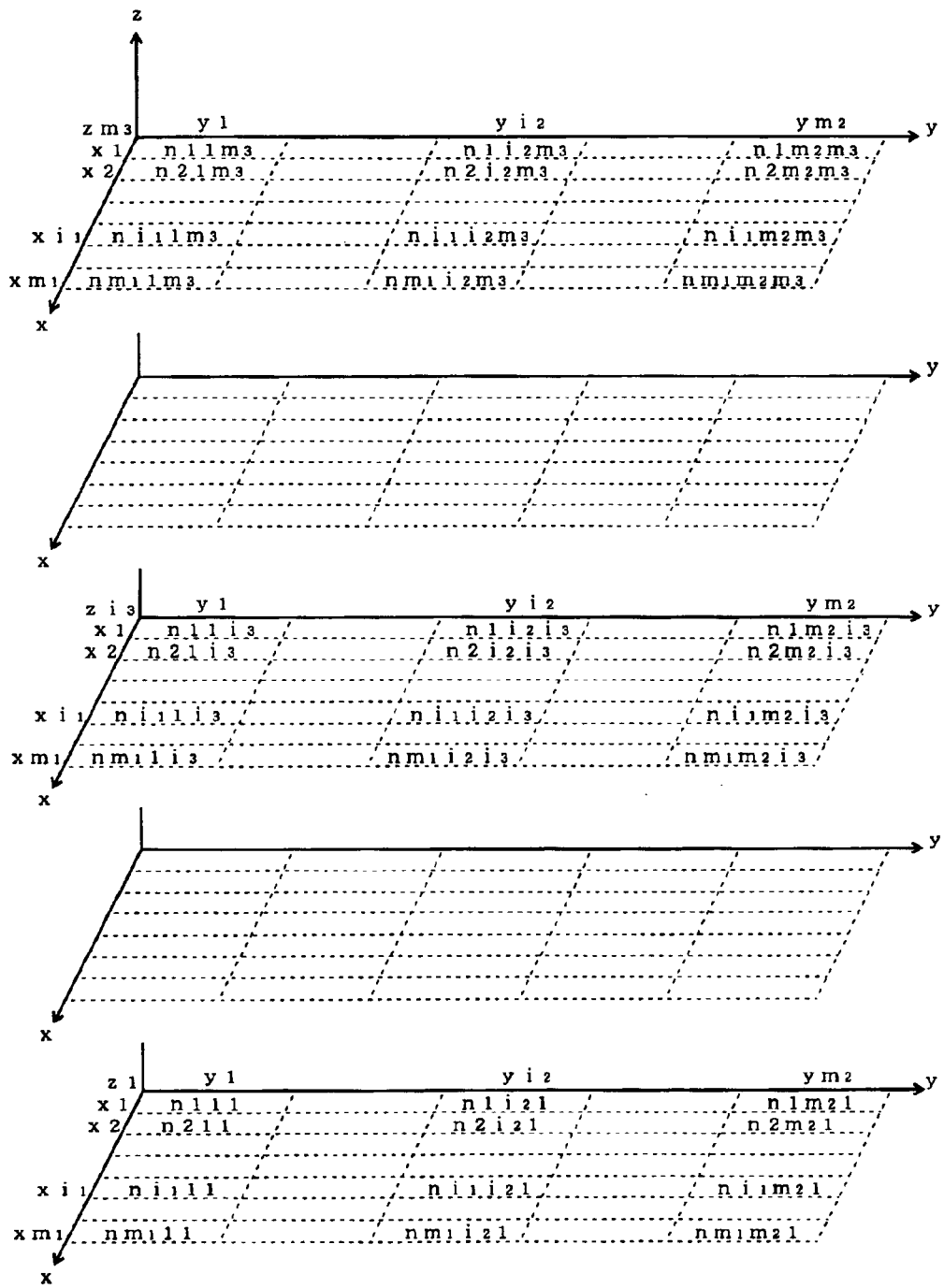
FIG. 33 is diagrams showing a method for expressing an input pattern matrix layer in the (x-y-z) space.
Figure 34:
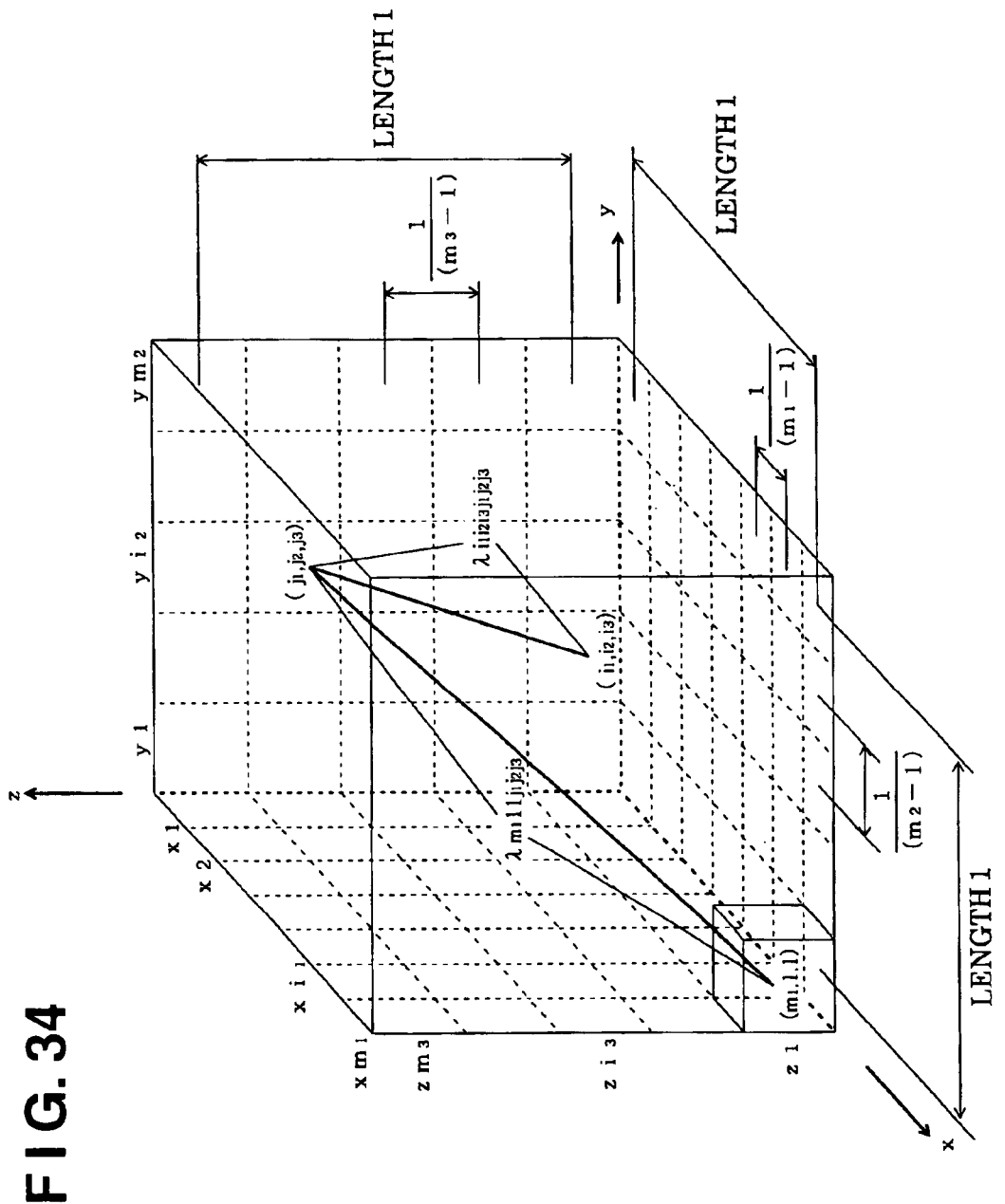
FIG. 34 is a diagram showing an (x-y-z) normalized space.

FIG. 32 shows the standard pattern matrix layer H expressed in an (x-y-z) space, and FIG. 33 shows the input pattern matrix layer N expressed in an (x-y-z) space, similarly. Moreover, FIG. 34 shows an (x-y-z) normalized space with a longitudinal length, a lateral length and a height of each of the spaces in FIGS. 32 and 33 set as 1. Accordingly, as shown in FIG. 34, the longitudinal length between the components is expressed as: $1/(m_1-1)$, the lateral length between the components is expressed as: $1/(m_2-1)$, and the height between the components is expressed as: $1/(m_3-1)$.

Figure 35A:
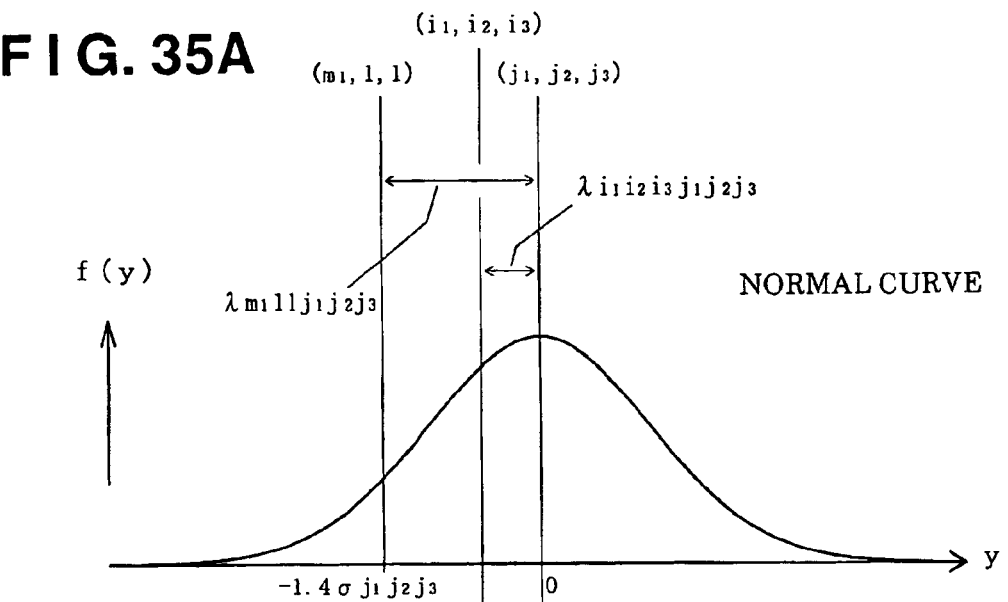
FIG. 35A is a graph showing one example of a normal curve.
Figure 35B:
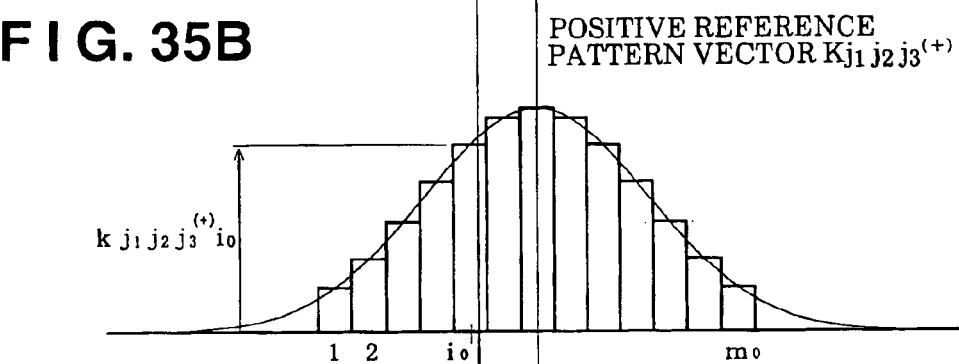
FIG. 35B is a graph showing one example of a positive reference pattern vector with a value of the normal curve as a component.
Figure 35C:
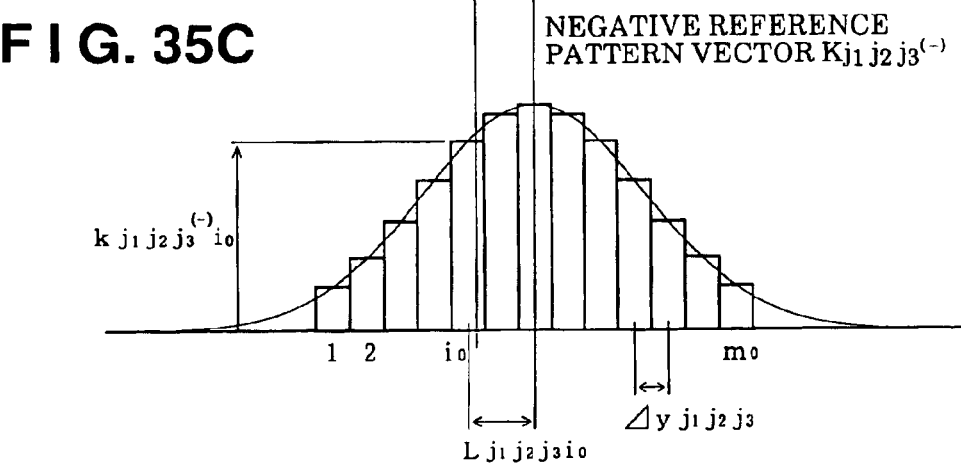
FIG. 35C is a graph showing one example of a negative reference pattern vector with the value of the normal curve as a component.

FIG. 35A is a graph showing the normal distribution (normal curve) of the equation 4 when the mean value is: $\mu=0$ and the variance is $\sigma j_1 j_2 j_3^2$. FIGS. 35B and 35C show bar graphs with heights equal to the function values of the normal curve. Here, a positive reference pattern vector $Kj_1 j_2 j_3^{(+)}$ with a value of the height of the bar graph as a component is prepared as shown in FIG. 35B, a negative reference pattern vector $Kj_1 j_2 j_3^{(-)}$ with a value of the height of the bar graph as a component is prepared as shown in FIG. 35C, each of which is expressed as in the following equation 18 instead of the equation 5. The equation 18 expresses the shape of the normal distribution by the $m_0$ pieces of component values in vectors. While each of the equations 16 and 17 expresses the (three-dimensional) matrix layers, the equation 18 expresses (one-dimensional) vectors. As understood from FIGS. 35A to 35C, the pair of reference pattern vectors $Kj_1 j_2 j_3^{(+)}$ and $Kj_1 j_2 j_3^{(-)}$ are the vectors equivalent to each other. Note that, the index $j_1 j_2 j_3$ in the equation 18 corresponds to the point $(j_1, j_2, j_3)$ shown in FIG. 34, and the $m_0$ in the equation 18 may be an arbitrary natural number different from $m_1$, $m_2$ and $m_3$ in the equations 16 and 17.

[Equation 18]

$$Kj_1 j_2 j_3^{(+)} = (kj_1 j_2 j_3^{(+)} 1, kj_1 j_2 j_3^{(+)} 2, \ldots ,$$

$$kj_1 j_2 j_3^{(+)} i_0, \ldots , kj_1 j_2 j_3^{(+)} m_0)$$

$$Kj_1 j_2 j_3^{(-)} = (kj_1 j_2 j_3^{(-)} 1, kj_1 j_2 j_3^{(-)} 2, \ldots ,$$

$$kj_1 j_2 j_3^{(-)} i_0, \ldots , kj_1 j_2 j_3^{(-)} m_0)$$

$$(j_1 = 1, 2, 3, \ldots , m_1)$$

$$(j_2 = 1, 2, 3, \ldots , m_2)$$

$$(j_3 = 1, 2, 3, \ldots , m_3)$$

Meanwhile, in FIG. 34, the point $(j_1, j_2, j_3)$ and the point $(i_1, i_2, i_3)$ in the (x-y-z) normalized space are shown. Moreover, among the entire points in the space, the farthest point $(m_1, 1, 1)$ from the point $(j_1, j_2, j_3)$ is also shown. Hence, a length $\lambda i_1 i_2 i_3 j_1 j_2 j_3$ between the point $(j_1, j_2, j_3)$ and the point $(i_1, i_2, i_3)$ can be calculated by the following equation 19 instead of the equation 6. Similarly, a length $\lambda m_1 11 j_1 j_2 j_3$ between the point $(j_1, j_2, j_3)$ and the point $(m_1, 1, 1)$ can be calculated by the following equation 20 instead of the equation 7. The length $\lambda m_1 11 j_1 j_2 j_3$ is the maximum value between the point $(j_1, j_2, j_3)$ and each point.

[Equation 19]

When $(i_1=1, 2, 3, \ldots , m_1, i_2=1, 2, 3, \ldots , m_2$ and $i_3=1, 2, 3, \ldots , m_3$;

$$\lambda i_1 i_2 i_3 j_1 j_2 j_3 = \sqrt{\left\{\frac{(i_1 - j_1)}{(m_1 - 1)}\right\}^2 + \left\{\frac{(i_2 - j_2)}{(m_2 - 1)}\right\}^2 + \left\{\frac{(i_3 - j_3)}{(m_3 - 1)}\right\}^2} \quad (19)$$

$$(j_1 = 1, 2, 3, \ldots , m_1)$$

$$(j_2 = 1, 2, 3, \ldots , m_2)$$

$$(j_3 = 1, 2, 3, \ldots , m_3)$$

[Equation 20]

$$\lambda m_1 11 j_1 j_2 j_3 = \sqrt{\left\{\frac{(m_1 - j_1)}{(m_1 - 1)}\right\}^2 + \left\{\frac{(1 - j_2)}{(m_2 - 1)}\right\}^2 + \left\{\frac{(1 - j_3)}{(m_3 - 1)}\right\}^2} \quad (20)$$

$$(j_1 = 1, 2, 3, \ldots , m_1)$$

$$(j_2 = 1, 2, 3, \ldots , m_2)$$

$$(j_3 = 1, 2, 3, \ldots , m_3)$$

Moreover, while the normal curve shown in FIG. 7A two-dimensionally shows the two normal curves shown in FIG. 9 in a superposed manner, the normal curve shown in FIG. 35A is the one obtained by extending the curve of FIG. 9 by one dimension in the same manner, which cannot be geometrically expressed. In FIG. 35A, the point $(j_1, j_2, j_3)$ is made to correspond to the value y=0, and the point $(m_1, 1, 1)$ is made to correspond to the value $y=-1.4\sigma j_1 j_2 j_3$. Accordingly, the point $(i_1, i_2, i_3)$ corresponds to the value of y between the value y=0 and the value $y=-1.4\sigma j_1 j_2 j_3$.

Furthermore, the length $\lambda m_1 11 j_1 j_2 j_3$ between the point $(j_1, j_2, j_3)$ and the point $(m_1, 1, 1)$ can be calculated by the equation 20, and the length $\lambda m_1 11 j_1 j_2 j_3$ is also a length between 0 and $-1.4\sigma j_1 j_2 j_3$ on the y-axis FIG. 35A. Hence, the variance of the normal distribution can be calculated by the following equation 21 instead of the equation 8.

[Equation 21]

$$\sigma j_1 j_2 j_3 = \frac{\lambda m_1 11 j_1 j_2 j_3}{1.4} \quad (21)$$

$$(j_1 = 1, 2, 3, \ldots , m_1)$$

$$(j_2 = 1, 2, 3, \ldots , m_2)$$

$$(j_3 = 1, 2, 3, \ldots , m_3)$$

If the variance of the normal distribution is calculated by the foregoing method, the principal component of the normal distribution (in a range of: $-1.4\sigma \leq y \leq +1.4\sigma$ in the case of the equation 21) can cover the entire (x-y-z) normalized space. Specifically, the normal curve is determined by applying the variance of the normal distribution obtained by the equation 21 to the equation 4, and the positive reference pattern vector $Kj_1 j_2 j_3^{(+)}$ and the negative reference pattern vector $Kj_1 j_2 j_3^{(-)}$ can be prepared by applying the value to FIGS. 35B and 35C and the equation 18.

Here, under the condition where the $j_1 j_2 j_3$ component as a specified component of the pattern matrix layer is fixed to a trio of values: $j_1=1$ to $m_1$; $j_2=1$ to $m_2$; and $j_3=1$ to $m_3$, considered is each $i_1 i_2 i_3$ component $(i_1=1, 2, \ldots , m_1)(i_2=1,$ 2, . . . , $m_2$) ($i_3$=1, 2, . . . , $m_3$) of the pattern matrix layer. The length $\lambda i_1 i_2 i_3 j_1 j_2 j_3$ between the point ($j_1, j_2, j_3$) and the point ($i_1, i_2, i_3$) can be calculated by the equation 19, and the length $\lambda i_1 i_2 i_3 j_1 j_2 j_3$ is also the deviation value from the mean value of the normal distribution as shown in FIG. 35A.

Meanwhile, as shown in FIG. 35C, when an interval between the adjacent components of the reference pattern vector is set as $\Delta y j_1 j_2 j_3$, a deviation value $L j_1 j_2 j_3 i_0$ from the mean value of the normal distribution, which corresponds to the component number $i_0$ ($i_0$=1, 2, . . . , $m_0$), can be calculated by the following equation 22 instead of the equation 9. Here, it is assumed that each interval between the adjacent components of the reference pattern vector are equal from one to another. Moreover, in the equation 22, ($m_0$+1)/2 is a component number in the center of the reference pattern vector.

[Equation 22]

$$L j_1 j_2 j_3 i_0 = \left| i_0 - \frac{m_0 + 1}{2} \right| \times \Delta y j_1 j_2 j_3 \quad (22)$$

$$(i_0 = 1, 2, 3, \ldots, m_0)$$

$$(j_1 = 1, 2, 3, \ldots, m_1)$$

$$(j_2 = 1, 2, 3, \ldots, m_2)$$

$$(j_3 = 1, 2, 3, \ldots, m_3)$$

In each of FIGS. 35A, 35B and 35C, a relation between the foregoing $\lambda i_1 i_2 i_3 j_1 j_2 j_3$ and $L j_1 j_2 j_3 i_0$ is shown. FIG. 35A shows that $\lambda i_1$ is a length between the point ($j_1, j_2, j_3$) and the point ($i_1, i_2, i_3$). Moreover, FIGS. 35B and 35C show that a number of each component of the positive reference pattern vector and the negative reference pattern vector, which is proximate to a position apart by $\lambda i_1 i_2 i_3 j_1 j_2 j_3$ from the center of each of the positive reference pattern vector and the negative reference pattern vector, is $i_0$, and that a deviation value from the mean value of the normal distribution, which corresponds to the component number $i_0$, is $L j_1 j_2 j_3 i_0$.

Specifically, when the $j_1 j_2 j_3$ component and the $i_1 i_2 i_3$ component of the pattern matrix layer are given, the length $\lambda i_1 i_2 i_3 j_1 j_2 j_3$ between these two points is calculated by the equation 19. Then, with regard to the reference pattern vectors, the component number $i_0$, the deviation value $L j_1 j_2 j_3 i_0$ from the mean value of the normal distribution and the component values $k j_1 j_2 j_3^{(+)} i_0$ and $k j_1 j_2 j_3^{(-)} i_0$ are obtained.

Here, when the number $m_0$ of each component of the reference pattern vectors is made sufficiently large in advance, specifically, when $\Delta y j_1 j_2 j_3$ is made sufficiently small in advance, an error between the value $\lambda i_1 i_2 i_3 j_1 j_2 j_3$ and the value $L j_1 j_2 j_3 i_0$ can be made sufficiently small, thus a highly precise calculation result can be obtained. Moreover, since the component number $i_0$ and the component number ($m_0 - i_0 + 1$) are symmetrical with respect to the mean value of the normal distribution, ($m_0 - i_0 + 1$) may be used instead of $i_0$.

Next, the shape change between the standard pattern matrix layer H and the input pattern matrix layer N is replaced with the shape changes of the positive reference pattern vector $K j_1 j_2 j_3^{(+)}$ and the negative reference pattern vector $K j_1 j_2 j_3^{(-)}$. Specifically, with regard to the $i_1 i_2 i_3$ component ($i_1$=1, 2, . . . , $m_1$) ($i_2$=1, 2, . . . , $m_2$) ($i_3$=1, 2, . . . , $m_3$) of the pattern matrix layer, an absolute value of an amount of change between a component value $h i_1 i_2 i_3$ of the standard pattern matrix layer H and a component value $n i_1 i_2 i_3$ of the input pattern matrix layer N is $|n i_1 i_2 i_3 - h i_1 i_2 i_3|$. Then, as shown in the following equation 23 instead of the equation 10, when $n i_1 i_2 i_3$ is greater than $h i_1 i_2 i_3$, the component value $k j_1 j_2 j_3^{(+)} i_0$ of the positive reference pattern vector $K j_1 j_2 j_3^{(+)}$ is increased by the absolute value $|n i_1 i_2 i_3 - h i_1 i_2 i_3|$ of this amount change. And when $n i_1 i_2 i_3$ is smaller than $h i_1 i_2 i_3$, the component value $k j_1 j_2 j_3^{(-)} i_0$ of the negative reference pattern vector $K j_1 j_2 j_3^{(-)}$ is increased by absolute value $|n i_1 i_2 i_3 - h i_1 i_2 i_3|$ of this amount of change.

[Equation 23]

When $i_1$=1, 2, 3, . . . , $m_1$, $i_2$=1, 2, 3, . . . , $m_2$ and $i_3$=1, 2, 3, . . . , $m_3$;

if $n i_1 i_2 i_3 > h i_1 i_2 i_3$, $k j_1 j_2 j_3^{(+)} i_0$ is increased by $|n i_1 i_2 i_3 - h i_1 i_2 i_3|$, if $n i_1 i_2 i_3 < h i_1 i_2 i_3$, $k j_1 j_2 j_3^{(-)} i_0$ is increased by $|n i_1 i_2 i_3 - h i_1 i_2 i_3|$.

($j_1$=1, 2, 3, . . . , $m_1$)

($j_2$=1, 2, 3, . . . , $m_2$)

($j_3$=1, 2, 3, . . . , $m_3$) (23)

Accordingly, if the value of the variance of the normal distribution is calculated by the equation 21, and the component values $k j_1 j_2 j_3^{(+)} i_0$ and $k j_1 j_2 j_3^{(-)} i_0$ of the reference pattern vectors are increased by the equation 23, then, for every combination of the $j_1 j_2 j_3$ components and the $i_1 i_2 i_3$ components of the pattern matrix layer, the value of $f(y)$ can be increased in the range of $-1.4\sigma \leq y \leq +1.4\sigma$.

In the usual case, almost all portions of the shape in the input pattern matrix layer are changed from the shape in the standard pattern matrix layer. Hence, the equation 19 is executed to calculate every length in all the changed portions, and the equation 23 is executed to calculate every shape change in all the changed portions. Moreover, the equation 23 is set for obtaining not an absolute shape but a relative shape change. Accordingly, the equation 23 is applicable to any arbitrary shaped standard pattern matrix layer and input pattern matrix layer.

Next, with regard to a pair of the reference pattern vectors (the positive reference pattern vector $K j_1 j_2 j_3^{(+)}$ and the negative reference pattern vector $K j_1 j_2 j_3^{(-)}$), in which shapes are changed by the equation 23, each size of such shape changes is numerically evaluated as an amount of change in kurtosis.

Here, a kurtosis $A j_1 j_2 j_3^{(+)}$ of the positive reference pattern vector $K j_1 j_2 j_3^{(+)}$ and a kurtosis $A j_1 j_2 j_3^{(-)}$ of the negative reference pattern vector $K j_1 j_2 j_3^{(-)}$ can be calculated by the following equation 24 instead of the equation 11, respectively. $L j_1 j_2 j_3 i_0$ ($i_0$=1, 2, . . . , $m_0$) in the equation 24 is a deviation value from the mean value of the normal distribution similarly to FIGS. 10A to 10C, which is previously set by the equation 22 at an arbitrary value in a range where a feature of the shape in the normal distribution can be expressed.

[Equation 24]

$$A j_1 j_2 j_3^{(+)} = \frac{\left\{ \sum_{i_0=1}^{m_0} k j_1 j_2 j_3^{(+)} i_0 \right\} \cdot \left\{ \sum_{i_0=1}^{m_0} (L j_1 j_2 j_3 i_0)^4 \cdot k j_1 j_2 j_3^{(+)} i_0 \right\}}{\left\{ \sum_{i_0=1}^{m_0} (L j_1 j_2 j_3 i_0)^2 \cdot k j_1 j_2 j_3^{(+)} i_0 \right\}^2} \quad (24)$$

$$Aj_1j_2j_3^{(-)} = \frac{\left\{\sum_{i_0=1}^{m_0} kj_1j_2j_3^{(-)}i_0\right\} \cdot \left\{\sum_{i_0=1}^{m_0} (Lj_1j_2j_3i_0)^4 \cdot kj_1j_2j_3^{(-)}i_0\right\}}{\left\{\sum_{i_0=1}^{m_0} (Lj_1j_2j_3i_0)^2 \cdot kj_1j_2j_3^{(-)}i_0\right\}^2}$$

$(j_1 = 1, 2, 3, \ldots, m_1)$ $(j_2 = 1, 2, 3, \ldots, m_2)$ $(j_3 = 1, 2, 3, \ldots, m_3)$ The kurtosis $Aj_1j_2j_3^{(+)}$ and the kurtosis $Aj_1j_2j_3^{(-)}$, which are calculated by the equation 24, are ratios of biquadratic moments around the mean value (center) of the normal distribution to squares of quadratic moments around the mean value of the normal distribution.

Not only the kurtosis value of the normal distribution but also a kurtosis value of any arbitrary reference shape can be calculated by the equation 24.

As described above, in general, a component value of the vector cannot be defined in the case of being negative in an equation for calculating the kurtosis of the vector shape. Accordingly, it is necessary that each component value of the reference pattern vector not be negative in any relation in size between the component values of the standard pattern matrix layer and the input pattern matrix layer.

For this reason, the positive reference pattern vector $Kj_1j_2j_3^{(+)}$ and the negative reference pattern vector $Kj_1j_2j_3^{(-)}$ are prepared, in which initial values thereof are equal to each other. By the equation 23, these component values are changed, but are set not to be decreased. By the equation 24, the kurtosis $Aj_1j_2j_3^{(+)}$ and the kurtosis $Aj_1j_2j_3^{(-)}$ are calculated, respectively.

Next, from two amounts of changes of the kurtosis $Aj_1j_2j_3^{(+)}$ of the positive reference pattern vector and the kurtosis $Aj_1j_2j_3^{(-)}$ of the negative reference pattern vector, a difference between these two amounts of changes $(Aj_1j_2j_3^{(+)}-Aj_1j_2j_3^{(-)})$ is calculated to be set as a shape change amount $Dj_1j_2j_3$ representing a similarity between the standard pattern matrix layer and the input pattern matrix layer.

For example, a value of the kurtosis $Aj_1j_2j_3^{(+)}$ of the reference pattern vector $Kj_1j_2j_3^{(+)}$ and a value of the kurtosis $Aj_1j_2j_3^{(-)}$ of the reference pattern vector $Kj_1j_2j_3^{(-)}$, which are initially set in the shape of the normal distribution by the equation 18, are equal to 3. Therefore, the amount of change in the kurtosis of the positive reference pattern vector and the amount of change in the kurtosis of the negative reference pattern vector, both of which shapes are changed by the equation 23, are equal to $\{Aj_1j_2j_3^{(+)}-3\}$ and $\{Aj_1j_2j_3^{(-)}-3\}$, respectively. Specifically, the amount of change in a positive direction is $\{Aj_1j_2j_3^{(+)}-3\}$, and the amount of change in a negative direction is $\{Aj_1j_2j_3^{(-)}-3\}$. The overall amount of change is a difference therebetween. Hence, the shape change amount $Dj_1j_2j_3$ can be calculated by the following equation 25 instead of the equation 12.

[Equation 25]

$$Dj_1j_2j_3 = \{Aj_1j_2j_3^{(+)}-3\} - \{Aj_1j_2j_3^{(-)}-3\} \quad (25)$$
$$= Aj_1j_2j_3^{(+)} - Aj_1j_2j_3^{(-)}$$

$(j_1 = 1, 2, 3, \ldots, m_1)$ $(j_2 = 1, 2, 3, \ldots, m_2)$ $(j_3 = 1, 2, 3, \ldots, m_3)$ Next, consideration is made for the shape change amounts $Dj_1j_2j_3$ calculated by the equation 25. Specifically, when the normalized density of the input solid is relatively stronger than the normalized density of the standard solid near the center of the normal distribution (vicinity of $j_1j_2j_3$ component of the shape in the pattern matrix layer), the shape change amount $Dj_1j_2j_3$ is positive, and increases in proportion to the relative strength. Conversely, when the normalized density of the input solid is relatively weaker than the normalized density of the standard solid near the center of the normal distribution, the shape change amount $Dj_1j_2j_3$ is negative, and decreases in proportion to the relative strength.

In this connection, in the case where the mean value of the normal distribution is made to sequentially move to each position of the component of the shape in the standard pattern matrix layer, the shape change amount at each position is obtained. Specifically, in each case where the mean value of the normal distribution is made to move to the position of the $j_1j_2j_3$ component ($j_1=1, 2, \ldots, m_1$) ($j_2=1, 2, \ldots, m_2$) ($j_3=1, 2, \ldots, m_3$) of the standard pattern matrix layer, the shape change amount $Dj_1j_2j_3$ ($j_1=1, 2, \ldots, m_1$) ($j_2=1, 2, \ldots, m_2$) ($j_3=1, 2, \ldots, m_3$) is calculated by the processing procedure similar to the above-described one, which sequentially uses the equations 20, 21, 18, 22, 19, 23, 24 and 25.

In each case of the points ($j_1, j_2, j_3$) ($j_1=1, 2, \ldots, m_1$) ($j_2=1, 2, \ldots, m_2$) ($j_3=1, 2, \ldots, m_3$), the farthest point from the point ($j_1, j_2, j_3$) among the entire points in the (x-y-z) normalized space is applied to the equation 20, and the maximum value of the length between the point ($j_1, j_2, j_3$) and each point is obtained. Then, the normal distribution having a variance different for each point ($j_1, j_2, j_3$) is prepared by the equation 21. Thus, the positive reference pattern vector $Kj_1j_2j_3^{(+)}$ and the negative reference pattern vector $Kj_1j_2j_3^{(-)}$, each having the value of the normal distribution as a component, are prepared.

Moreover, $Lj_1j_2j_3i_0$ ($i_0=1, 2, \ldots, m_0$) in the equation 24 is a deviation value from each mean value of the moved normal distribution. And, $kj_1j_2j_3^{(+)}i_0$ and $kj_1j_2j_3^{(-)}i_0$ ($i_0=1, 2, \ldots, m_0$) corresponds to such $Lj_1j_2j_3i_0$.

By the processing procedure as described above, in each case corresponding to the $Dj_1j_2j_3$ component ($j_1=1, 2, \ldots, m_1$) ($j_2=1, 2, \ldots, m_2$) ($j_3=1, 2, \ldots, m_3$), the $m_1 \times m_2 \times m_3$ pieces of shape change amounts $Dj_1j_2j_3$ can be calculated.

Each of the shape change amounts $Dj_1j_2j_3$ thus obtained, that is, a difference between the kurtosis of the positive reference pattern vector and the kurtosis of the negative reference pattern vector $(Aj_1j_2j_3^{(+)}-Aj_1j_2j_3^{(-)})$, each of which shape is changed, is increased in value in the case where the center of the reference shape moves to the same position as the portion where the components of the shape in the input pattern matrix layer is increased than the shape in the standard pattern matrix layer.

Specifically, detection can be made as to in which component of the pattern matrix layer and how much stronger the normalized density of the input solid is than the normalized density of the standard solid, as a shape change amount.

Next, the difference between the shape in the standard pattern matrix layer and the shape in the input pattern matrix layer is numerically evaluated as one value of the geometric distance between two pattern matrix layers by using the $m_1 \times m_2 \times m_3$ pieces of shape change amounts $Dj_1j_2j_3$ ($j_1=1, 2, \ldots, m_1$) ($j_2=1, 2, \ldots, m_2$) ($j_3=1, 2, \ldots, m_3$) thus obtained.

The value of the geometric distance is conceived as a sum of the $m_1 \times m_2 \times m_3$ pieces of shape change amounts $Dj_1j_2j_3$. Hence, the value d of the geometric distance can be calculated by the following equation 26 instead of the equation 13.

[Equation 26]

$$d = \sqrt{\sum_{j_1=1}^{m_1} \sum_{j_2=1}^{m_2} \sum_{j_3=1}^{m_3} (Dj_1 j_2 j_3)^2} \quad (26)$$

In the equation 26, the value of the geometric distance is obtained by calculating a square root of a value that is a sum of squares of the $m_1 \times m_2 \times m_3$ pieces of shape change amounts $Dj_1 j_2 j_3$. However, as in the following equation 27 instead of the equation 14, the sum itself of the squares of the $m_1 \times m_2 \times m_3$ pieces of shape change amounts $Dj_1 j_2 j_3$ can be calculated to obtain the value d of the geometric distance.

[Equation 27]

$$d = \sum_{j_1=1}^{m_1} \sum_{j_2=1}^{m_2} \sum_{j_3=1}^{m_3} (Dj_1 j_2 j_3)^2 \quad (27)$$

The recognition for a solid is performed by use of the value of the geometric distance between the standard pattern matrix layer and the input pattern matrix layer, which is thus obtained.

Concretely, the standard pattern matrix layer with the feature amount of the standard solid as a component and the input pattern matrix layer with the feature amount of the input solid as a component are prepared. Then, the shape change between these pattern matrix layers is replaced with the shape changes of the positive reference pattern vector and the negative reference pattern vector. The sizes of these shape changes are set as the amounts of changes in kurtosis. Based on the difference between the kurtoses of the positive reference pattern vector and the negative reference pattern vector, the value of the geometric distance between the standard pattern matrix layer and the input pattern matrix layer is calculated. And, the value of the geometric distance thus obtained is compared with an arbitrarily set acceptable value. When the value of the geometric distance exceeds the acceptable value, it is judged that the input solid is not the standard solid. When the value of the geometric distance is within the acceptable value, it is judged that the input solid is the standard solid.

(V) Method for Recognizing Moving Picture

Now, description will be made for a method for detecting a similarity between moving pictures and a method for recognizing a moving picture by use of the detected value. In this embodiment, for recognizing a moving picture, a density pattern of the moving picture is normalized, and a standard pattern matrix layer and an input pattern matrix layer are prepared. Then, a shape change between these pattern matrix layers is replaced with shape changes of reference pattern vectors with values of a normal distribution as components, and sizes of the shape changes of the reference pattern vectors are numerically evaluated as amounts of changes in kurtosis. Thus, a similarity between the moving pictures is detected. Furthermore, moving picture recognition is performed by use of the detected value.

Figure 36:
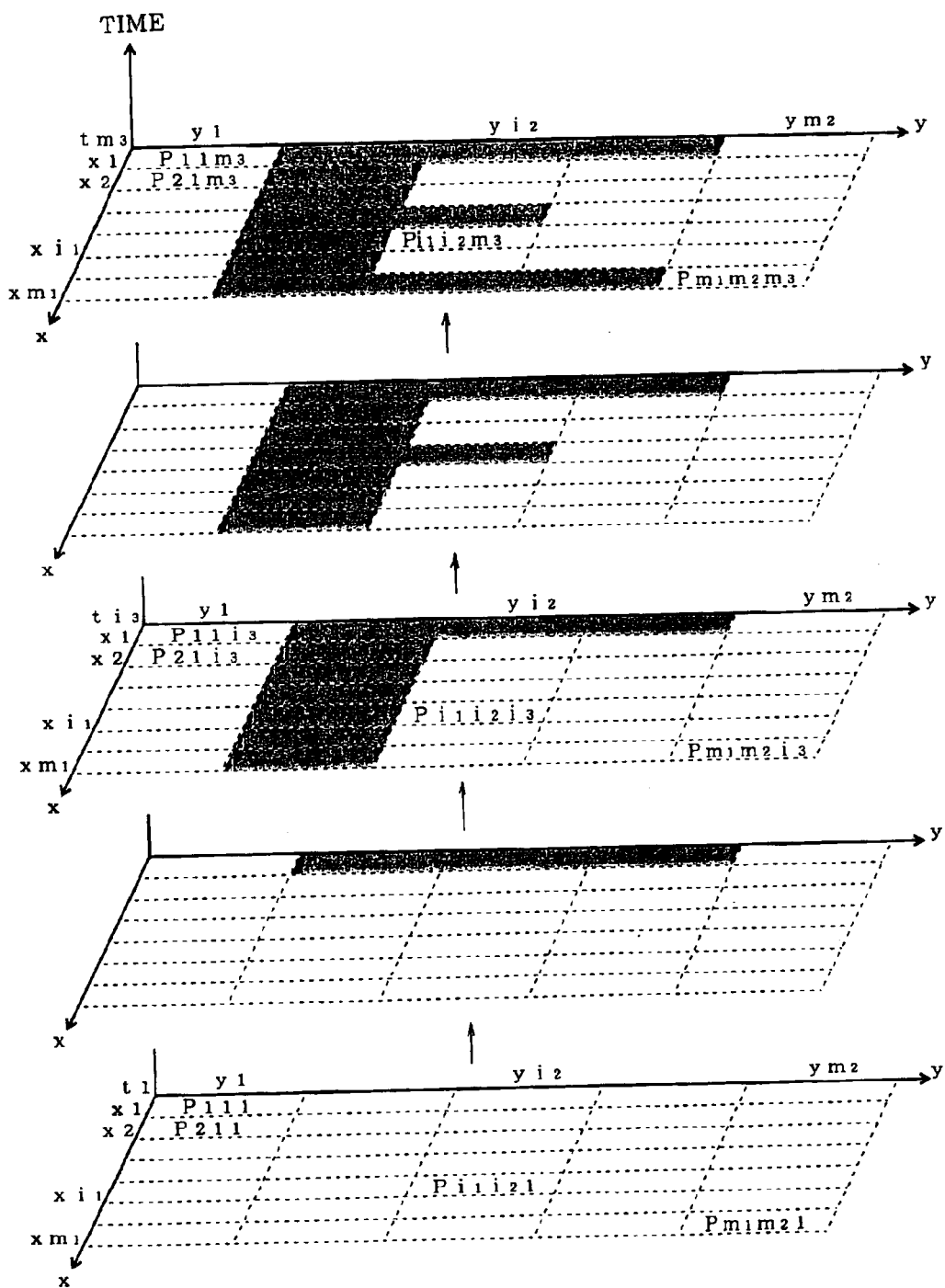
FIG. 36 is diagrams showing one example of a moving picture where a motion of a pen writing an alphabet "E" is photographed as time passes.

FIG. 36 is one example of the moving picture where a motion of a pen writing an alphabet "E" is photographed as time passes. As shown in FIG. 36, the moving picture is constituted of $m_3$ pieces of images photographed as time passes. Each image is constituted of the $m_1 \times m_2$ pieces of pixels obtained by partitioning the image into $m_1$ pieces in an x-direction and $m_2$ pieces in a y-direction. Here, if it is assumed that a density of a moving picture in a pixel of the $i_1$-th in the x-direction, of the $i_2$-th in the y-direction and of the $i_3$-th in time is $Pi_1 i_2 i_3$, a normalized density $pi_1 i_2 i_3$ can be calculated by the equation 15.

Next, a standard pattern matrix layer H with a normalized density $pi_1 i_2 i_3$ ($i_1=1, 2, \ldots, m_1$) ($i_2=1, 2, \ldots, m_2$) ($i_3=1, 2, \ldots, m_3$) of a standard moving picture as a component and an input pattern matrix layer N with a normalized density $pi_1 i_2 i_3$ ($i_1=1, 2, \ldots, m_1$) ($i_2=1, 2, \ldots, m_2$) ($i_3=1, 2, \ldots, m_3$) of an input moving picture as a component are prepared. These standard pattern matrix layer H and input pattern matrix layer N are expressed as in the equations 16 and 17. Note that, each of the equations 16 and 17 expresses the shapes in the normalized densities of the standard moving picture and the input moving picture by the $m_1 \times m_2 \times m_3$ pieces of component values of the pattern matrix layer.

Figure 37:
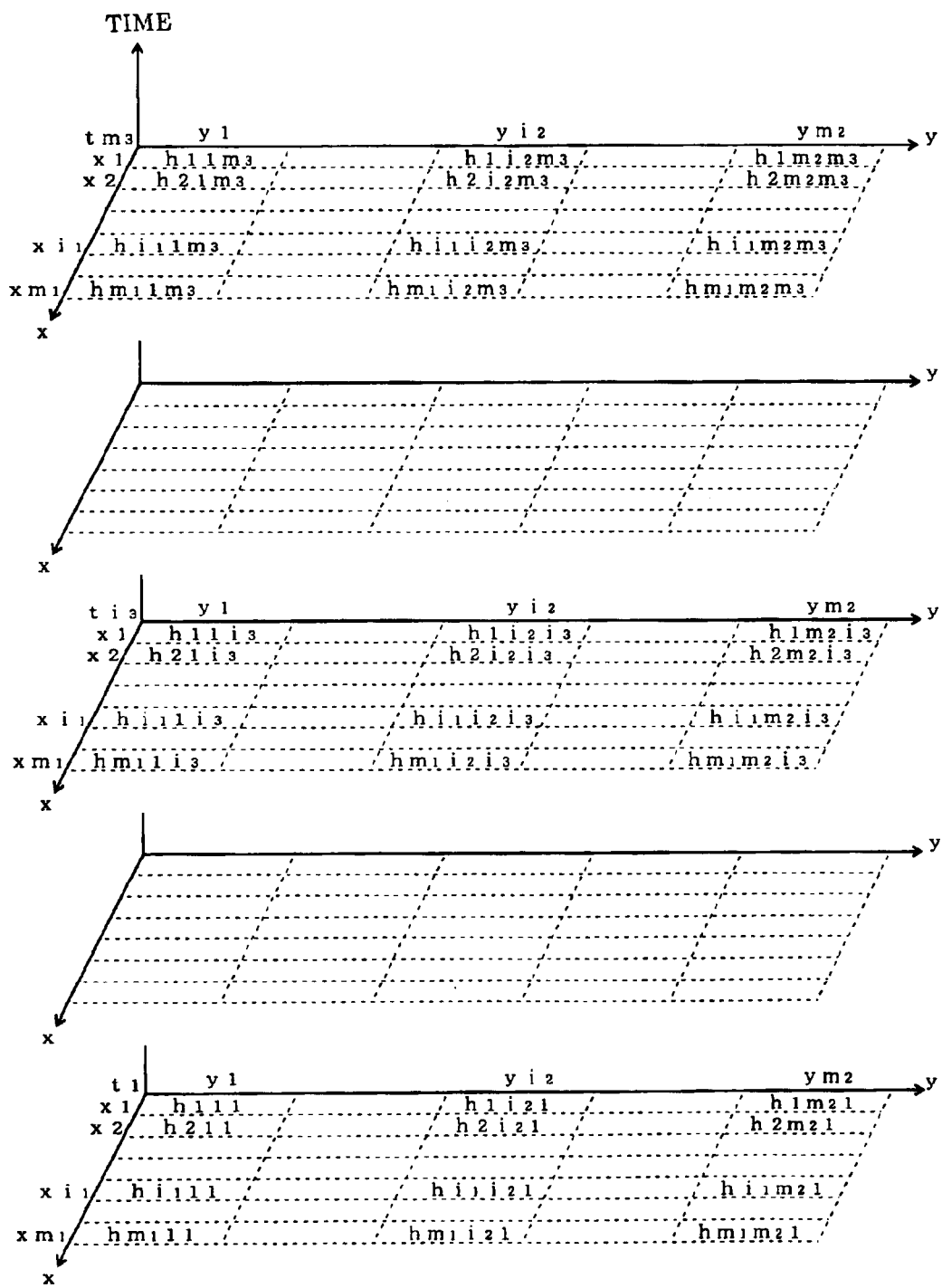
FIG. 37 is diagrams showing a method for expressing the standard pattern matrix layer in an (x-y-time) space.
Figure 38:
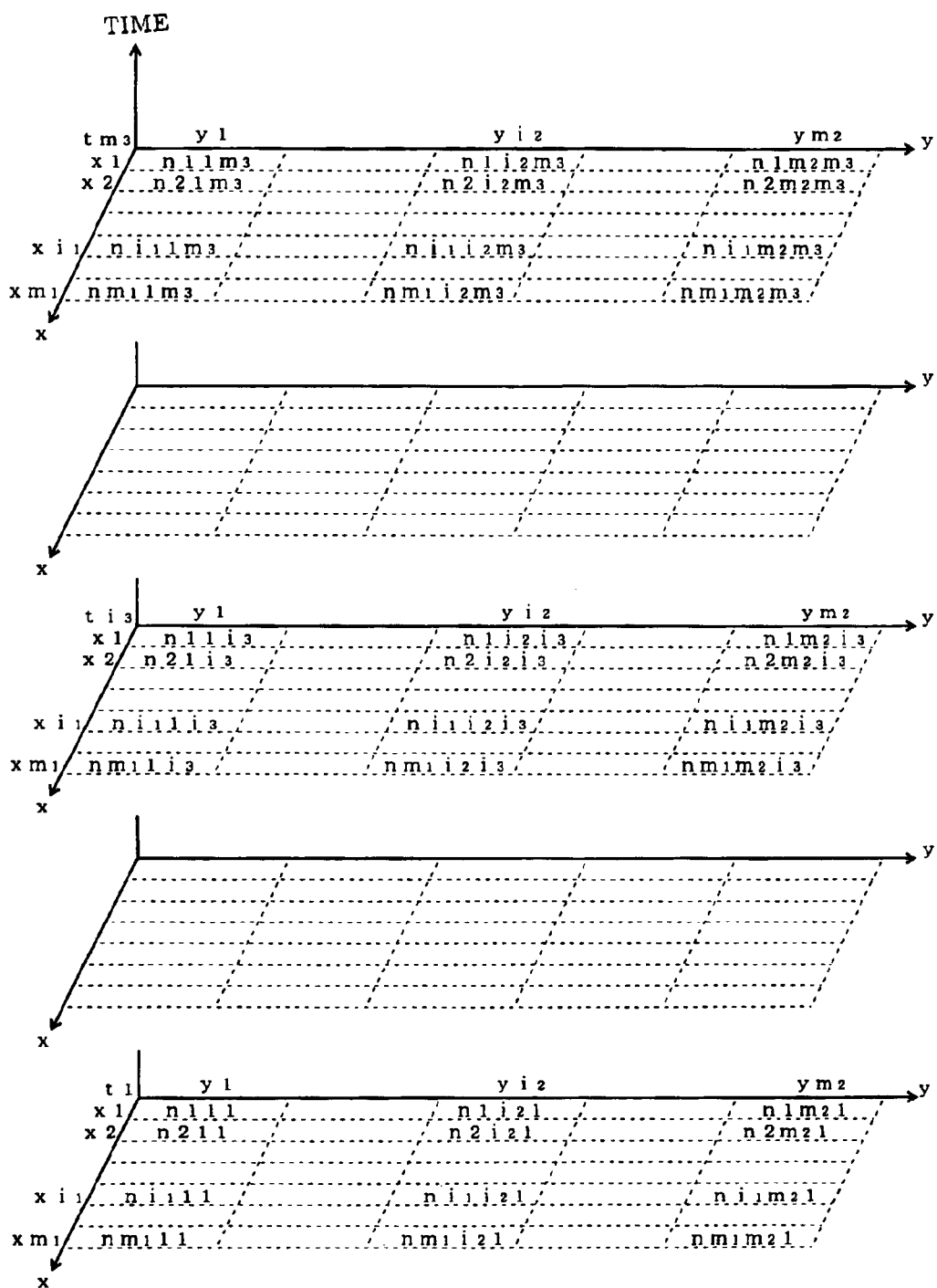
FIG. 38 is diagrams showing a method for expressing the input pattern matrix layer in the (x-y-time) space.

FIG. 37 shows the standard pattern matrix layer H expressed in an (x-y-time) space, and FIG. 38 shows the input pattern matrix layer N expressed in an (x-y-time) space.

The foregoing processing procedure for detecting a similarity between solids is applied to the standard pattern matrix layer H and the input pattern matrix layer N of the moving pictures, which have been prepared in the above-described manner. Thus, the moving picture is recognized.

Concretely, the standard pattern matrix layer with a feature amount of the standard moving picture as a component and the input pattern matrix layer with a feature amount of the input moving picture as a component are prepared. Then, the shape change between these pattern matrix layers is replaced with the shape changes of the positive reference pattern vector and the negative reference pattern vector, and sizes of the shape changes are defined as the amounts of changes in kurtosis. Based on a difference between values of the kurtoses of the positive reference pattern vector and the negative reference pattern vector, a value of a geometric distance between the standard pattern matrix layer and the input pattern matrix layer is calculated. Then, the value of the geometric distance thus obtained is compared with an arbitrarily set acceptable value. When the value of the geometric distance exceeds the acceptable value, it is judged that the input moving picture is not the standard moving picture, and when the value of the geometric distance is within the acceptable value, it is judged that the input moving picture is the standard moving picture.

As above, description has been made for the method for recognizing a voice, the method for judging an abnormality in a machine and the method for recognizing an image, each of which uses a detected value of a similarity between (two-dimensional) two pattern matrices, and for the method for recognizing a solid and the method for recognizing a moving picture, each of which uses a detected value of a similarity between (three-dimensional) two pattern matrix layers.

Note that, in the above embodiments, the normal distribution having a variance different for each specified component of the pattern matrix (or the pattern matrix layer) is prepared, and the value of the geometric distance is calculated. However, for saving a storage capacity of the computer or shortening the processing time, one typical normal distribution having a variance equal in the entire specified components of the pattern matrix (or the pattern matrix layer) may be prepared to calculate the value of the geometric distance.

In this case, for every combination of the $j_1 j_2$ component and the $i_1 i_2$ component of the pattern matrix (or the $Dj_1 j_2 j_3$ component and the $i_1 i_2 i_3$ component of the pattern matrix layer), the value of f(y) is set to be increased in the range of: $-2.1\sigma \leq y \leq +2.1\sigma$ of the normal distribution shown in FIG. 8 (the range of y indicated by the codes (i) and (ii) in FIG. 8).

Moreover, in the above embodiments, the value of the geometric distance is calculated by use of the normal distribution as a reference shape. However, the value of the geometric distance may be calculated by use of an arbitrary shape such as a rectangle as a reference shape.

The above will be understood because the equation 12 (or the equation 25) clarifies that the shape change amount $Dj_1j_2$ (or the shape change amount $Dj_1j_2j_3$) is not affected by the kurtosis of the reference shape during initialization.

Furthermore, in the above embodiments, the power spectrums of the voice or the vibration wave are extracted by use of a group of analog band-pass filters. However, the power spectrums may be extracted by use of fast Fourier transform and the like.

Still further, in the above embodiments, the value of the geometric distance is calculated by use of the power spectrum as a feature amount of the voice or the vibration wave. However, the value of the geometric distance may be calculated by use of a plurality of linear predictive coefficients or the like as a feature amount of the voice or the vibration wave.

Yet further, in the above embodiments, the value of the geometric distance is calculated by use of the density as a feature amount of the solid. However, the value of the geometric distance may be calculated by use of a density of a three-dimensional computed tomography (CT) image or the like as a feature amount of the solid.

Yet further, in the above embodiments, with regard to the voice, the vibration wave, the image, the solid and the moving picture, the value of the geometric distance between the standard pattern matrix (or the standard pattern matrix layer) and the input pattern matrix (or the input pattern matrix layer) is calculated. However, in general, the value of the geometric distance between the standard pattern matrix (or the standard pattern matrix layer) and the input pattern matrix (or the input pattern matrix layer) is calculated with regard to an arbitrary diagram or an arbitrary pattern regardless of a plane and a space. By the value of the geometric distance obtained, a similarity with regard to the diagram or the pattern can be detected. Moreover, based on the detected value of the similarity, various kinds of processing such as analysis for the diagram or the pattern can be performed.

As described above, in the method for detecting a similarity between voices of the present invention, the shape change between the standard pattern matrix and the input pattern matrix is replaced with the shape changes of the reference pattern vectors with the values of the reference shape as components. Then, the sizes of the shape changes are numerically evaluated as amounts of changes in kurtosis, and calculated as a value of a geometric distance. Therefore, even the voices that cannot be distinguished by the conventional similarity scale such as the Euclid distance or the angle can be distinguished based on the difference between the shapes of the pattern matrices, thus a precise detected value of the similarity between the voices can be obtained.

Moreover, in the method for recognizing a voice of the present invention, since the voice recognition is made based on the precise detected value of the similarity between the voices, a criterion of judgment therefor is highly reliable, thus the precision of the voice recognition can be remarkably increased.

Moreover, in the method for detecting a similarity between vibration waves of the present invention, the shape change between the standard pattern matrix and the input pattern matrix is replaced with the shape changes of the reference pattern vectors with the values of the reference shape as components, and the sizes of the shape changes are numerically evaluated as amounts of changes in kurtosis, and are calculated as a value of a geometric distance. Therefore, even the vibration waves that cannot be distinguished by the conventional similarity scale such as the Euclid distance or the angle can be distinguished based on the difference between the shapes of the pattern matrices, thus a precise detected value of the similarity between the vibration waves can be obtained.

Moreover, in the method for judging an abnormality in a machine of the present invention, since the abnormality judgment is made based on the precise detected value of the similarity between the vibration waves, a criterion of judgment therefor is highly reliable, thus the precision of the abnormality detection in a machine can be remarkably increased.

Moreover, in the method for detecting a similarity between images of the present invention, the shape change between the standard pattern matrix and the input pattern matrix is replaced with the shape changes of the reference pattern vectors with the values of the reference shape as components, and the sizes of the shape changes are numerically evaluated as amounts of changes in kurtosis, and calculated as a value of a geometric distance. Therefore, even the images that cannot be distinguished by the conventional similarity scale such as the Euclid distance or the angle can be distinguished based on the difference between the shapes of the pattern matrices, thus a precise detected value of the similarity between the images can be obtained.

Moreover, in the method for recognizing an image of the present invention, since the image recognition is made based on the precise detected value of the similarity between the images, a criterion of judgment therefor is highly reliable, and the precision of the image recognition can be remarkably increased.

Furthermore, in the method for detecting a similarity between solids of the present invention, the shape change between the standard pattern matrix layer and the input pattern matrix layer is replaced with the shape changes of the reference pattern vectors with the values of the reference shape as components, and the sizes of the shape changes are numerically evaluated as amounts of changes in kurtosis, and calculated as a value of a geometric distance. Therefore, even the solids that cannot be distinguished by the conventional similarity scale such as the Euclid distance or the angle can be distinguished based on the difference between the shapes of the pattern matrix layers, thus a precise detected value of the similarity between the solids can be obtained.

Furthermore, in the method for recognizing a solid of the present invention, since the solid recognition is made based on the precise detected value of the similarity between the solids, a criterion of judgment therefor is highly reliable, and the precision of the solid recognition can be remarkably increased.

Yet further, in the method for detecting a similarity between moving pictures of the present invention, the shape change between the standard pattern matrix layer and the input pattern matrix layer is replaced with the shape changes of the reference pattern vectors with the values of the reference shape as components, and the sizes of the shape changes are numerically evaluated as amounts of changes in kurtosis, and calculated as a value of a geometric distance.

Therefore, even the moving pictures that cannot be distinguished by the conventional similarity scale such as the Euclid distance or the angle can be distinguished based on the difference between the shapes of the pattern matrix layers, thus a precise detected value of the similarity between the moving pictures can be obtained.

Still further, in the method for recognizing a moving picture of the present invention, since the moving picture recognition is made based on the precise detected value of the similarity between the moving pictures, a criterion of judgment therefor is highly reliable, and the precision of the moving picture recognition can be remarkably increased.

What is claimed is:

1. A method for detecting a similarity between voices, comprising the steps of:
   (a) preparing a standard pattern matrix with a feature amount of a standard voice as a component and an input pattern matrix with a feature amount of an input voice as a component;
   (b) preparing an arbitrarily-shaped distribution such as a rectangle having a variance different for each specified component of the pattern matrices as a reference distribution, and preparing a positive reference pattern vector and a negative reference pattern vector, each having a value of the reference distribution as a component;
   (c) with regard to each component of the pattern matrices, obtaining a length between the specified component and a component in each of the pattern matrices, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix;
   (d) calculating a value of a difference between a kurtosis of the positive reference pattern vector and a kurtosis of the negative reference pattern vector;
   (e) obtaining a value of a difference between the kurtoses while the specified component of the pattern matrices being made to move to the position of each component in calculating the value of the difference between the kurtoses; and
   (f) obtaining any one of a sum of squares of the values of the differences between the kurtoses and a square root of the sum of the squares as a value of a geometric distance between the standard pattern matrix and the input pattern matrix.

2. The method for detecting a similarity between voices according to claim 1, wherein the reference distribution is a normal distribution.

3. A method for recognizing a voice, comprising the steps of:
   (a) preparing a standard pattern matrix with a feature amount of a standard voice as a component and an input pattern matrix with a feature amount of an input voice as a component;
   (b) preparing an arbitrarily-shaped distribution such as a rectangle having a variance different for each specified component of the pattern matrices as a reference distribution, and preparing a positive reference pattern vector and a negative reference pattern vector, each having a value of the reference distribution as a component;
   (c) with regard to each component of the pattern matrices, obtaining a length between the specified component and a component in each of the pattern matrices, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix;
   (d) calculating a value of a difference between a kurtosis of the positive reference pattern vector and a kurtosis of the negative reference pattern vector;
   (e) obtaining a value of a difference between the kurtoses while the specified component of the pattern matrices being made to move to the position of each component in calculating the value of the difference between the kurtoses;
   (f) obtaining any one of a sum of squares of the values of the differences between the kurtoses and a square root of the sum of the squares as a value of a geometric distance between the standard pattern matrix and the input pattern matrix; and
   (g) comparing the obtained value of the geometric distance with an arbitrarily set acceptable value, judging that the input voice is not the standard voice when the value of the geometric distance exceeds the acceptable value, and judging that the input voice is the standard voice when the value of the geometric distance is within the acceptable value.

4. The method for recognizing a voice according to claim 3, wherein the reference distribution is a normal distribution.

5. A method for detecting a similarity between vibration waves, comprising the steps of:
   (a) preparing a standard pattern matrix with a feature amount of a standard vibration wave as a component and an input pattern matrix with a feature amount of an input vibration wave as a component;
   (b) preparing an arbitrarily-shaped distribution such as a rectangle having a variance different for each specified component of the pattern matrices as a reference distribution, and preparing a positive reference pattern vector and a negative reference pattern vector, each having a value of the reference distribution as a component;
   (c) with regard to each component of the pattern matrices, obtaining a length between the specified component and a component in each of the pattern matrices, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix;

(d) calculating a value of a difference between a kurtosis of the positive reference pattern vector and a kurtosis of the negative reference pattern vector;

(e) obtaining a value of a difference between the kurtoses while the specified component of the pattern matrices being made to move to the position of each component in calculating the value of the difference between the kurtoses; and (f) obtaining any one of a sum of squares of the values of the differences between the kurtoses and a square root of the sum of the squares as a value of a geometric distance between the standard pattern matrix and the input pattern matrix.

6. The method for detecting a similarity between vibration waves according to claim 5, wherein the reference distribution is a normal distribution.

7. A method for judging an abnormality in a machine, comprising the steps of:

(a) preparing a standard pattern matrix with a feature amount of a standard vibration wave as a component and an input pattern matrix with a feature amount of an input vibration wave as a component;

(b) preparing an arbitrarily-shaped distribution such as a rectangle having a variance different for each specified component of the pattern matrices as a reference distribution, and preparing a positive reference pattern vector and a negative reference pattern vector, each having a value of the reference distribution as a component;

(c) with regard to each component of the pattern matrices, obtaining a length between the specified component and a component in each of the pattern matrices, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix;

(d) calculating a value of a difference between a kurtosis of the positive reference pattern vector and a kurtosis of the negative reference pattern vector;

(e) obtaining a value of a difference between the kurtoses while the specified component of the pattern matrices being made to move to the position of each component in calculating the value of the difference between the kurtoses;

(f) obtaining any one of a sum of squares of the values of the differences between the kurtoses and a square root of the sum of the squares as a value of a geometric distance between the standard pattern matrix and the input pattern matrix; and (g) comparing the obtained value of the geometric distance with an arbitrarily set acceptable value, judging that the machine is abnormal when the value of the geometric distance exceeds the acceptable value, and judging that the machine is normal when the value of the geometric distance is within the acceptable value.

8. The method for judging an abnormality in a machine according to claim 7, wherein the reference distribution is a normal distribution.

9. A method for detecting a similarity between images, comprising the steps of:

(a) preparing a standard pattern matrix with a feature amount of a standard image as a component and an input pattern matrix with a feature amount of an input image as a component;

(b) preparing an arbitrarily-shaped distribution such as a rectangle having a variance different for each specified component of the pattern matrices as a reference distribution, and preparing a positive reference pattern vector and a negative reference pattern vector, each having a value of the reference distribution as a component;

(c) with regard to each component of the pattern matrices, obtaining a length between the specified component and a component in each of the pattern matrices, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix;

(d) calculating a value of a difference between a kurtosis of the positive reference pattern vector and a kurtosis of the negative reference pattern vector;

(e) obtaining a value of a difference between the kurtoses while the specified component of the pattern matrices being made to move to the position of each component in calculating the value of the difference between the kurtoses; and (f) obtaining any one of a sum of squares of the values of the differences between the kurtoses and a square root of the sum of the squares as a value of a geometric distance between the standard pattern matrix and the input pattern matrix.

10. The method for detecting a similarity between images according to claim 9, wherein the reference distribution is a normal distribution.

11. A method for recognizing an image, comprising the steps of:
   (a) preparing a standard pattern matrix with a feature amount of a standard image as a component and an input pattern matrix with a feature amount of an input image as a component;
   (b) preparing an arbitrarily-shaped distribution such as a rectangle having a variance different for each specified component of the pattern matrices as a reference distribution, and preparing a positive reference pattern vector and a negative reference pattern vector, each having a value of the reference distribution as a component;
   (c) with regard to each component of the pattern matrices, obtaining a length between the specified component and a component in each of the pattern matrices, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix and the standard pattern matrix when the component value of the input pattern matrix is greater than the component value of the standard pattern matrix, and increasing a value of the component of the number in the negative reference pattern vector by the absolute value of the difference between the component values of the input pattern matrix and the standard pattern matrix when the component value of the input pattern matrix is smaller than the component value of the standard pattern matrix;
   (d) calculating a value of a difference between a kurtosis of the positive reference pattern vector and a kurtosis of the negative reference pattern vector;
   (e) obtaining a value of a difference between the kurtoses while the specified component of the pattern matrices being made to move to the position of each component in calculating the value of the difference between the kurtoses;
   (f) obtaining any one of a sum of squares of the values of the differences between the kurtoses and a square root of the sum of the squares as a value of a geometric distance between the standard pattern matrix and the input pattern matrix; and
   (g) comparing the obtained value of the geometric distance with an arbitrarily set acceptable value, judging that the input image is not the standard image when the value of the geometric distance exceeds the acceptable value, and judging that the input image is the standard image when the value of the geometric distance is within the acceptable value.

12. The method for recognizing an image according to claim 11, wherein the reference distribution is a normal distribution.

13. A method for detecting a similarity between solids, comprising the steps of:
   (a) preparing a standard pattern matrix layer with a feature amount of a standard solid as a component and an input pattern matrix layer with a feature amount of an input solid as a component;
   (b) preparing an arbitrarily-shaped distribution such as a rectangle having a variance different for each specified component of the pattern matrix layers as a reference distribution, and preparing a positive reference pattern vector and a negative reference pattern vector, each having a value of the reference distribution as a component;
   (c) with regard to each component of the pattern matrix layers, obtaining a length between the specified component and a component in each of the pattern matrix layers, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix layer and the standard pattern matrix layer when the component value of the input pattern matrix layer is greater than the component value of the standard pattern matrix layer, and increasing a value of the component of the number in the negative reference pattern vector by the absolute value of the difference between the component values of the input pattern matrix layer and the standard pattern matrix layer when the component value of the input pattern matrix layer is smaller than the component value of the standard pattern matrix layer;
   (d) calculating a value of a difference between a kurtosis of the positive reference pattern vector and a kurtosis of the negative reference pattern vector;
   (e) obtaining a value of a difference between the kurtoses while the specified component of the pattern matrix layers being made to move to the position of each component in calculating the value of the difference between the kurtoses; and
   (f) obtaining any one of a sum of squares of the values of the differences between the kurtoses and a square root of the sum of the squares as a value of a geometric distance between the standard pattern matrix layer and the input pattern matrix layer.

14. The method for detecting a similarity between solids according to claim 13, wherein the reference distribution is a normal distribution.

15. A method for recognizing a solid, comprising the steps of:
   (a) preparing a standard pattern matrix layer with a feature amount of a standard solid as a component and an input pattern matrix layer with a feature amount of an input solid as a component;
   (b) preparing an arbitrarily-shaped distribution such as a rectangle having a variance different for each specified component of the pattern matrix layers as a reference distribution, and preparing a positive reference pattern vector and a negative reference pattern vector, each having a value of the reference distribution as a component;
   (c) with regard to each component of the pattern matrix layers, obtaining a length between the specified component and a component in each of the pattern matrix layers, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix layer and the standard pattern matrix layer when the component value of the input pattern matrix layer is greater than the component value of the standard pattern matrix layer, and increasing a value of the component of the number in the negative reference pattern vector by the absolute value of the difference between the component values of the input pattern matrix layer and the standard pattern matrix layer when the component value of the input pattern matrix layer is smaller than the component value of the standard pattern matrix layer;

(d) calculating a value of a difference between a kurtosis of the positive reference pattern vector and a kurtosis of the negative reference pattern vector;

(e) obtaining a value of a difference between the kurtoses while the specified component of the pattern matrix layers being made to move to the position of each component in calculating the value of the difference between the kurtoses;

(f) obtaining any one of a sum of squares of the values of the differences between the kurtoses and a square root of the sum of the squares as a value of a geometric distance between the standard pattern matrix layer and the input pattern matrix layer; and (g) comparing the obtained value of the geometric distance with an arbitrarily set acceptable value, judging that the input solid is not the standard solid when the value of the geometric distance exceeds the acceptable value, and judging that the input solid is the standard solid when the value of the geometric distance is within the acceptable value.

16. The method for recognizing a solid according to claim 15, wherein the reference distribution is a normal distribution.

17. A method for detecting a similarity between moving pictures, comprising the steps of:

(a) preparing a standard pattern matrix layer with a feature amount of a standard moving picture as a component and an input pattern matrix layer with a feature amount of an input moving picture as a component;

(b) preparing an arbitrarily-shaped distribution such as a rectangle having a variance different for each specified component of the pattern matrix layers as a reference distribution, and preparing a positive reference pattern vector and a negative reference pattern vector, each having a value of the reference distribution as a component;

(c) with regard to each component of the pattern matrix layers, obtaining a length between the specified component and a component in each of the pattern matrix layers, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix layer and the standard pattern matrix layer when the component value of the input pattern matrix layer is greater than the component value of the standard pattern matrix layer, and increasing a value of the component of the number in the negative reference pattern vector by the absolute value of the difference between the component values of the input pattern matrix layer and the standard pattern matrix layer when the component value of the input pattern matrix layer is smaller than the component value of the standard pattern matrix layer;

(d) calculating a value of a difference between a kurtosis of the positive reference pattern vector and a kurtosis of the negative reference pattern vector;

(e) obtaining a value of a difference between the kurtoses while the specified component of the pattern matrix layers being made to move to the position of each component in calculating the value of the difference between the kurtoses; and (f) obtaining any one of a sum of squares of the values of the differences between the kurtoses and a square root of the sum of the squares as a value of a geometric distance between the standard pattern matrix layer and the input pattern matrix layer.

18. The method for detecting a similarity between moving pictures according to claim 17, wherein the reference distribution is a normal distribution.

19. A method for recognizing a moving picture, comprising the steps of:

(a) preparing a standard pattern matrix layer with a feature amount of a standard moving picture as a component and an input pattern matrix layer with a feature amount of an input moving picture as a component;

(b) preparing an arbitrarily-shaped distribution such as a rectangle having a variance different for each specified component of the pattern matrix layers as a reference distribution, and preparing a positive reference pattern vector and a negative reference pattern vector, each having a value of the reference distribution as a component;

(c) with regard to each component of the pattern matrix layers, obtaining a length between the specified component and a component in each of the pattern matrix layers, calculating numbers of the components of the positive reference pattern vector and the negative reference pattern vector, the components being proximate to positions apart by the length from centers of the positive reference pattern vector and the negative reference pattern vector, increasing a value of the component of the number in the positive reference pattern vector by an absolute value of a difference between component values of the input pattern matrix layer and the standard pattern matrix layer when the component value of the input pattern matrix layer is greater than the component value of the standard pattern matrix layer, and increasing a value of the component of the number in the negative reference pattern vector by the absolute value of the difference between the component values of the input pattern matrix layer and the standard pattern matrix layer when the component value of the input pattern matrix layer is smaller than the component value of the standard pattern matrix layer;

(d) calculating a value of a difference between a kurtosis of the positive reference pattern vector and a kurtosis of the negative reference pattern vector;

(e) obtaining a value of a difference between the kurtoses while the specified component of the pattern matrix layers being made to move to the position of each component in calculating the value of the difference between the kurtoses;

(f) obtaining any one of a sum of squares of the values of the differences between the kurtoses and a square root of the sum of the squares as a value of a geometric distance between the standard pattern matrix layer and the input pattern matrix layer; and (g) comparing the obtained value of the geometric distance with an arbitrarily set acceptable value, judging that the input moving picture is not the standard moving picture when the value of the geometric distance exceeds the acceptable value, and judging that the input moving picture is the standard moving picture when the value of the geometric distance is within the acceptable value.

20. The method for recognizing a moving picture according to claim 19, wherein the reference distribution is a normal distribution.

* * * * *